(12) United States Patent
Shima et al.

(10) Patent No.: US 8,595,413 B2
(45) Date of Patent: Nov. 26, 2013

(54) MEMORY CONTROL METHOD AND DEVICE, MEMORY ACCESS CONTROL METHOD, COMPUTER PROGRAM, AND RECORDING MEDIUM

(75) Inventors: Koji Shima, Kanagawa (JP); Hideyoshi Asai, Kanagawa (JP)

(73) Assignees: Sony Corporation, Tokyo (JP); Sony Computer Entertainment Inc., Tokyo (JP)

(*) Notice: Subject to any disclaimer, the term of this patent is extended or adjusted under 35 U.S.C. 154(b) by 467 days.

(21) Appl. No.: 12/867,584

(22) PCT Filed: Dec. 9, 2008

(86) PCT No.: PCT/JP2008/072724
§ 371 (c)(1),
(2), (4) Date: Oct. 26, 2010

(87) PCT Pub. No.: WO2009/104330
PCT Pub. Date: Aug. 27, 2009

(65) Prior Publication Data
US 2011/0040931 A1 Feb. 17, 2011

(30) Foreign Application Priority Data

Feb. 20, 2008 (JP) .................. 2008-038535
Jun. 9, 2008 (JP) .................. 2008-150479
Jul. 18, 2008 (JP) .................. 2008-187474

(51) Int. Cl.
*G06F 12/00* (2006.01)
(52) U.S. Cl.
USPC ............ 711/103; 711/117; 711/156; 711/170
(58) Field of Classification Search
None
See application file for complete search history.

(56) References Cited

FOREIGN PATENT DOCUMENTS

| JP | 11-73363 | 3/1999 |
|---|---|---|
| JP | 2004-151958 | 5/2004 |
| JP | 2004 152331 | 5/2004 |
| JP | 2004-533029 | 10/2004 |
| JP | 2005-018490 | 1/2005 |
| JP | 2005-243000 | 9/2005 |
| JP | 2006-72461 | 3/2006 |
| JP | 2006-260468 | 9/2006 |
| JP | 2008-004117 | 1/2008 |
| JP | 2008-77669 | 4/2008 |
| WO | WO 02/058074 | 7/2002 |

OTHER PUBLICATIONS

Office Action issued in corresponding Japanese application No. 2008-187474 on May 14, 2013 and the English translation.
Office Action issued in corresponding Japanese application No. 2008-187474 dated Jul. 23, 2013 and the English translation.

*Primary Examiner* — Shawn X Gu
(74) *Attorney, Agent, or Firm* — Frommer Lawrence & Haug LLP; William S. Frommer; Paul A. Levy

(57) ABSTRACT

To increase the number of times data can be written into a flash memory a flash memory is provided with a real data block having multiple data blocks each having multiple data write cells. A memory control device identifies a data block having a reprogrammable write cell out of the data block, successively adding received, new data segments into the reprogrammable write cell of the identified data block to complete addition of the data segments. The block in a state before the addition is kept to a certain period of time and then erased in the unit of block. When the number of write operations in the data block reaches a predetermined number of times, then it selects new data blocks that are necessary for retaining a subsequent predetermined number of operations to rewrite data, and repeats the aforementioned operations for the selected data blocks.

23 Claims, 42 Drawing Sheets

FIG. 3

MEMORY CONTROL METHOD AND DEVICE, MEMORY ACCESS CONTROL METHOD, COMPUTER PROGRAM, AND RECORDING MEDIUM

TECHNICAL FIELD

The present invention relates to a technology to control access to a non-volatile memory that can only be reprogrammed a limited number of times in a data processing unit, for example, a technology with which a flash memory can be written to a degree comparable to an EEPROM (Electrically Erasable and Programmable Read Only Memory).

BACKGROUND OF THE INVENTION

EEPROMs and flash memories can be reprogrammed, more specifically, erased only a limited number of times. These memories containing data must be erased before they can be written with new data. It is well known that the number of times flash memories can be reprogrammed is much less than that of EEPROMs. EEPROMs are guaranteed for, e.g., approximately 100,000 cycles (reference value). Flash memories, on the other hand, are guaranteed for about 1,000 cycles (reference value). For these reasons, EEPROMs are used in applications where data is rewritten frequently while flash memories are typically used in applications other than the above.

EEPROMs permits a large number of write cycles but are much more expensive than flash memories. It is thus expected that data recording medium can be achieved at a lower cost in an information processor where an EEPROM is used as a data recording medium, if a flash memory can serve as an alternative to that data recording medium.

In order to use a flash memory as an alternative to an EEPROM, it is necessary to provide a mechanism to make the number of times flash memories can be reprogrammed comparable to that of EEPROMs. One technical approach for this purpose in the art is the one called "EEPROM emulation" which is described in, for example, the Non-patent-related Document 1. As described above, flash memories containing data must be erased before they are reprogrammed. EEPROM emulation (registered trademark) in flash memory erases multiple write cells simultaneously to reduce the number of erase cycles associated with operations to write data. This increases an apparent number of times flash memories can be reprogrammed to around that of EEPROMs.

However, the EEPROM emulation uses a different address architecture from that of EEPROMs. In order to achieve the number of reprogramming cycles in flash memories equivalent to that of EEPROMs, it is much better if the address architecture of the EEPROMs is also implemented. For this purpose, it is necessary to provide a mechanism to generalize management of the address architecture. More specifically, it is desirable to provide a technology for memory control with which addresses can be managed for each write cell, and the number of times non-volatile memories can be reprogrammed can be increased as compared to that obtained during their ordinary use.

In addition, the EEPROM emulation is typically designed to divide each write cell into multiple blocks (data write cells). If a problem such as an unexpected power failure arises during write operations with the write cells divided, it is difficult to determine after the recovery which part of the data is successfully written.

As a conventional art that can improve this, there is an approach wherein a first reference data representing a state at the beginning of writing and a second reference data representing a state at the completion of the write operation are stored for each block, and the first reference data is updated at the beginning of the write operation while the second reference data is updated at the completion of the write operation, thereby allowing to recognize the most recent version of the data that has written just before the occurrence of the problem of the type described above, as the latest data (Patent-related Document 1).

In addition, after occurrence of any problem, information representing the completion of the write operation is referred to upon recovery to reprogram the block that has been written already, thereby to recover the data appropriately (Patent-related Document 2).

The technique disclosed in the Patent-related Document 1 has an advantage that the data in the blocks that have been written successfully just before the occurrence of a problem can be used after the recovery by means of referring each reference data even when the write operation is interrupted and aborted due to, for example, a power failure. However, this technique requires some related processing to ensure the consistency of the already-written data when the data to be written is divided into and written as separate pieces. This is because non-volatile memories are reprogrammed on a block-by-block basis (and are erased before that), and because sectors that are available for writing can be wasted if precise consistency check is not made. A similar problem applies to the technique disclosed in the Patent-related Document 2. In addition, the blocks divided have a fixed size while the size of the data to be written is not fixed, which makes it difficult to achieve the related processing in a correct manner.

These problems are expected to be solved by using a memory access technology which ensures data having various sizes to be written atomically.

By the way, there is no difference between EEPROMs and EEPROM emulations from the viewpoint that they can be reprogrammed only a limited number of times. However, when focused on the address at which data is to be written, some addresses are used for writing data only one time. An example is given. It is assumed that addresses corresponding to 2048 bytes are classified into the following three types.

First address set: addresses corresponding to 256 bytes from 000H to 0100H;

Second address set: addresses corresponding to 1024 bytes from 0100H to 0500H;

Third address set: addresses corresponding to 768 bytes from 0500H to 0800H.

It is also assumed that the first and third address sets are frequently involved in reprogramming while the second address set is associated with a sector in which data such as a given fixed parameter will be read but not changed once it is written. When all address sets are used in a similar equivalent manner, the data to be rewritten has a size of 2048 bytes unless some kinds of efforts are made. This makes the number of times the memory can be reprogrammed much smaller than it really is, regardless of the fact that actually the size of 256+768=1024 bytes is enough.

It is expected that such a problem can be solved by using a characteristic memory control technology with which addresses can be managed for each write cell while the number of times the non-volatile memory can be reprogrammed can also be increased as compared to that obtained during their ordinary use.

[Non-patent-related Document 1] "Application Note U17057JJ3V0AN00", third edition, NEC Electronics Corp., November 2004, p. 25-27.

[Patent-related Document 1] Japanese Patent Laid-open No. 8-287697.

[Patent-related Document 2] Japanese Patent Laid-open No. 2004-206381.

An object of the present invention is to provide a characteristic memory control technology with which addresses can be managed for each write cell while the number of times the non-volatile memory can be reprogrammed can also be increased as compared to that obtained during their ordinary use.

Another object of the present invention is to provide a memory access control technology which ensures data having various sizes to be written atomically into a non-volatile memory.

SUMMARY OF THE INVENTION

In order to solve the aforementioned problems, the present invention provides a memory control method, a memory control device, a computer program with which a computer is operated as a memory control device, and a computer readable recording medium as described below.

(First Memory Control Method)

A first memory control method according to the present invention that solves the aforementioned problems is a memory control method to be carried out by a device that can access a non-volatile memory in which data segments in write cells are erased before other data segments are written in the subject write cells, comprising sequentially associating and grouping write cells of said non-volatile memory by every predetermined number; retaining such number of groups that is necessary to allow a predetermined number of data write operations; in the retained number of groups, adding, when there is a group having a write cell that was not previously written or a write cell into which a data segment can be written in a write operation, the data segment to the subject write cell of the group; and erasing the group from which the data segment was transferred is erased in the unit of group at the time when a predetermined condition is satisfied.

In a certain aspect of the first memory control method, said device retains, when it detects the completion of the predetermined number of data write operations in said retained number of groups, such number of groups that is further required to allow a predetermined number of data write operations from said non-volatile memory. In other aspect of the present invention, said device, when it stops control operation before the completion of the predetermined number of data write operations in said retained number of groups, retains in the recovery, the group again that has been retained before the stop.

(First Memory Control Device)

A first memory control device according to the present invention that solves the aforementioned problems is a memory control device for use in controlling operations to write data into a non-volatile memory in which data segments in write cells are erased before other data segments are written in the subject write cells, said non-volatile memory containing, multiple data sector groups, each data sector group having multiple write cells associated sequentially, multiple header sector groups, each header sector group having a write cell for header information indicating data segment is written in which write cell of which data sector group, and a management sector group having a write cell for management information which write cells of which data sector group and which header sector group are accessible, said memory control device comprising: write processing means for use in specifying a data sector group having a reprogrammable write cell from said multiple data sector groups in said non-volatile memory, successively adding transferred new data segments into the reprogrammable write cell of the specified data sector group, further specifying a subsequent data sector group in said non-volatile memory if the reprogrammable write cells are not enough, to complete addition of said transferred data segments, rewriting one or more data blocks that have been completely added with the data segments in said non-volatile memory in the unit of data sector group, generating said header information including address information that allows identification of a write cell added with the data segment in the data sector group, and adding the generated header information into the write cell of said header sector group; first detecting means for detecting that the number of write operations in said data sector group or said header sector group reaches a predetermined number of times; and rearrangement processing means for use in further retaining such number of said data sector groups that is to be necessary for retaining said predetermined number of operations to rewrite the data next time in said non-volatile memory when the first detecting means detects that said predetermined number of times is reached, generating said management information about the retained data sector group, and writing the generated management information into said management sector group.

In the first memory control device, said write processing means specifically, said write processing means is adapted to temporarily stores the data sector group before being added into a predetermined sector in said non-volatile memory when said data sector group that has been completely added is a data sector group containing a reprogrammable write cell, and to erase the temporarily stored data sector group when it is detected that a predetermined condition is satisfied. In addition, said non-volatile memory may have an initial data write cell into which an initial data is to be written, the initial data being commonly used for data write operations in multiple times, and said write processing means may be adapted to refer to the initial data written in said initial data writing means when it performs the addition of said data segment.

Said rearrangement processing means is, for example, adapted to select a new header sector group along with said new data sector group, and generates said management information about the selected data sector group and the selected header sector group before erasing said data sector group.

A preferred aspect further comprises second detecting means for use in detecting the recovery after the stop of operation of the memory control, said rearrangement processing means is adapted to retain, when said second detecting means detects said recovery, the data sector group and the header sector group of which written contents are identical to those before the stop, according to the management information written in said management sector group, rather than retaining a new data sector group and a new header sector group.

(First Computer Program)

A first computer program according to the present invention that solves the aforementioned problems is a computer program for use in making a computer serve as a device for use in controlling operations to write data into a non-volatile memory in which data segments in write cells are erased before other data segments are written in the subject write cells, said computer program making said computer act as: group forming means for forming, in said non-volatile memory, multiple data sector groups, each data sector group having multiple write cells associated sequentially, multiple header sector groups, each header sector group having a write cell for header information indicating data segment is written in which write cell of which data sector group, and a management sector group having a write cell for management information which write cells of which data sector group and which header sector group are accessible; write processing means for use in specifying a data sector group having a reprogrammable write cell from said multiple data sector groups in said non-volatile memory, successively adding transferred new data segments into the reprogrammable write cell of the specified data sector group, further specifying a subsequent data sector group in said non-volatile memory if the reprogrammable write cells are not enough, to complete addition of said transferred data segments, rewriting one or more data blocks that have been completely added with the data segments in said non-volatile memory in the unit of data sector group, generating said header information including address information that allows identification of a write cell added with the data segment in the data sector group, and adding the generated header information into the write cell of said header sector group; detecting means for detecting that the number of write operations in said data sector group or said header sector group reaches a predetermined number of times; and rearrangement processing means for use in further retaining such number of said data sector groups that is to be necessary for retaining said predetermined number of operations to rewrite the data next time in said non-volatile memory when the first detecting means detects that said predetermined number of times is reached, generating said management information about the retained data sector group, and writing the generated management information into said management sector group.

(Second Memory Control Device)

A second memory control device according to the present invention that solves the aforementioned problems is a memory control device for use in controlling operations to write data into a non-volatile memory that can be written only a limited number of times, comprising: accepting means for accepting an input data; discriminating means for use in determining, according to a predetermined write rule, whether said input data is a first data or a second data, the first data being not required to be rewritten, the second data being required to be rewritten; and write processing means for use in performing a first write operation when the input data is said first data and a second write operation when said input data is said second data, the first write operation being for writing the input data into a first data sector in said non-volatile memory, the second write operation being for retaining, in said non-volatile memory, such number of second data sectors that is required for allowing predetermined number of operations to write data, to successively add said input data into a write cell into which a data segment can be written, and to erase the second data sector in which data has already been written in the unit of cells, of a retained second data recording area.

In the second memory control device, for example, said write processing means temporarily stores said second data sector into which the data has already been written in a predetermined sector in said non-volatile memory, and erases it when a predetermined condition is satisfied. In addition, the write processing means is adapted to accumulate the number of write operations into said second data sector, further retain said retained number of said second data sectors in said non-volatile memory when an accumulated total value reaches a predetermined value, and perform an operation for data rearrangement to the retained second data sector.

In the second memory control device, for example, said write rule is a record of a range of addresses at which addresses of the first data sector can be written, and wherein said discriminating means determines whether the addresses into which said input data should be written are within the range of the addresses of said first data sector, and determines that the input data is the data to be written into said first data sector when they are within the range of the addresses, while determines that the input data is the data to be written into said second data sector when they are not within the range of said addresses. Alternatively, said write rule is a record of a relationship between the order of writing into said non-volatile memory and the data recording area therefor, and wherein said discriminating means determines the input data as the data that should be written into said first data sector when said input data is the first data to be written into said non-volatile memory, and determines data other than that is the data that should be written into said second data sector.

(Second Memory Control Method)

A memory control method according to the present invention that solves the aforementioned problems is memory control method to be carried out by a device for use in controlling operations to write data into a non-volatile memory that can be written with data only a limited number of times, comprising the steps of: accepting an input data, and determining, according to a predetermined write rule, whether the accepted input data is a first data or a second data, the first data being not required to be rewritten, the second data being required to be rewritten; and performing a first write operation when the input data is said first data and a second write operation when said input data is said second data, the first write operation being for writing the input data into a first data sector in said non-volatile memory, the second write operation being for retaining, in said non-volatile memory, such number of second data sectors that is required for allowing predetermined number of operations to write data, to successively add said input data into a write cell into which a data segment can be written, and to erase the second data sector in which data has already been written in the unit of cells, of a retained second data recording area.

(Second Computer Program)

A second computer program according to the present invention that solves the aforementioned problems is a computer program for use in making a computer serve as a memory control device for use in controlling operations to write data into a non-volatile memory that can be written only a limited number of times, said computer program making said computer act as the aforementioned accepting means, discriminating means, and write processing means. This computer program is typically distributed on a recording medium.

In order to solve the aforementioned other problems, the present invention provides a memory access control method, a memory control device, and a computer program that makes a computer act as a memory control device.

(Memory Access Control Method)

A memory access control method according to the present invention that solves the aforementioned other problems is a memory access control method to be carried out by a device for use in controlling accesses to a memory having a data sector and a header sector, the data sector being written in blocks of a predetermined data size as a single write unit, the header sector being referred to when data is read out of the data sector, comprising the stages of: obtaining a real data to be written; retaining the data sector(s) for one or more write units in said memory depending on the size of the real data obtained; sequentially associating the retained data sector(s) for the write unit(s) from the beginning to the end of said real data; writing first flag information in said header sector, the first flag information indicating what number write unit the subject real data is; writing the real data in this write unit into said data sector; and associating second flag information with said first flag information and writing it into said header sector when it is detected that the real data has been written successfully, the second flag information indicating the completion of the write operation; and referring to said header sector about said real data and, when no second flag information is written in the header sector or when said second flag information is written therein but said first flag information is not the one for the last write unit, then dealing all real data already written in said data sector as invalid data.

In an aspect of this memory access control method, said first flag information includes sequence numbers of which maximum value is equal to the number of the retained write units, and said device successively is adapted to update said sequence numbers to a smaller value, starting from the first write unit to the end of the value indicating the last write unit, every time when said real data has been written into said data sector successfully, and to write the updated sequence number into said header sector as the first flag information for the subject write unit.

In addition, in another aspect, said second flag information includes, for each write unit, identification information for use in identifying an immediately preceding write unit, and a logical address indicating the location where said real data is written said device generates said second flag information when said first flag information has been written into said header sector successfully and said real data has been written into said data sector successfully, to write the second flag information along with the first flag information into the sector from which it is referred to.

In addition, in another aspect, said device obtains a new real data to be written while keeping the contents of the data sector and said header sector in which said invalid data has been written, and further retains said data sector into which the size of the new real data obtained is to be written. In this case, said device said device can reduce the number of erase cycles for writing, by means of erasing, in a lump, the contents of said kept data sector and said header sector when a predetermined erase condition is satisfied.

(Third Memory Control Device)

A memory control device according to the present invention that solves the aforementioned other problems is a memory control device for use in controlling accesses to a memory having a data sector and a header sector, the data sector being written in blocks of a predetermined data size as a single write unit, the header sector being referred to when data is read out of the data sector, comprising: real data acquisition means for obtaining a real data to be written; writing means for use in retaining the data sector(s) for one or more write units in said memory depending on the size of the real data obtained; sequentially associating the retained data sector(s) for the write unit(s) from the beginning to the end of said real data; writing first flag information in said header sector, the first flag information indicating what number write unit the subject real data is; writing the real data in this write unit into said data sector; and associating second flag information with said first flag information and writing it into said header sector when it is detected that the real data has been written successfully, the second flag information indicating the completion of the write operation; and reading means for use in referring to said header sector about said real data and, when no second flag information is written in the header sector or when said second flag information is written therein but said first flag information is not the one for the last write unit, then dealing all real data already written in said data sector as invalid data.

(Third Computer Program)

A computer program according to the present invention that solves the aforementioned other problems is a computer program for use in making a computer which can access to a memory having a data sector and a header sector, the data sector being written in blocks of a predetermined data size as a single write unit, the header sector being referred to when data is read out of the data sector, act as: real data acquisition means for obtaining a real data to be written; writing means for use in retaining the data sector(s) for one or more write units in said memory depending on the size of the real data obtained; sequentially associating the retained data sector(s) for the write unit(s) from the beginning to the end of said real data; writing first flag information in said header sector, the first flag information indicating what number write unit the subject real data is; writing the real data in this write unit into said data sector; and associating second flag information with said first flag information and writing it into said header sector when it is detected that the real data has been written successfully, the second flag information indicating the completion of the write operation; and reading means for use in referring to said header sector about said real data and, when no second flag information is written in the header sector or when said second flag information is written therein but said first flag information is not the one for the last write unit, then dealing all real data already written in said data sector as invalid data.

According to the first memory control method and device of the present invention, write operations are performed for each write cell of write cells that were not previously written in a group retained in a non-volatile memory. This makes it possible to generalize an address architecture of the write cells, and to achieve distributed writing of data. A memory is erased in the unit of group. Accordingly, the number of times non-volatile memories can be reprogrammed can be increased as compared to that obtained during their ordinary use According to the second memory control method and device of the present invention, the input data is written into a first data sector when it is a first data that does not require to be rewritten, and when the input data is a second data that requires to be rewritten, second data sectors are kept in the non-volatile memory that are necessary to allow a predetermined number of data write operations, and the input data segments are successively added to the into sectors that are available for writing out of the retained second data recording areas. The second data sectors that have already been written are erased in the unit of multiple sectors. This eliminates the operation to reprogram the first data sector, increasing the number of times data can be written.

According to the memory access control method and the third memory control method of the present invention, as to the data to be written, all data segments that have been written are considered as invalid data in a reading operation unless all write operations to the data sector and the header sector have been completed successfully. This completely eliminates any related processing to ensure the consistency of the data before and after a problem arises, which otherwise would necessary for conventional techniques. Accordingly, it is possible to effectively reduce cost rise for writing data into a non-volatile memory while taking the occurrence of possible problems into consideration.

BRIEF DESCRIPTION OF THE DRAWINGS

Figure 3:
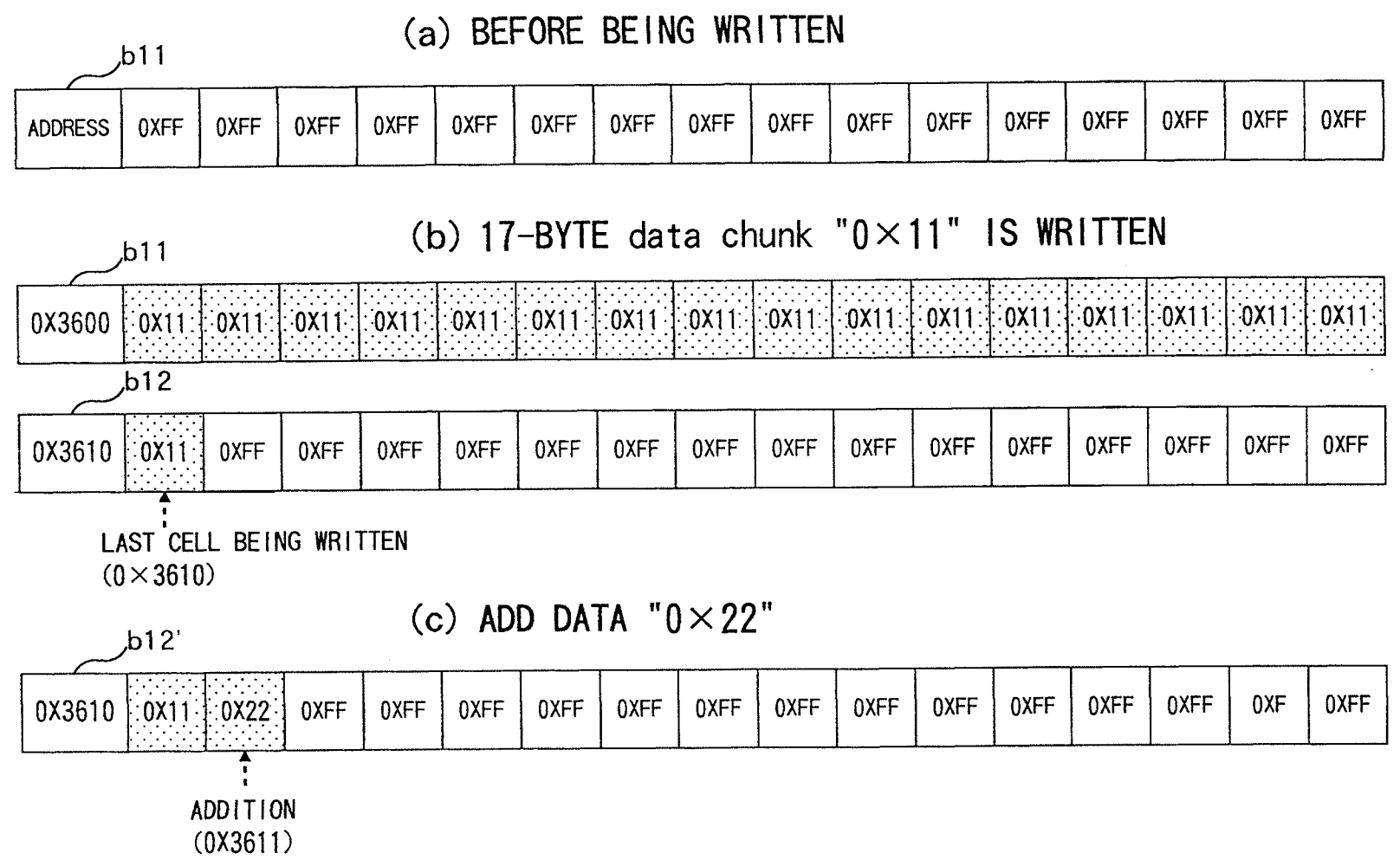

FIG. 3 is a schematic diagram illustrating write architecture according to the first embodiment in which (a) shows a state of a memory before being written, (b) shows a state of the memory when 17-byte data chunk is written, and (c) shows a state of the memory after a data segment is added;

BEST MODES FOR CARRYING OUT THE INVENTION

First Embodiment

Figure 1:
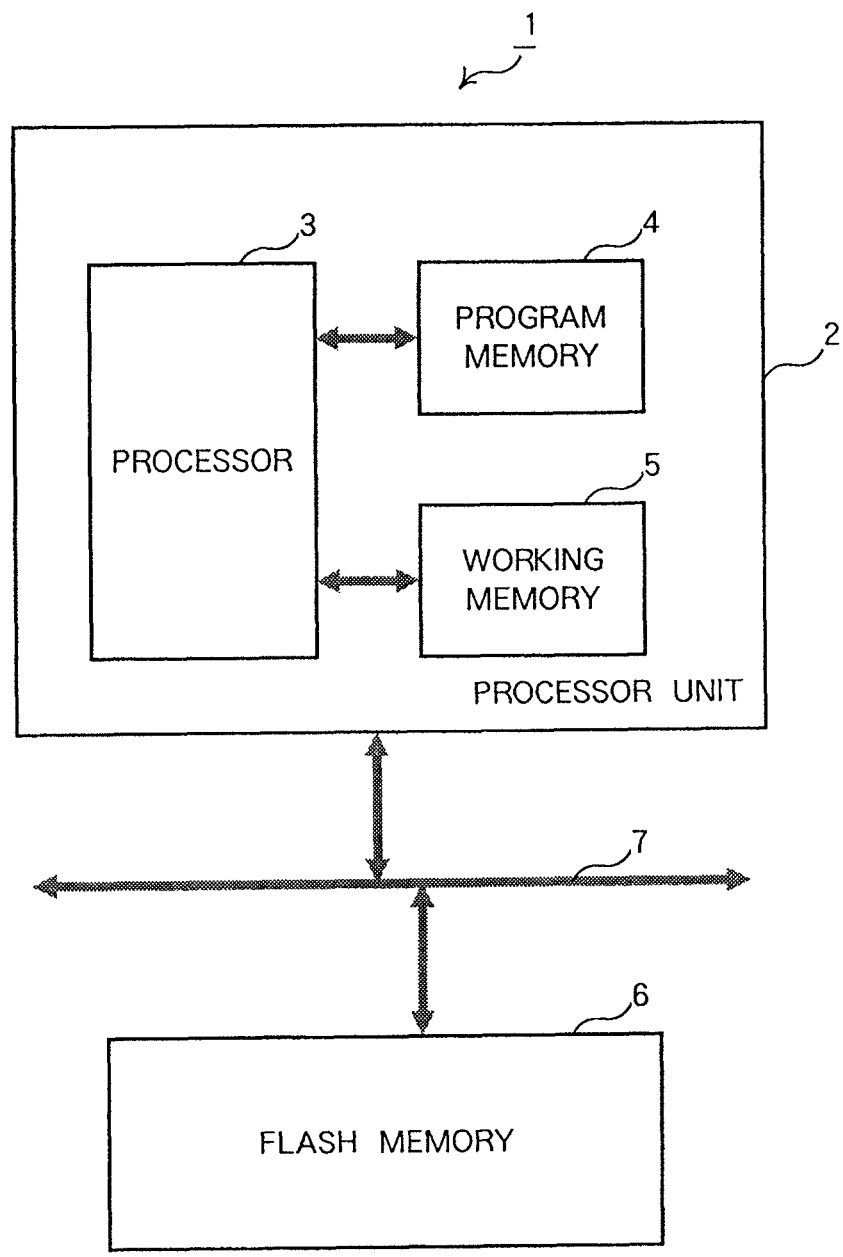
FIG. 1 is a view illustrating an entire structure of a memory control device which serves as a first embodiment of the present invention.

FIG. 1 is a view illustrating an entire structure of a memory control device which serves as a first embodiment of the present invention. This memory control device 1 comprises a processor unit 2 and a flash memory 6 as an example of a non-volatile memory, which are connected to each other via a data bus 7. The processor unit 2 has a processor 3, a program memory 4 in which a computer program of the present invention is stored, and a working memory 5 which is a volatile memory. The processor 3 loads a computer program 4 into the working memory 5 and executes it to achieve, in the processor unit 2, characteristic memory control to the flash memory 6, such as functions of group forming means for EEPROM emulation, write processing means, read processing means, some kinds of detecting means, and rearrangement processing means. In the working memory 5, a buffer is defined that temporarily stores data.

The concept of the memory control according to the first embodiment is described by comparing it with a conventional art.

FIG. 2(a) is a conceptual diagram showing widely-used conventional memory control. When a data chunk is to be written into a flash memory, a conventional memory control device specifies an address in the flash memory. The target address is a physical address. It determines whether or not a write cell specified by the address contains a data segment. If there is an existing data segment, it erases that data segment before it rewrites a new data segment. For example, when data segments "0X11", "0X22", and "0X33" are written in this order into a write cell specified by the address "0X3600", the data segments in the write cell specified by that address "0X3600" are successively rewritten, finally leaving only the last data segment "0X33". Such memory control would suffer from the possibility of intensive traffic for reprogramming at the same address, so that the flash memory can be reprogrammed only about 1,000 times, as described above. Thus, it cannot be used as an alternative to EEPROMs which can be reprogrammed about 100,000 times and which is based on different address architecture.

The first embodiment provides distributed writing of data to avoid intensive traffic at the same address, thereby increasing the number of times the data can be written. For this purpose, as shown in FIG. 2(b), an address is specified by using the one equivalent to a logical address, and write cells into which a data chunk to be written are those specified by addresses that are associated with the one equivalent to the logical address.

It should be noted that flash memories require erasing of data and thus the writing or editing is in fact a step of reprogramming. Hereinafter, the term writing or editing is used, unless they should be distinguished from each other.

In the example shown in FIG. 2(b), the first data segment "0X11" to the address "0X3600" (equivalent to a logical address) is written into a write cell specified by the address "0X1000" (equivalent to a physical address) that is mapped to the address "0X3600". The second data segment "0X22" to the address "0X3600" is written into a write cell specified by the address "0X1003" that is mapped to the address "0X3600". The third data segment "0X33" to the address "0X3600" is written into a write cell specified by the address "0X1004" that is mapped to the address "0X3600". As apparent from the above, even after three operations of writing the data segments are performed, each write cell into which the data segment is actually written is reprogrammed only one time at each location corresponding to the physical address. This increases the number of times data can be written substantially threefold.

The memory control according to the first embodiment is an approach that makes it possible to provide a novel EEPROM emulation by using such a model of address association. In other words, in taking into consideration the address architecture of the EEPROMs, data is separately written into the write cells while is erased in the unit of blocks each comprising two or more write cells that are not needed.

In the description hereinafter, a smallest group of write cells as a unit being written is referred to as an entry. A group of two or more entries is referred to as a block. Two or more entries are sequentially lined by serial addresses. The same applies to the blocks. One feature of the first embodiment lies in the fact that the groups are rearranged in writing data. The concept of this rearrangement is described with reference to FIG. 3.

FIG. 3(a) shows a structure of a data sector group in a state before data is written. An example of a simplified layout is given here in which addresses for one entry are 16-byte aligned, and a data sector has a fixed length of 16 bytes, i.e., the data sector has sixteen write cells into which one-byte data segments are written one for each. The sixteen write cells as well as write cells in another entry are associated sequentially with each other by means of associating them in address order. The numerical values in the figure are represented in hexadecimals. The hex [0XFF] represents a write cell that was not previously written.

With the entry having the aforementioned structure, it is assumed that the memory control device 1 specifies the address [0X3600] (equivalent to a logical address) to write a data chunk of 17 bytes in length. Since the data sector has a fixed length of 16 bytes, only a 16-byte data fraction (each byte represents [0X11]) of the target 17-byte data chunk is written into the entry specified by the addresses [0X3600] to [0X360F]. The remaining 1-byte ([0X11]) data fraction is written into the first write cell (address [0X3610]) in the entry sequentially aligned with the preceding entry. This state is shown in FIG. 3(b). In this case, when the data fraction of 1 byte is read at the address [0X3610], the data segment [0X11] is obtained.

When another data segment [0X22] of 1 byte is added to the cell specified by the address [0X3611], identified is the entry for the address [0X3610] that is included in the same 16 byte boundary as the address [0X3611] corresponding to the most recently written cell at that time. Then, the 16-byte data of that entry, i.e., the 16-byte data with the data segment at the location specified by the address [0X3611] being updated is written as a new entry (read-modify-write).

Update is an operation to add the aforementioned new entry to an entry that was not previously written and that is located just after the entry most recently written before the addition, thereby to reduce the write cells that were not previously written in the subject entry. This state is illustrated in FIG. 3(c). The entry to which a data segment is added is written as a new entry for the address [0X3610]. As a result, the entry that was associated with the address [0X3610] before the addition (the lower entry in FIG. 3(b)) becomes unnecessary. This is deleted when a situation where a predetermined condition is satisfied is detected. It is kept until it is deleted. Any location may be used for this keeping as long as the location can be specified.

As apparent from the above, one feature of the EEPROM emulation according to the first embodiment lies in the fact that the data segments are written into individual write cells that were not previously written, and are erased in the unit of group (in the above example, in the unit of entry). The same applies to the blocks. This significantly reduces the number of erase operations as compared to situations where reprogramming is intensively made at a certain given address, and in turn increases the number of times the data can be written. The combination of this deleting and keeping necessary data is referred to as "rearrangement". The rearrangement is apparently different from initialization where the write cells are cleared to [0XFF].

<Memory Configuration of Flash Memories>

Figure 4:
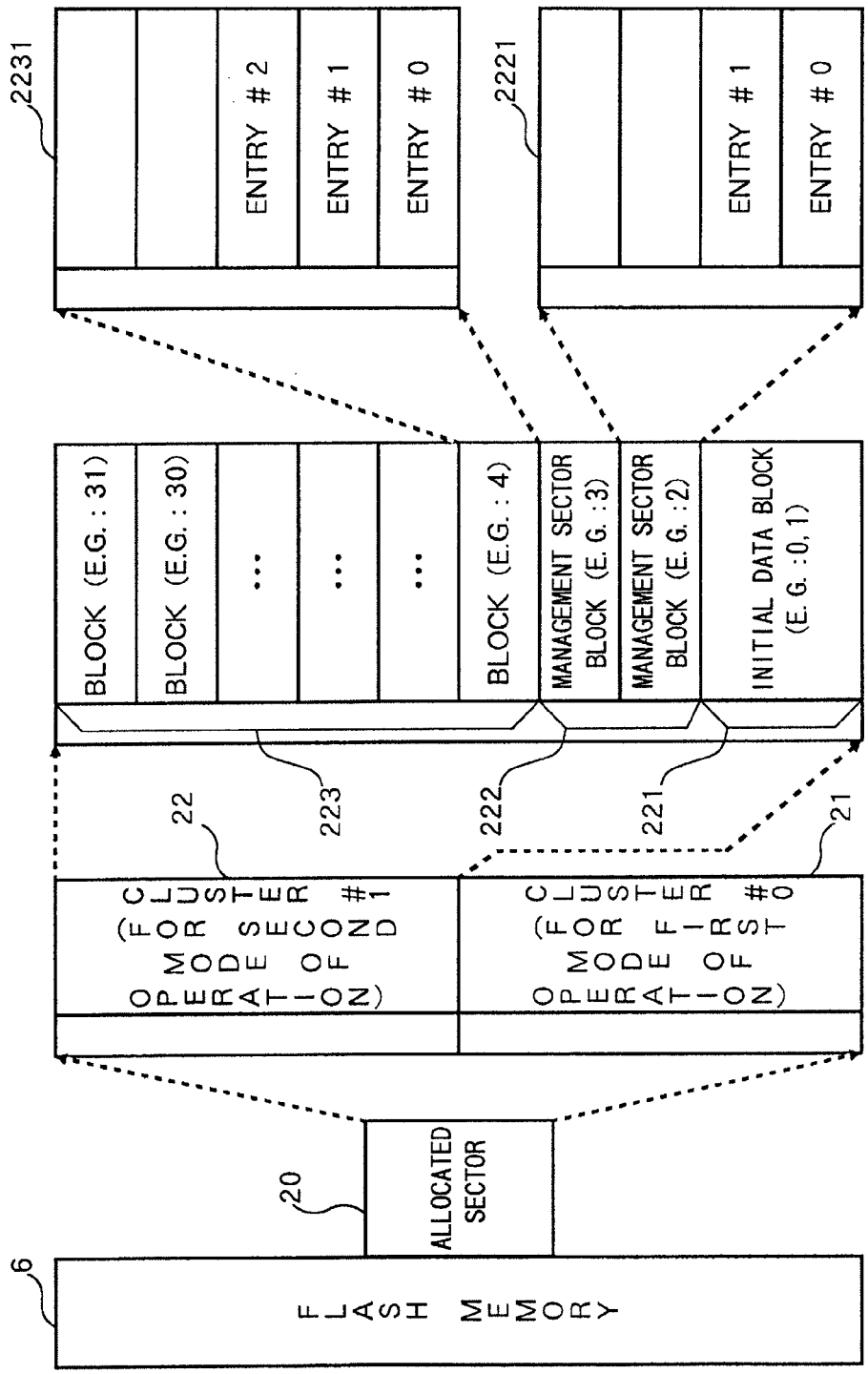
FIG. 4 is a view illustrating a configuration of a flash memory according to the first embodiment.

An example of a memory configuration of the flash memory 6 according to the first embodiment is shown in FIG. 4. Such a memory configuration is achieved by the processor unit 2 which serves as group forming means.

In this example, the flash memory 6 is a 512-kB flash memory for the sake of convenience. The flash memory 6 is provided with a 128-kB allocated sector 20. In view of FIG. 2, the flash memory 6 is equivalent to a non-volatile memory having physical addresses shown in FIG. 2(a)

The allocated sector 20 is divided into a cluster #0 (for a first mode of operation) 21 and a cluster #1 (for a second mode of operation) 22 each having a size of 64 kB, i.e., a half of the size of 128 kB. The first and second modes of operation are for applications using, for example, master/slave, main/sub, or special mode/normal modes. It is not necessary to divide the cluster when such two modes of operation are not used.

The clusters 21 and 22 of both modes of operation are each made up of multiple blocks. When each block has a size of 2 kB, each cluster has thirty two blocks. These blocks have the same structure for both clusters 21 and 22 for the two modes of operations. The memory can be erased in the unit of entry described below or in the unit of block.

In the example shown in FIG. 4, an initial data block 221 for an initial data, a management sector block 222, and a real data block 223 into which data is written are formed for the cluster #1 (second mode of operation) 22.

As the initial data block 221, a block or blocks are retained depending on the size of the initial data that is to be initially written into the flash memory 6, for example, two blocks (e.g., two blocks denoted by 0 and 1 out of thirty two blocks denoted by 0 to 31). The initial data is a data to be written, in principle, only once into the flash memory 6. The initial data does not contain a header which is described below, and is referred to directly by the program for loading the data on the flash memory 6. As the initial data, such a data is used that is shared during EEPROM emulation not to reduce the data size to be retained for rearrangement during the EEPROM emulation. The initial data may be a large data such as having a size of 512 bytes. Reading this initial data extends the interval between rearrangements when data is added as described below, which results in reduced number of frequencies of rearrangement.

As the management sector block 222, two blocks are allocated that are to be used alternately (e.g., two blocks denoted by 2 and 3). The management sector block 222 is a block (sector group) into which management information is written for use in writing in what way the real data block 223 is structured currently.

The real data block 223 is either a header block or a data block. The header block is a block (sector group) into which only a header is written that indicates which data segments are located in which cell (which address of which block) of the flash memory 6. The data block is a block (sector group) into which a data chunk or item that is actually handled (referred to as a real data) is written by means of write control by the memory control device 1. It is sequentially aligned with other data blocks in address order.

Each of the management sector block 222 and the real data block 223 has multiple entries. The entries are also sequentially lined in address order. The example in FIG. 4 shows an entry 2231 in the real data block 223 and an entry 2221 in the management sector block 222.

Figure 5:
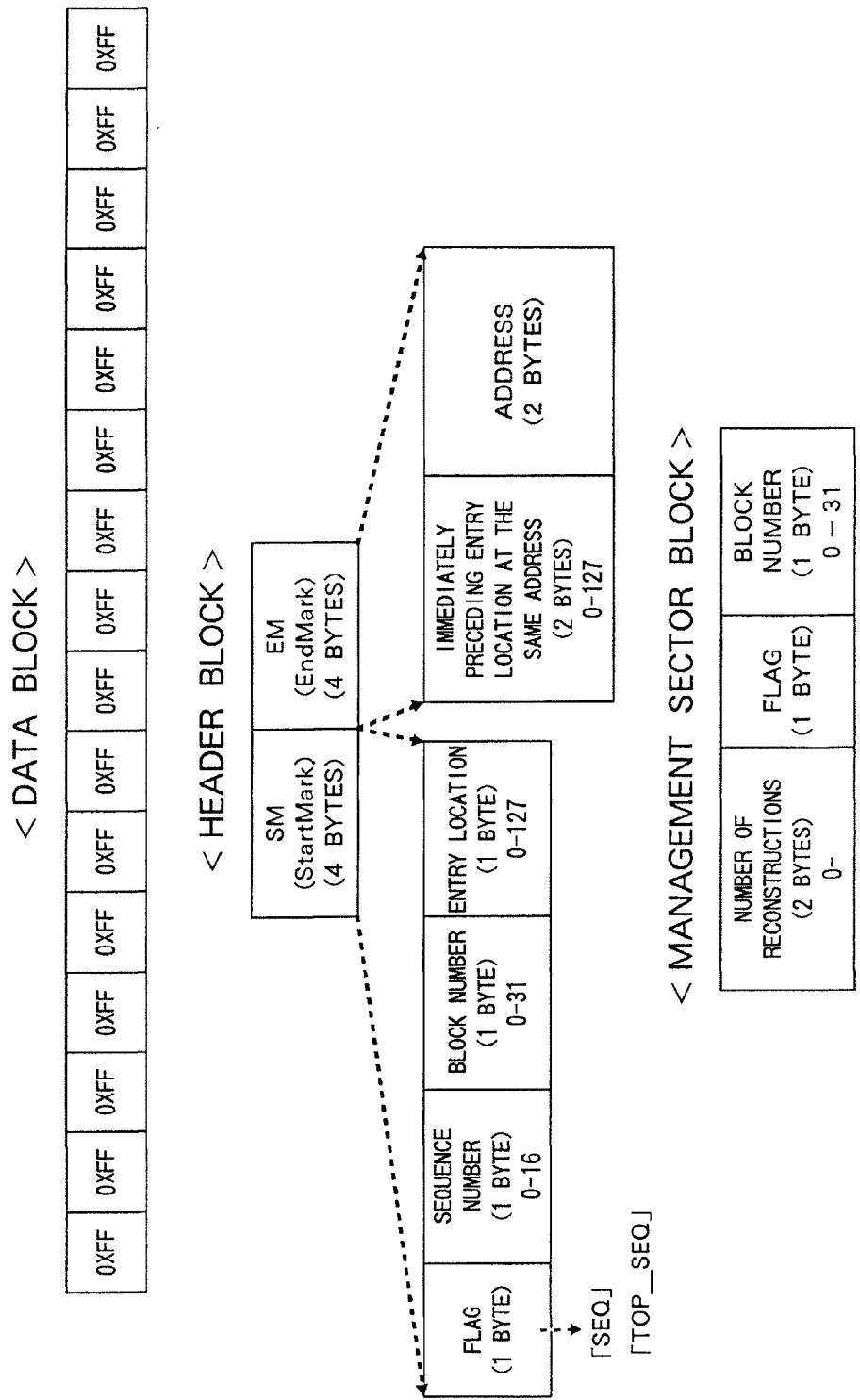
FIG. 5 is a view illustrating how a data block, a header block, and a management sector block are configured.

FIG. 5 shows how the entries of the data block of the real data block 223, the header block, and the management sector block 222 are allocated. Each entry of the data block has a fixed length of 16 bytes as shown in the upper part of FIG. 5. The structure of the write cells is similar to that of the entry b11 shown in FIG. 3(a) (the address in FIG. 3(a) is an expression for the sake of convenience). The header block in this example uses the feature of atomically confirming the existence of 4 bytes written into the flash memory 6, provided that the minimum write unit is 4 bytes in size. In other words, the header is defined as a start mark zone (StartMark: referred to as SM) of 4 bytes and an end mark zone (EndMark: referred to as EM) of 4 bytes. The write operation at a given address is carried out in the order of SM, the data block, and EM. By performing the write operation in this order, whether or not the data is actually written into the data block can be determined readily according to whether or not the EM has been written successfully.

The written EM address indicates successful operation to write data, so that it is in fact unnecessary to atomically confirm the write operation for 4 bytes. Instead, it is enough that the write operation for 1 byte is atomically confirmed.

The SM contains 4 bytes: a flag (1 byte), a sequence number (1 byte), a block number (1 byte) and an entry location (1 byte). The flag and the sequence number are used to ensure that operations to write data piece by piece in multiple times at certain addresses are all executed sequentially. According to this, a 256-byte data is divided and written separately by sixteen times because each data block has the fixed length of 16 bytes. The flag and the sequence number are used to ensure that sixteen write operations are all executed sequentially. The sequence number indicates what number each write operation is. The flag is set to either "SEQ" or "TOP_SEQ". The former indicates that a sequence number is valid while the latter represents the first sequence number. The search will be made in the order from the entry that has been loaded most recently. The sequence numbers are decremented as the write operations proceed. Thus, when the flag is set to "SEQ" and the sequence number is equal to "0" at the time of search, the data segments back to the flag "TOP_SEQ" can be considered to be valid that have been written successfully into the data block. On the other hand, when the flag is set to "SEQ" and the sequence number is other than "0" at the time of search, the data segments back to the flag "TOP_SEQ" are considered as not existing there.

The block number is a number for use in identifying what number the subject data block is. The entry location indicates what number the entry of the block is. The block number in this example is one of "0" to "255". The entry location is one of "0" to "127" as long as the data has a fixed length of 16 bytes and each block has 2 kB in size.

The block number and the entry location correspond to a physical address at which the data segment is actually written.

The EM is made up of 4 bytes: an immediately preceding entry location at the same address (2 bytes) and an address (2 bytes). The immediately preceding entry location is a data that is necessary for the rearrangement. The rearrangement will be described in detail later. The addresses are 16-byte aligned (fixed length). When a data segment is written at a certain address, the address is read and a new data segment is written. As a result, as the latest data segment at that address, it is enough to read only the most recent version of the data segment that has been written there. This address corresponds to the logical address associated with the entry location (physical address) and the block number of the SM.

With the SM and EM having the aforementioned configuration, whether or not a data segment has been written successfully at a certain address can be determined quickly merely by means of referring to the content of the EM before searching for the data segment at that address.

The management sector block 222 is made up of 4 bytes: the number of rearrangements (2 bytes), a flag (1 byte), and a block number (1 byte) (lower part of FIG. 5). The number of rearrangements indicates how many times the rearrangement is made up to the present. The "block number" is a block number for use in identifying the real data block 223 being used. The flag indicates a current status of that block. The flag is set to one of "under rearrangement", "header", "data", and "rearrangement complete". The "header" and the "data" indicate the content of that block. The block number is selected from empty blocks. The empty block in this example is determined by using a known function in such a manner that when the block is determined as an empty block when it has already been erased.

As will be described later, the rearrangement results in erasure of, information in the blocks (including entries) that was contained before the rearrangement. Therefore, the aforementioned empty block is an erased block. No problem will arise when the erased block provides [0xFF] indicating that all cells in the block are not written with any data. However, a bad block into which nothing can be written may possibly appear. In such cases, a flag in the management sector block 222 may be set to a "bad block" and the first entry of the block suspected to be a bad block may be used for test-write purpose to determine whether it is a bad one. However, it is not as reliable as it should be when the block is examined by using only one or some of the entries. Taking the fact that an empty block is selected only during the rearrangement into consideration, all you need is a mechanism to skip an entry if the entry cannot be written with data.

The memory control device 1 determines whether or not the rearrangement is necessary when the flash memory 6 is initialized. It operates routinely when the rearrangement has been completed. Even if a power failure arises during this routine operation, the data is assured without any special processing as long as it is written in the order of SM, the real data block, and the EM.

<Operations>

Next, operations of the memory control device 1 are described specifically.

1. Read Operation

How the data contained in the flash memory 6 is read is described with reference to a process-flow diagram in FIG. 6 and a diagram illustrating a memory state in FIG. 11. This operation is executed when the processor unit 2 serves as read processing means.

Figure 11:
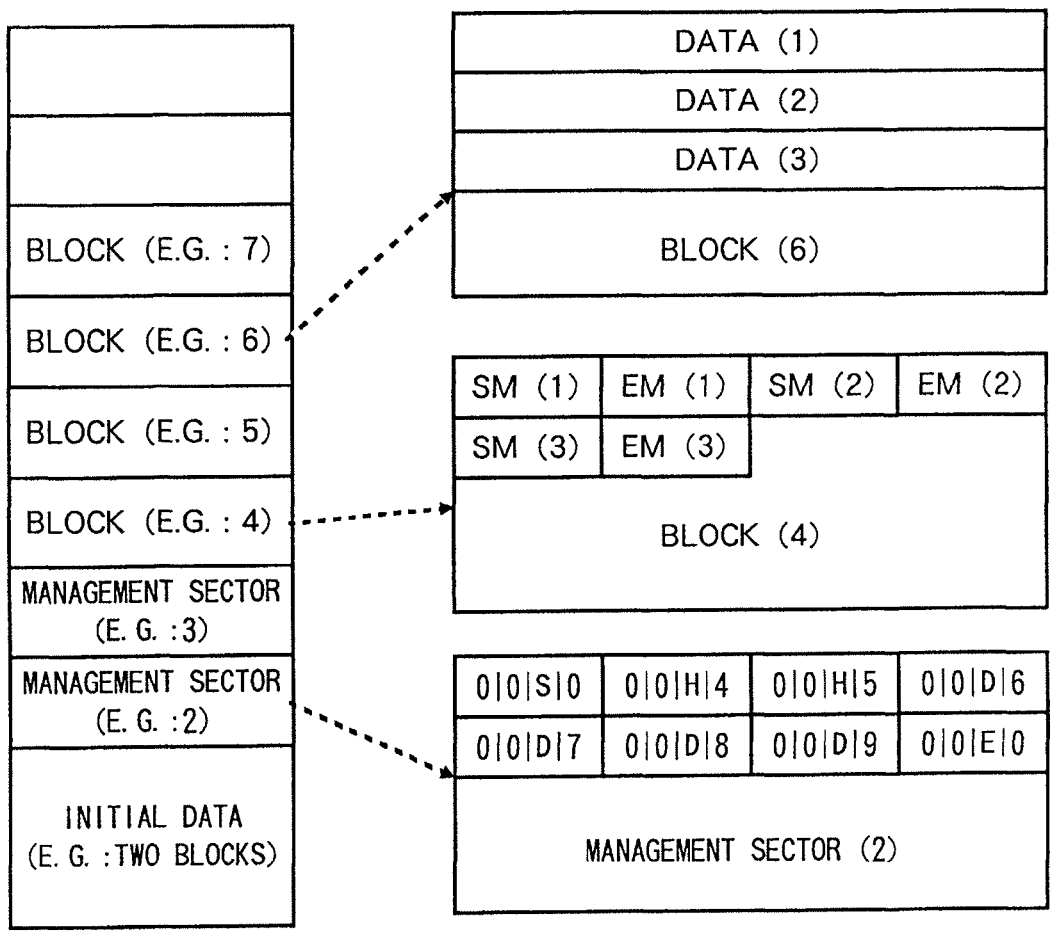
FIG. 11 is a view illustrating a content of an entry in an allocated sector just before data is written.

It is assumed that the flash memory 6 is in a state as shown in FIG. 11. In FIG. 11 in reference to FIG. 4, "initial data" corresponds to the initial data block 221, "management sector" to the management sector block 222, and other blocks to the real data block 223. The number appended to each block represents a block number which is one of "0" to "31". The entry "0|0|S|0" of the entries of the management sector shown in the right part of FIG. 11 indicates that the rearrangement is not started with the empty block number being "0", i.e., the initial data block 221 which is to be a candidate to be searched just after the flag "under rearrangement (S)". The entries "0|0|H|4" and 0|0|H|5" indicate that blocks (4) and (5) are used as the header block (H) of the real data block 223. The entries "0|0|D|6" to "0|0|D|9" indicate that blocks (6), (7), (8), and (9) are retained as the data block (D) of the real data block 223. The entry "0|0|E|0" indicates that the flag "rearrangement complete (E)" is "0", i.e., the rearrangement has been completed.

The entry of the header block (4) indicates that three data fragments, data fragment (1) to data fragment (3), are successfully written into the first data block (6) of the retained data blocks. In other words, the data fragments are written in the order of SM(1) and EM(1) for the data fragment (1), SM(2) and EM(2) for the data fragment (2), and SM(3) and EM(3) for the data fragment (3).

The memory control device 1 calculates block information according to an address input for the data to be read that is specified by a program issuing a request to read the data (step R101). The block information as used herein is information that can be identified from the entries written in the header block (4) and the aforementioned management sector (2).

Thereafter, an address alignment (a_addr) and an offset (offset) are calculated (step R102). The address alignment (a_addr) is on a multiple of 16 bytes of the address (addr). For example, it is assumed that the data to be read is located beginning at the first address (addr) of [0X3612]. This address is included in the address alignment (a_addr) from [0X3610], and the difference "2" between them is the offset (offset). The data segments at the addresses calculated at the step R102 are read (step R103). Those for necessary data segments are stored in a buffer (buf) in the working memory 5, and the size of the remainder is calculated (step R104). The term those for necessary data segments as used herein is a value of either "16-offset" or size (size) which is smaller. The size of the remainder is a difference obtained by subtracting (16−offset) from the size (size). This is saved on the buffer as a new size (size). If there's a size of the remainder then the subsequent alignment address is calculated, and the offset is set to "0" to return to the process at the step R103 (step R105: Yes, R106). If there is no size of the remainder, the read data that is a result of the operation is returned to the requesting source and the process is terminated (step R105: No, R107).

2. Data Write Operation

Next, the data write operation is described with reference to FIGS. 7 to 9. It is assumed that the flash memory 6 just before being written is in the state as shown in FIG. 11. This operation is executed when the processor unit 2 serves as write processing means.

Figure 7:
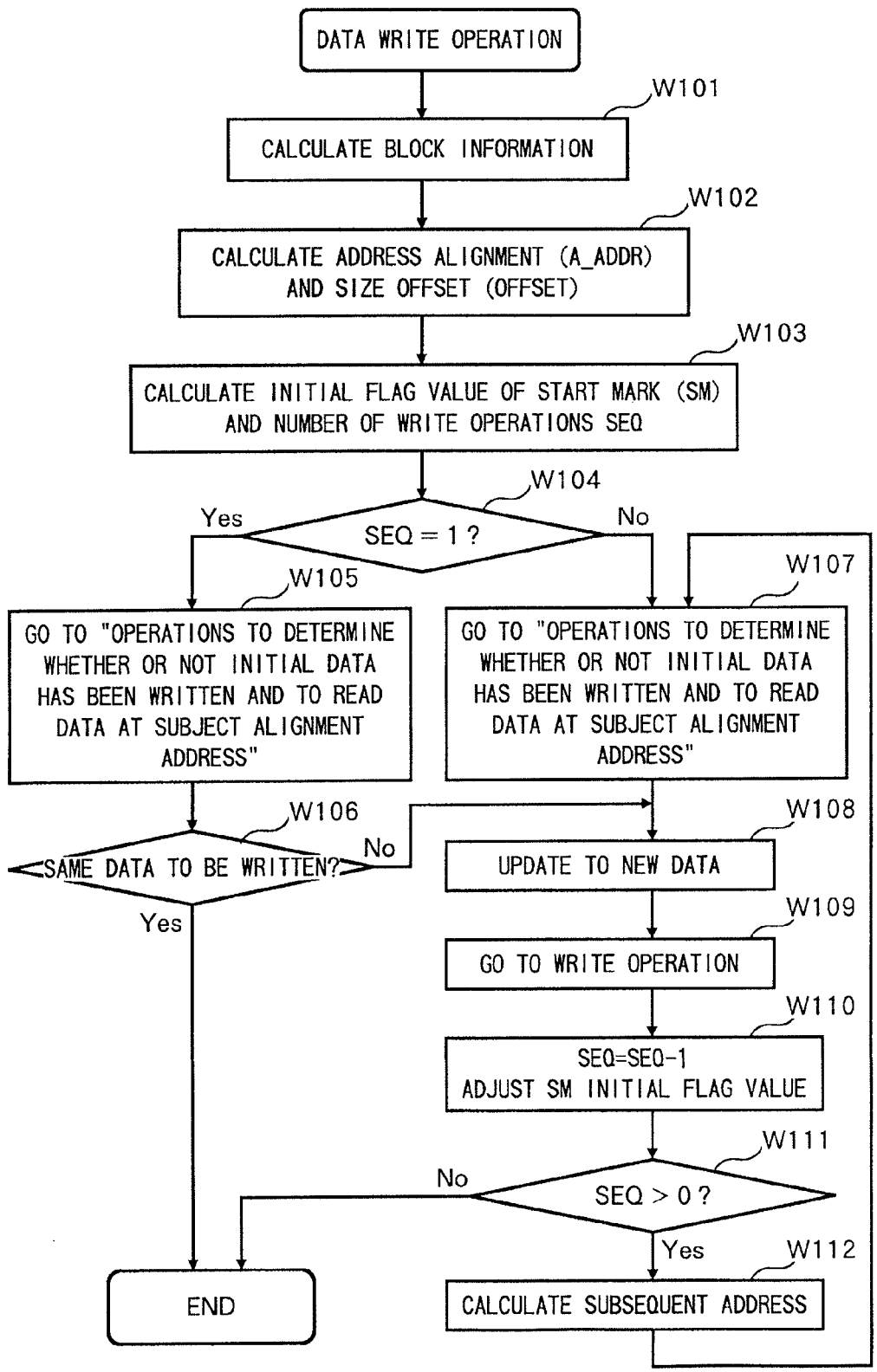
FIG. 7 is a process-flow diagram illustrating a data write operation.

Referring to FIG. 7, the memory control device 1 first calculates the block information in response to a data write request (step W101). The block information is as described above. Then, it calculates an address alignment (a_addr) which is available for writing, and a size offset (offset) (step W102). It determines an initial flag value for the SM and the number of divided write cycles SEQ (step W103). It determines whether "SEQ=1" or not, and if "SEQ=1" is satisfied (step W104: Yes), then the process goes to operations to determine whether or not the initial data has been written and to read the data at the alignment address (step W105). When the same data is going to be written, then the process is terminated (step W106: Yes).

In this example, the number of divided write cycles SEQ is equal to "2" when the size (size) is equal to 16 bytes. That is, the last data segment was written at the address (addr) [0X3612] and the offset (offset) is "2" in the state just before writing, so that only 14 bytes can be written first. The remaining 2 bytes are written into the subsequent data block in the second time. This means that the write operation is divided into two cycles and thus the SEQ is equal to "2".

Thus, the process goes to operations to determine whether or not initial data has been written and to read the data at the alignment address (step W104: No, W107). The data is updated to a new data (step W108) and the process goes to the write operation (step W109). The write operation will be described later. At the step W106, even when the same data is not to be written, the process goes to the operation at the step W108. After the write operation, an operation of "SEQ-1" is performed to adjust the initial flag value for the SM (step W110). It determines "SEQ>0?" and if it is affirmative, then the subsequent address is calculated (step W111: Yes, W112), and the process goes to the step W107. If the "SEQ>0" is negative, then the process is terminated (step W111: No).

Figure 8:
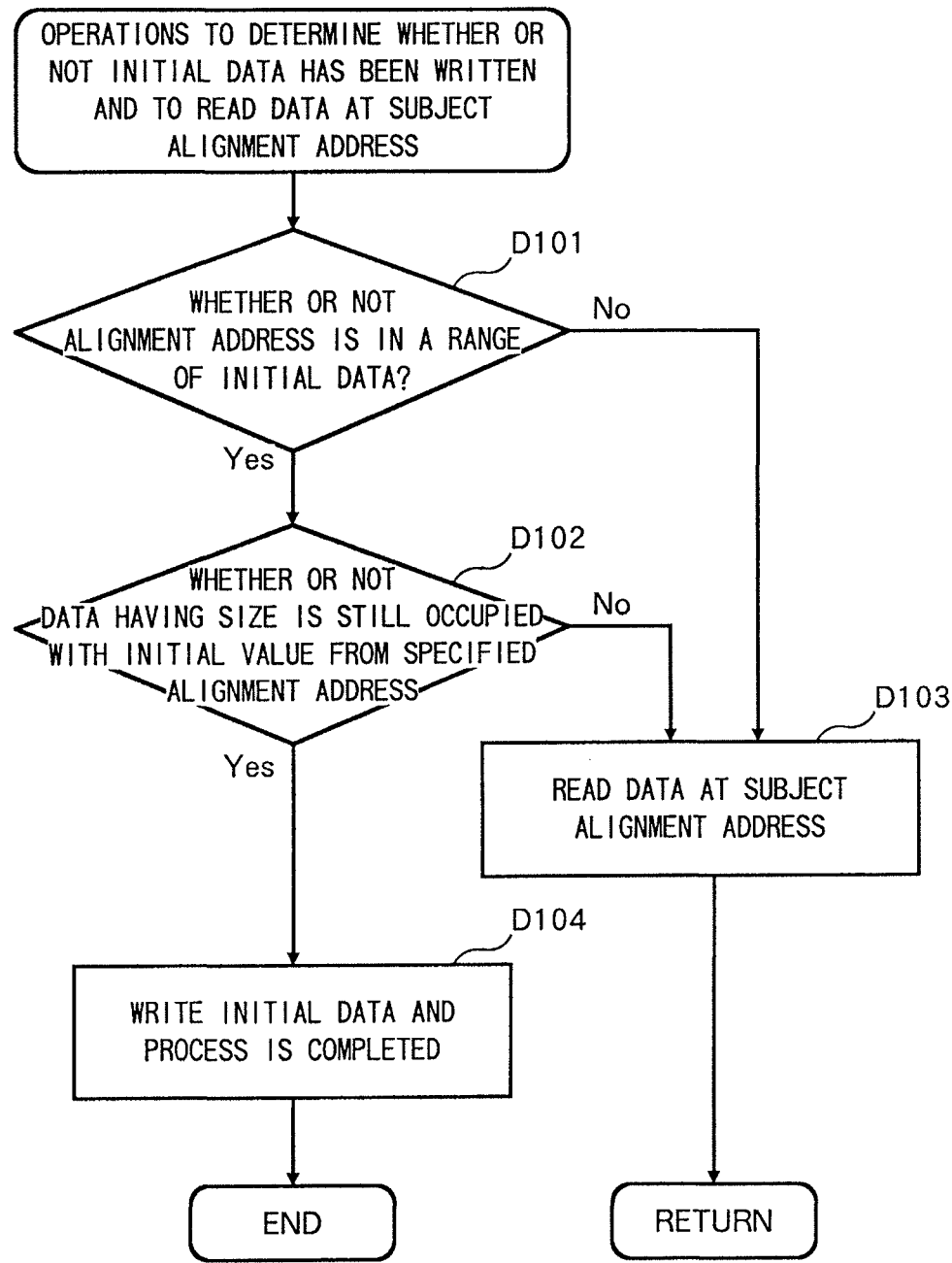
FIG. 8 is a process-flow diagram (partially detailed diagram) illustrating the data write operation.

The operations to determine whether or not the initial data has been written and to read the data at the alignment address at the steps W105 and W107 in FIG. 7 are performed according to the procedure shown in FIG. 8. More specifically, the memory control device 1 determines whether or not the alignment address specified by the program is in a range of the initial data (step D101). If it is, then it determines whether or not the data having the size (size) is still occupied with the initial value(s) (0XFF) from the alignment address in the initial data block 221 (FIG. 4) (step D101: Yes, D102). The initial value (0XFF) as used herein is different from the initial data and indicates that nothing has been written there. If it is occupied with this initial value(s) (0XFF), then the current written data is used as the initial data and is written into the initial data block 221 to complete the write operation (step D102: Yes, D104). On the other hand, when the alignment address is not in the range of the initial data, or when it is but the data having the size is not occupied with the initial value (s) (0XFF) from the specified alignment address, i.e., when it has already been written as the initial data (step D101: No, D102: No), then the data at the alignment address is read (step D103) and the process goes back to the original routine.

Figure 9:
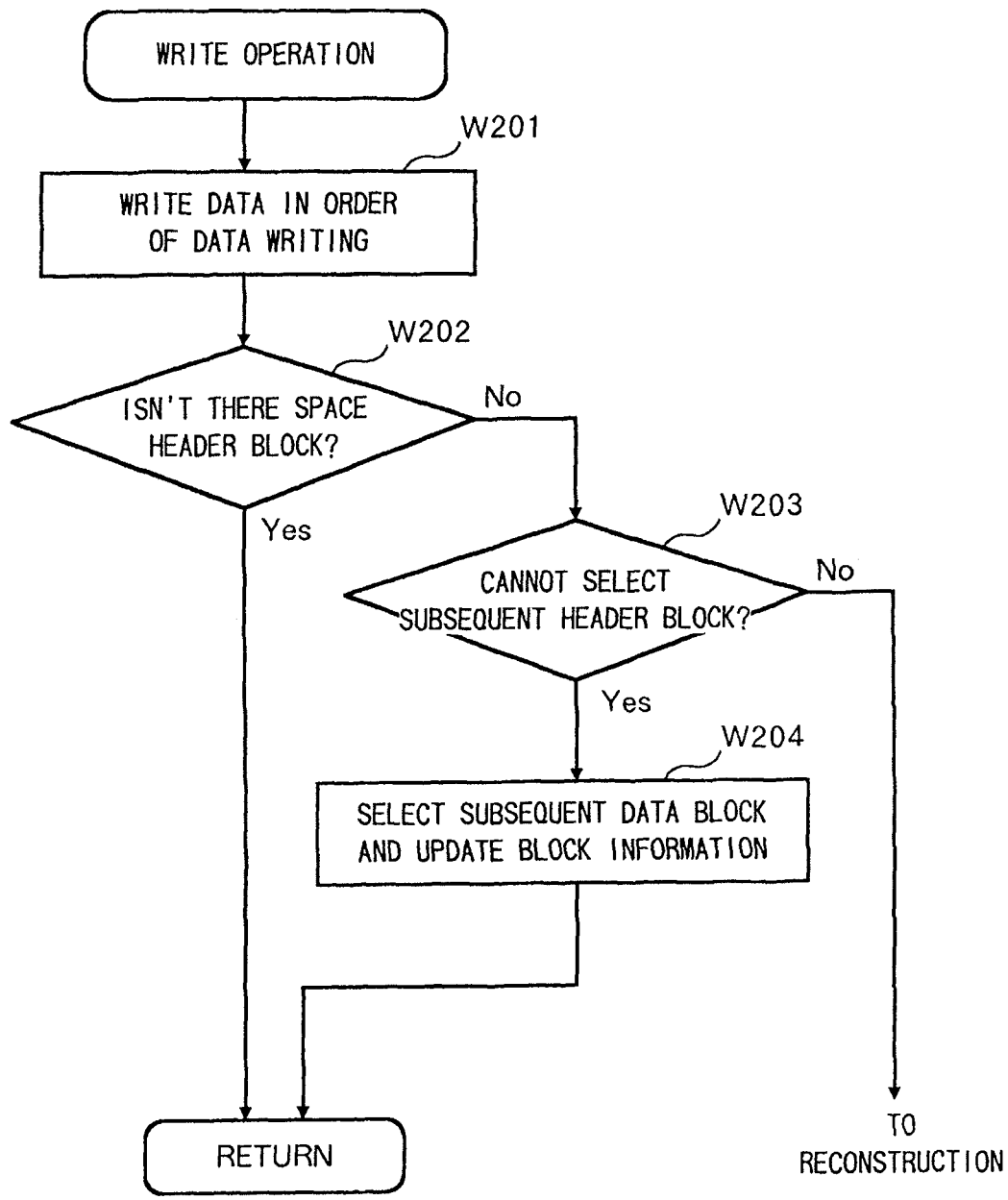
FIG. 9 is a process-flow diagram (partially detailed diagram) illustrating the data write operation.

The write operation at the step W109 in FIG. 7 is performed according to the procedure shown in FIG. 9.

The memory control device 1 writes the data in the order of data writing (in the order of SM, data, and EM) (step W201). Thereafter, it determines whether or not there is a space in the sector of the header block. If any, then the process goes back to the data write operation (step W202: No). If there is no blank sector in the sector of the header block, then it is determined whether or not the subsequent header block can be selected (step W202: Yes, W203). If it can be selected, then the subsequent header block is selected and the block information is updated (step W203, W204). Then, the process goes back to the routine from which it was called. If, at the step W203, it can be determined that the subsequent header block sector cannot be selected, then the process goes to an operation of rearrangement (step W203: Yes).

Figure 12:
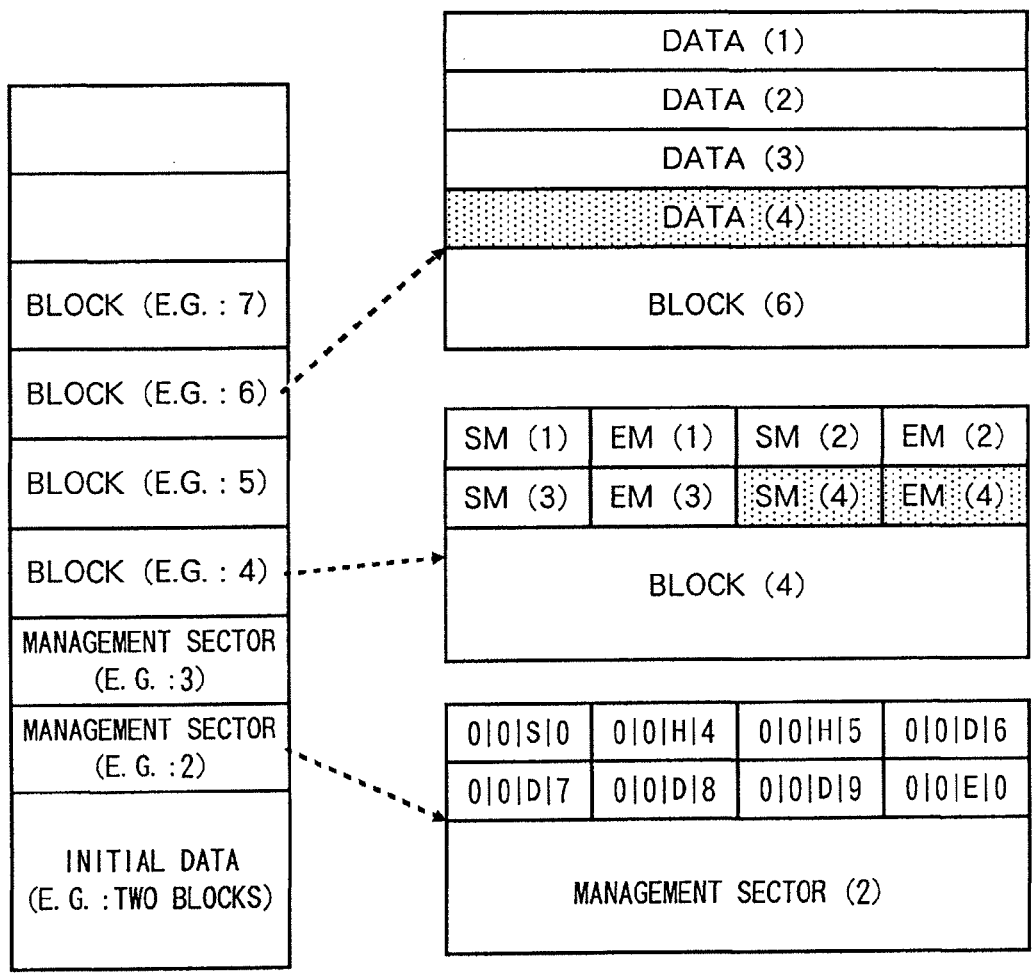
FIG. 12 is a view illustrating a content of the entry in the allocated sector after data has been written.

As a result of the aforementioned operations described in conjunction with FIGS. 7 to 9, the flash memory 6 is shifted to a condition as shown in FIG. 12. As a result of the data segment (4) being written, the content of the header block (4) is also updated. No change occurs in the management sector (2).

3. Reconstruction

Figure 13:
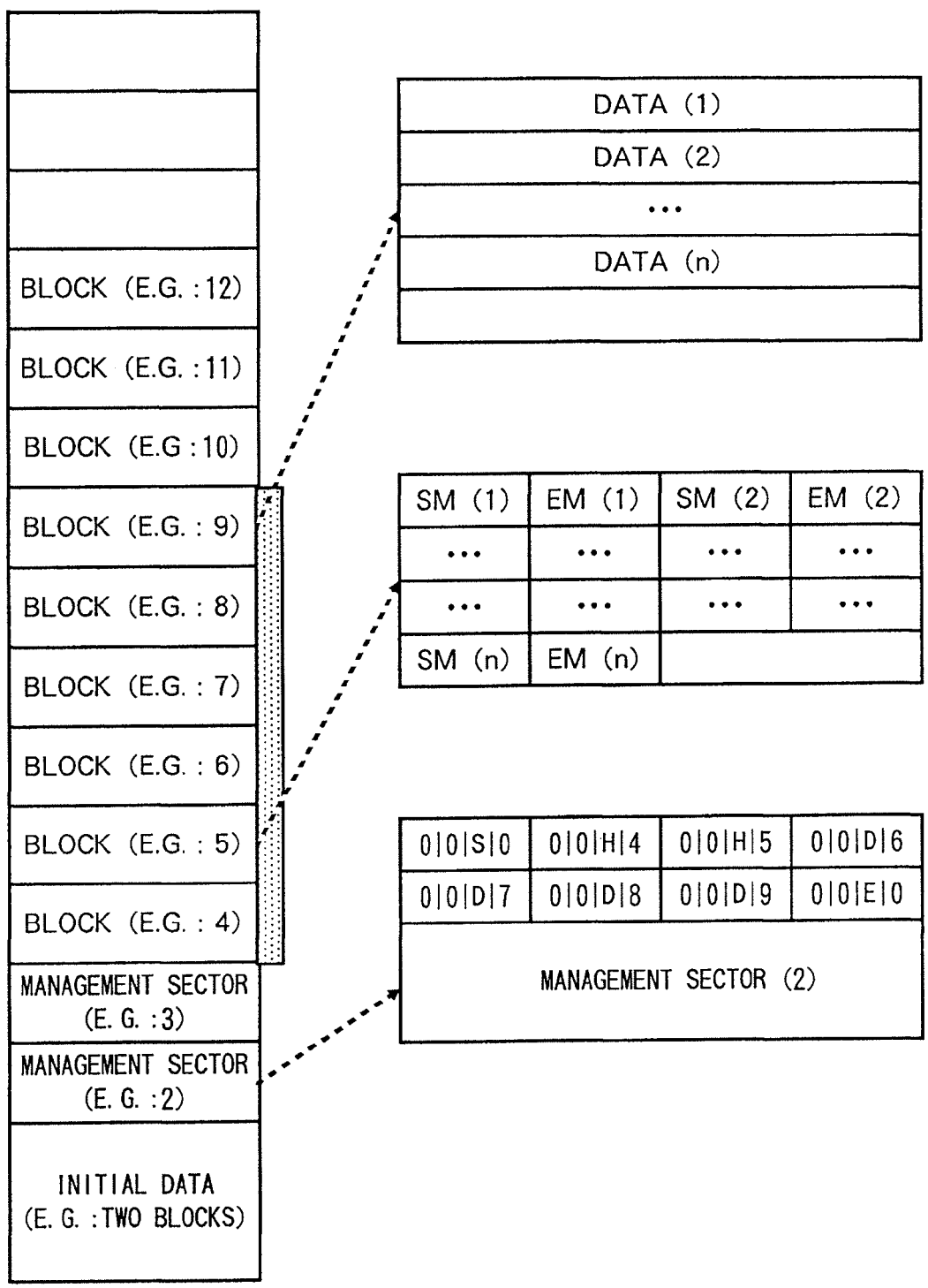
FIG. 13 is a view illustrating a content of the entry in the allocated sector just before rearrangement.
Figure 14:
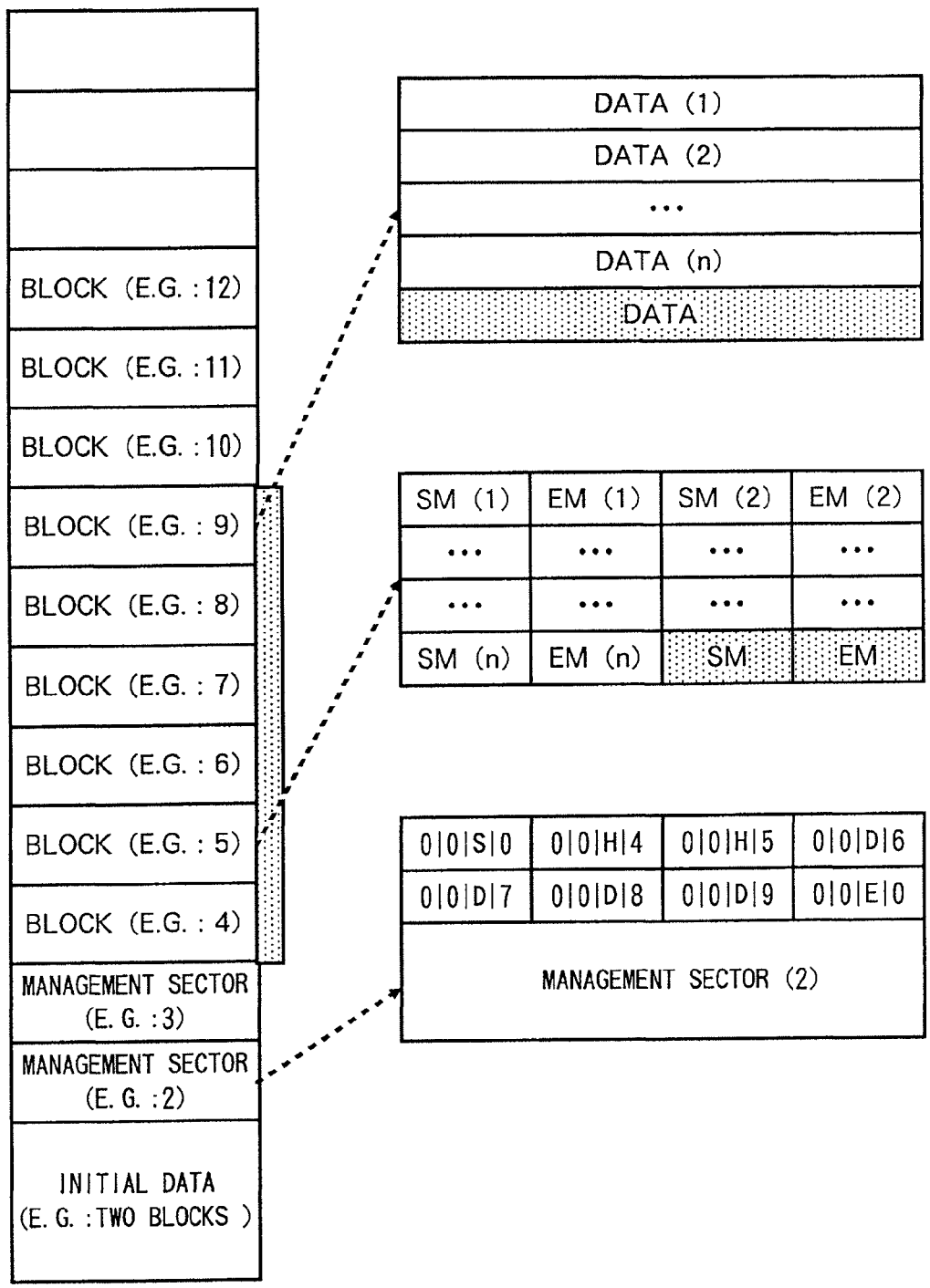
FIG. 14 is a view illustrating a content of the entry in the allocated sector under rearrangement.

An operation of rearrangement is described with reference to a process flow diagram in FIG. 10 and a memory configuration diagram in FIGS. 13 to 15. This operation is executed when the processor unit 2 serves as rearrangement processing means and various detecting means.

The rearrangement is performed when the write operation is carried out by the write processing means and when the processor unit 2 serving as the detecting means senses abortion due to, for example, a power failure or recovery from such abortion. It is not performed during the read operation. This is for the purpose of ensuring a worst case associated with the speed of the read operation.

3-1. Reconstruction During Write Operation

First, described is how rearrangement is performed during the write operation. More specifically, it is assumed that the flash memory 6 is in a state as shown in FIG. 13 just before the rearrangement and new data segment is added as shown in FIG. 14. FIG. 13 shows a state in which only the SM and EM for a single data segment can be written into the second header block (5) (511 data segments (n) have already been written), while FIG. 14 shows a state in which the SM and EM for this single data segment is written (the 512-th operation is made for writing the data segment to add the SM and EM of the header block).

Figure 10:
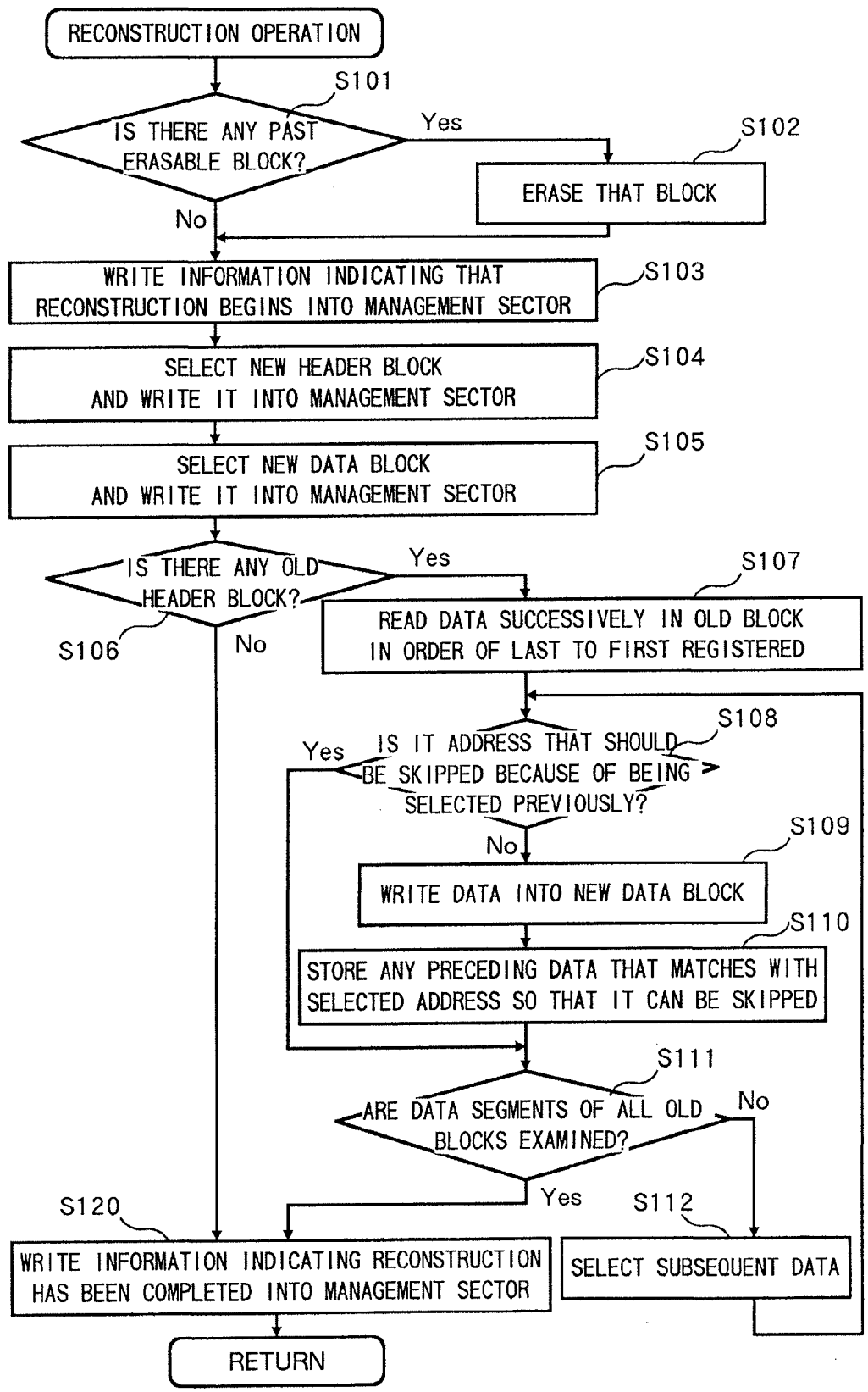
FIG. 10 is a process-flow diagram for rearrangement.

The memory control device 1 checks whether or not there is any past erasable block as shown in FIG. 10 (step S101). The past erasable block means a block of which content has been rewritten. If any, the block is erased (step S101: Yes, S102). If there is no erasable block, or there was an erasable block but has been erased, information indicating the beginning of the rearrangement is written into the management sector block 222 (step S101: No, S103).

A new header block is selected and is written into the management sector (step S104). In addition, a new data block is selected and is written into the management sector (step S105). In order to perform the rearrangement every 512 write operations, two header blocks and four data blocks are selected. In other words, six blocks are consumed for the rearrangement. Since 256 headers can be retained for a single header block, two header blocks are necessary to retain 512 headers. The data block contains a data sector having a fixed length of 16 bytes and is 2 kB in block size. Accordingly, 128 operations can be carried out for each block, and 512 operations require four blocks. The entry of the management sector blocks 222 shown in the right part of FIGS. 11 and 12 is based on the above that is performed after initialization. For the rearrangement, additional six blocks should be retained.

The memory control device 1 checks whether or not there is any old header block (step S106). If any, it reads the data in the old header block in the order of last to first registered (step S107). It is checked whether or not it is the address that should be skipped because of being selected previously. If not, then the data is written into a new data block (step S108: No, S109). Then, any preceding data that matches with the selected address is no more necessary, and it is stored in a buffer so that it can be skipped (step S110).

At the step S108, if it is the address that should be skipped (step S108: Yes), or is stored so that it can be skipped, it is checked whether or not the data segments of all old blocks have been examined (step S111). If there is any unexamined block data segment(s), the process goes back to the operation at the step S108 (step S111: No, S112).

If the data segments of all old blocks have been examined or there is no old header block at the step S106 (step S106), then the information indicating the rearrangement has been completed is written into the management sector and the process goes back to a ready state for the subsequent write operation(s) (step S120).

When the rearrangement has been completed, the real data block immediately before that becomes unnecessary, i.e., an additional unnecessary real data block (referred to as a former real data block). The former real data block is not deleted at this stage of operation and is kept until the subsequent rearrangement is carried out. This is because the former real data block may not be deleted before the rearrangement complete is written, as well as because complication of the whole operation is avoided that would otherwise occur when a flag indicating that it is not deleted exists and therefore considerations are increased for the later-described rearrangement during the recovery.

When the former real data block is deleted, the "immediately preceding entry location at the same address" of the EM of the entry in the management sector block 222 becomes useful. In other words, old data is linked and reveals where it locates, which can avoid possible elongation of the time required for the rearrangement.

Figure 15:
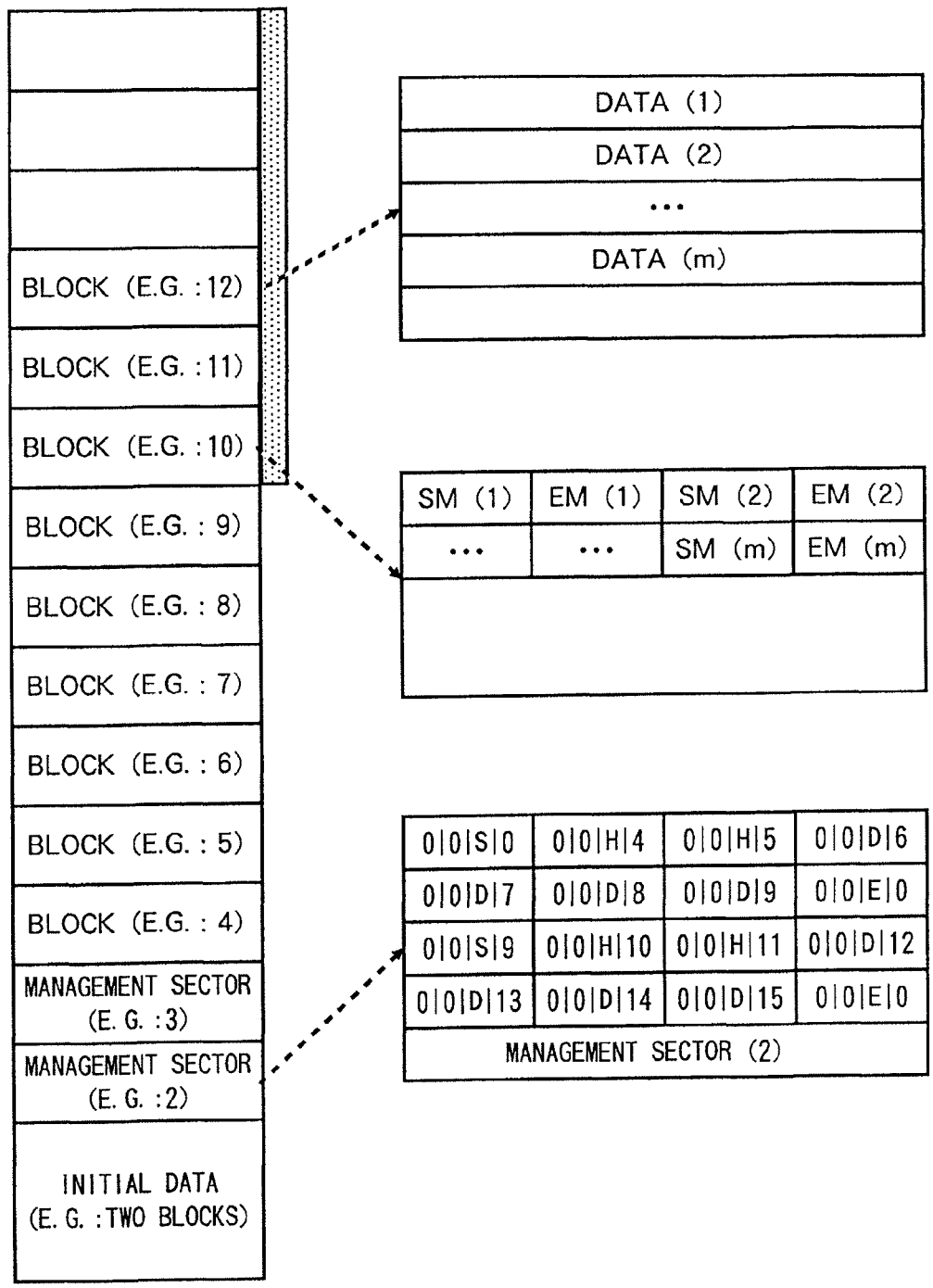
FIG. 15 is a view illustrating a content of the entry in the allocated sector after rearrangement.

FIG. 15 shows a state of a memory when the rearrangement has been completed. The entry added to the management sector block 222 is as follows: the first block number to be searched under rearrangement (S) is "9", new blocks (10) and (11) are retained for the header block, and blocks (12) to (15) are retained for the data block. The data segment (1) to data segment (m) are copied and the entry of the header block is changed to SM(1), EM(1) to SM(m), EM(m). By searching in the reverse order from the most recent entry, there is a rearrangement complete (E). With this, it is ensured that the rearrangement has been completed successfully in this flash memory 6.

3-2. Reconstruction During Recovery

In the rearrangement during the recovery, the header blocks and the data blocks that are being used are selected again rather than new header blocks and data blocks are selected for the two header blocks and four data blocks at the aforementioned steps S104 and S105. This is for the purpose of allowing the detecting means to readily sense a problem such as a power failure during the rearrangement and reducing a risk such as an unavoidable state which otherwise can possibly occur because no re-allocation is carried out.

In this case, it is expected that the header block and the data block into which some but not all data segments have already been written may be selected. However, it is normally ensured that the same data segments are written as long as the same algorithm is used for the rearrangement. Under such a situation, if the same data segments as those currently used are to be written, they are not directly written into a non-volatile memory. This is similar to a normal operation to increase the speed of writing data.

As apparent from the above, in the memory control device 1 according to the first embodiment, the data is written into the flash memory 6 by repeatedly using the rearrangement and the characteristic EEPROM emulation for which the address architecture can be generalized to write the data. This can eliminate intensive traffic at a certain given address which otherwise occurs frequently when the flash memory is used in a conventional normal mode of use, which equalizes the operation of writing the data. As a result, memory can be written without any losses, significantly increasing the number of times the data can be written. For example, flash memories which are guaranteed for about only 1,000 cycles of reprogramming with a conventional write architecture, can be guaranteed for about 100,000 cycles of reprogramming as will be described later. This means that flash memories can be used as a substitute for EEPROMS of this level.

In addition, this approach is superior in safety considerations because even if a problem such as a power failure arises the most recent version of the data that has been written before the problem arises can be recovered since unwanted blocks are left without being deleted until the subsequent rearrangement begins.

<Performance>

Next, performance of the memory control device 1 according to the first embodiment is described.

In the memory configuration according to this embodiment, the number of times data can be written into the management sector block 222 is much larger than the number of times data can be written into the real data block 223. Therefore, when the two management sector blocks 222 are each guaranteed for about 50 to 100 erase cycles, operation is not usually affected even when one of the management sector blocks suddenly becomes a bad block before it reaches to 1,000 cycles. Furthermore, what is required for the initial data block 211 is that data can be written into it, and no problem arises even when each block is not erasable. This is significantly superior in cost considerations.

Next, described is how many write cycles the memory control according to the first embodiment can increase.

With the mechanism as described above, only twenty-eight real data blocks 223 out of the thirty-two blocks of each cluster shown in FIG. 4 are affected by the number of times the data can be written. The number of times data can be written may be varied depending on some factors. Typical factors include data size (R byte(s)) to be used for the rearrangement, the number of bytes to be used for the fixed length of the data sector (fixed length of 16 bytes in the example above), and the number of headers to be used until the subsequent rearrangement is carried out. The more the headers are used, the less frequently the rearrangement is carried out, and thereby the more write requests can be achieved. However, this elongates an interval between the headers, so that it takes a longer period of time to achieve the search. Accordingly, in practice, the optimum number of times the data can be written is determined while taking the various factors into considerations.

As to the example described above, the data sector has a fixed length of 16 bytes. The number of the headers, i.e., the data size to be used for the rearrangement is equal to R/16. In addition, each block has a size of 2 kB, so that the number of times data can be written per one block is equal to 2 kb/16 (=128) times. When the rearrangement is carried out every 512 write operations, six blocks out of the twenty-eight blocks are used as described above.

Accordingly, the number of the write requests, i.e., the number of times data can be written is equal to (512−R/16)× 1,000×28/6 times per one cluster because single block is guaranteed for 1000 write cycles. When the aforementioned R is equal to 3 kB, then the number of times data can be written per one cluster is equal to 1,490,000 times. As apparent from the above, the memory control device 1 according to the first embodiment can provide the number of times data can be written that is comparable to that of EEPROMs.

<Initial Data>

The initial data to be written into the initial data block 221 is not overwritten on the market. Therefore, when an address associated with initial data is specified, then that initial data is used. Otherwise, a value obtained through the EEPROM emulation can be used.

For example, in the first embodiment, the addresses [0X3000] to [0X3100] are retained for the initial data. The addresses [0X3600] to [0X3700] may be used as sectors into which data to set parameter values to be referred to during execution of multimedia processing (e.g., sound ON/OFF and resolution) and API (Application Programming Interface) are written. In this case, it is used in a manner that if a request for reading 16-byte data is made from the upper address [0X3000], the initial data is returned, and if a request for reading 16-byte data (API) is made from the lower address [0X3600], the data written by using the EEPROM emulation is returned. However, it is sometimes desirable to overwrite value(s) of the initial data for debugging purposes or even on the market. In addition, it is convenient if the initial data to be written and the data such as API to be written on the market can be read and written at a certain given address irrespective of which is which.

In such a situation, the flash memory 6 can be used conveniently by means of carrying out the processing according to the following procedures.

First, in order to determine a range to be used as the initial data, addresses are previously specified on the program using which the flash memory 6 is accessed. For example, addresses [0X3000] to [0X3100] are used as that range. The first write operation at the address [0X3000] is directly made to the initial data block 221 shown in FIG. 4. The initial data is to be written, in principle, only once as described above. The second and later write operations are carried out by means of the aforementioned EEPROM emulation according to the first embodiment. In addition, it is also used for the sector search during the EEPROM emulation. The initial data block 221 is searched and, if the data is found, then the process is completed. If not, [0XFF] which indicates that no data is written is returned to a source requesting the search.

When the initial data is a data commonly used in the EEPROM emulation, the number of the write cells to be used for the rearrangement will be increased if the EEPROM emulation is carried out without this initial data. This increases the frequency of the rearrangement and can possibly reduce the total number of times data can be written. An advantage of using the initial data is that the frequency of the rearrangement can be reduced, which increases the total number of write cycles.

It should be noted that, although the first embodiment has thus been described in conjunction with a case where a flash memory is used as an example of a non-volatile memory, a characteristic feature of the present invention lies in the memory control to non-volatile memories and therefore any type of non-volatile memories other than the flash memories can be used.

In addition, although the first embodiment has been described in conjunction with an example of a 512-kB flash memory, the data size larger than or smaller than 512 kB may also be used.

Furthermore, although the first embodiment has been described in conjunction with an example where the data is written in a two-stage group of the entries and the blocks, the data may be written in a three-stage group or in the unit of entry.

Second Embodiment

Figure 16:
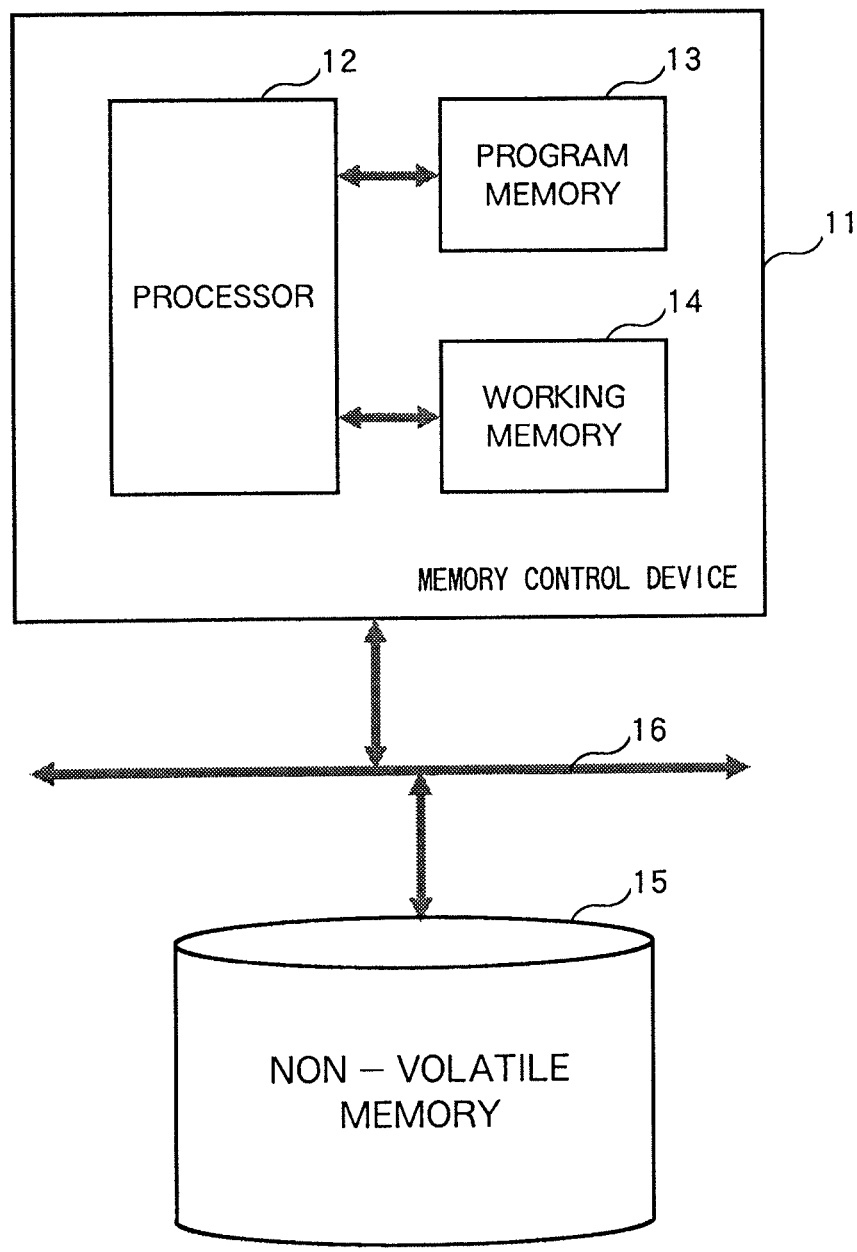
FIG. 16 is a view illustrating an entire structure of a memory control device which serves as a second embodiment of the present invention.

FIG. 16 is a view illustrating an entire structure of a memory control device which serves as a second embodiment of the present invention. This memory control device 11 comprises a processor 12, a program memory 13 in which a computer program of the present invention is stored, and a working memory 14 which is a volatile memory. The processor 12 loads the computer program into the working memory 14 and executes it to achieve functions of characteristic memory access control to a non-volatile memory 15 connected thereto through a data bus 16, i.e., accepting means, discriminating means, write processing means, and reading means. In the working memory 15, a buffer is defined that temporarily stores data, the accumulated total number of write operations, and a write rule.

[Non-Volatile Memory]

The non-volatile memory 15 is a memory medium such as an EEPROM or a flash memory in which non-volatile write cells can be formed. It is based on an address architecture, and can be managed by using IDs or labels (both are kinds of identification information) such as registries. The write cells are arranged in groups. In the description hereinafter, a smallest group of write cells as a unit being written is referred to as an entry. A group of two or more entries is referred to as a block.

The entries are sequentially associated by serial addresses. The sequential association of the entries may be achieved by, for example, the following procedures. Sequence numbers are assigned wherein the largest one of them has the number equal to the number of entries retained. The sequence numbers are sequentially updated in ascending order from the first entry to the numerical value indicating that it is the last entry, every time when the entry is successfully written with data. The updated sequence numbers are written into the header block (entry) as the flag information for that entry. The similar procedures apply to the blocks to associate them with each other.

Figure 17:
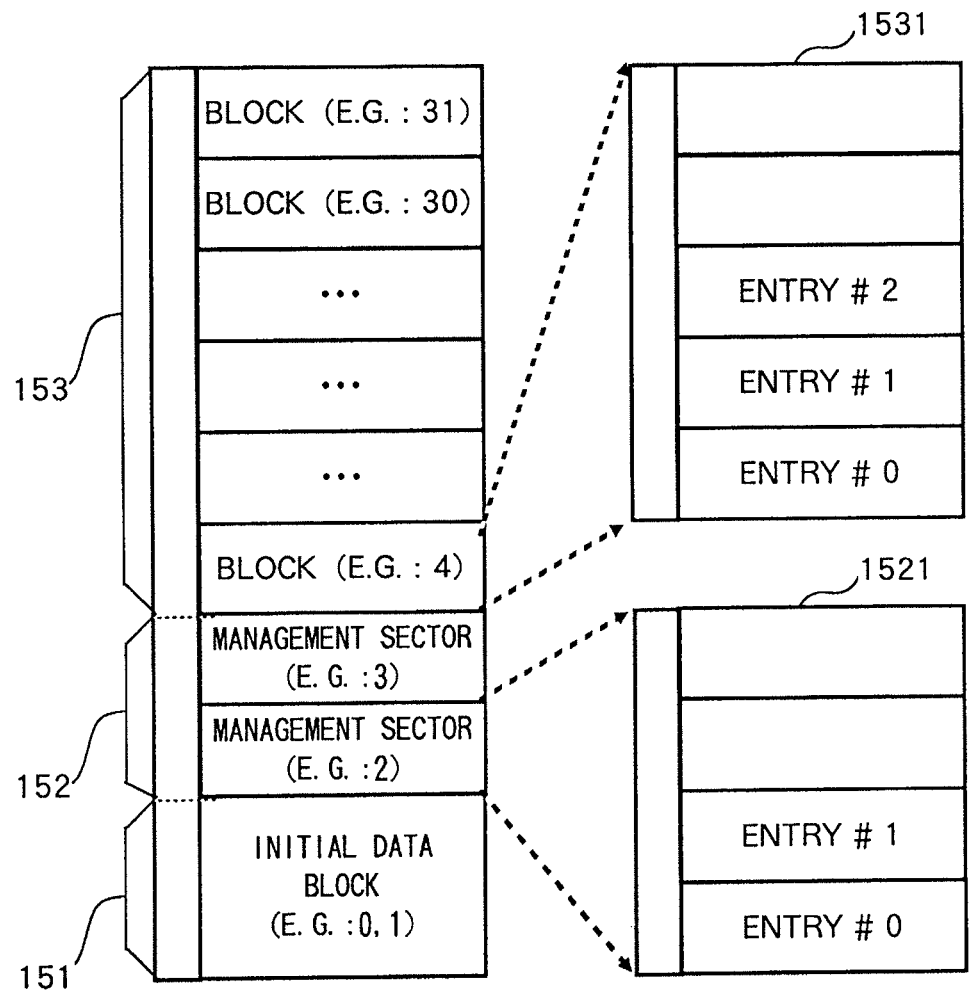
FIG. 17 is a view illustrating a configuration of a non-volatile memory.

An exemplary configuration of this non-volatile memory 15 is shown in FIG. 17. The non-volatile memory 15 is made up of multiple blocks. More specifically, it comprises an initial data block 151 for initial data, a management sector block 152, and a real data block 153. These blocks 151 to 153 are formed by the memory control device 11.

As the initial data block 151, a block or blocks are retained depending on the size of the initial data that is to be initially written into the non-volatile memory 15, for example, two blocks (e.g., two blocks denoted by 0 and 1 out of the blocks denoted by numerals of 0 to 31 when there are thirty-two blocks).

The initial data is a data to be written, in principle, only once, that is, a data that does not need to be rewritten. It may be referred to directly by, for example, a program for loading the data that has already been written. When there is no initial data, an initial value is provided. The initial value may be, for example, a value such as "FFH" or "0XFF". When the write cells of the initial data block 151 are occupied by the initial value, it indicates that nothing is written there. Accordingly, it can be written as the initial data. On the other hand, when the data having a size extending from a specified alignment address is not occupied with the initial value, it has already been written into it as the initial data.

As the management sector block 152, two blocks are allocated that are to be used alternately (e.g., two blocks denoted by 2 and 3). The management sector block 152 is a block into which management information is written. The management information indicates in what way the real data block 153 is structured currently.

The real data block 153 can be arbitrarily selected from either the header block or the real data block. The header block is a block into which header information is written. The header information indicates at which address of which real data block the data segment exists and what a write state it is kept in. The real data block is a block into which a data (referred to as a real data) is written that is obtained by the memory control device 1 externally (e.g., from applications) and handled actually in the device.

Each of the management sector block 152 and the real data block 153 has multiple entries. The entry is a sector into which a data having a predetermined data size is written as a single write unit, in a case of the real data block 153. The entries and other blocks are sequentially associated as described above. In the example shown in FIG. 17, entries 1521 for the management sector block 152 and entries 1531 for the real data block 153 are shown.

Figure 18:
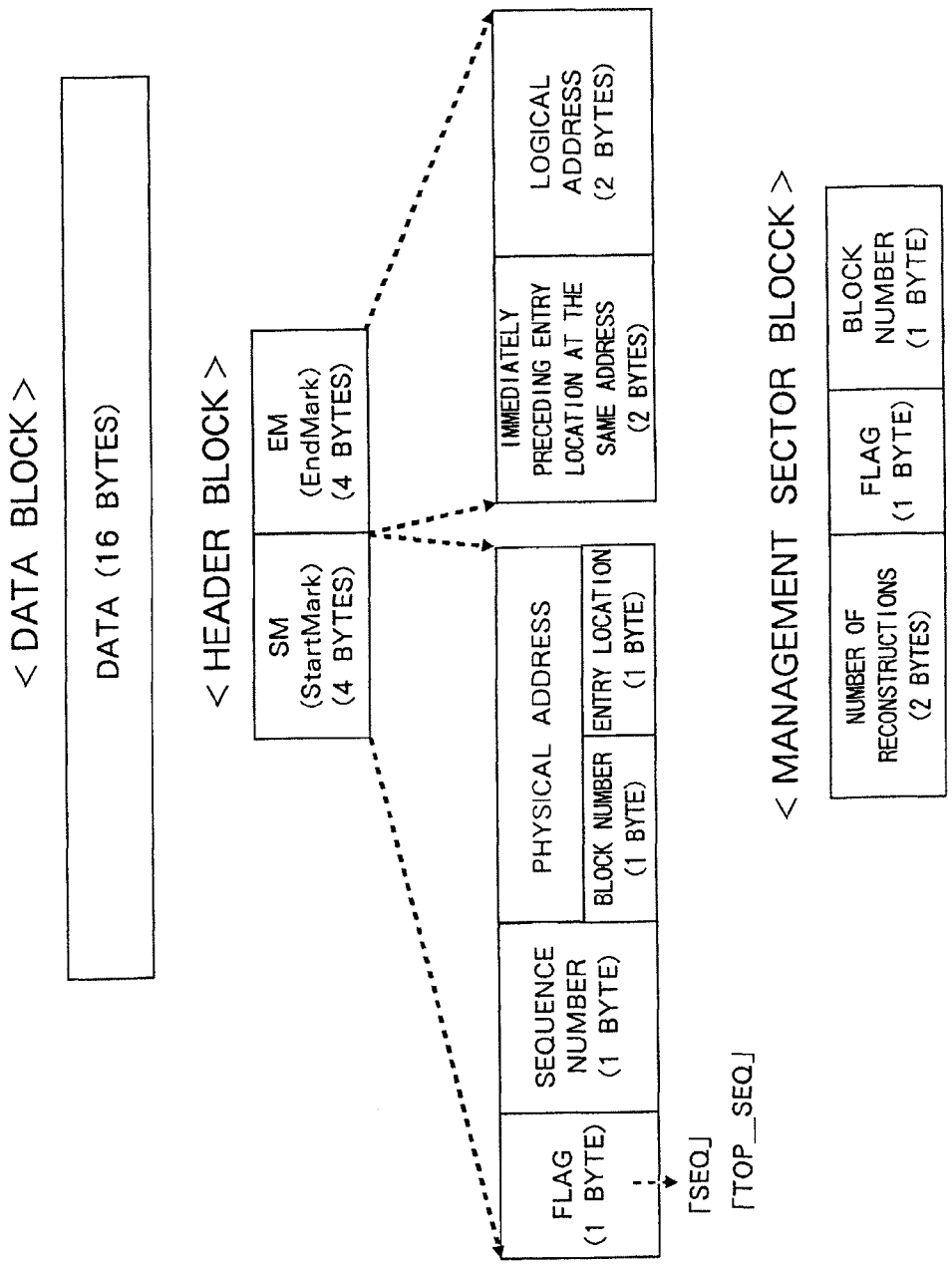
FIG. 18 is a view illustrating how a real data block, a header block, and a management sector block are configured.

FIG. 18 shows how the header block and the management sector block are allocated in the real data block 153. The real data block in this example has a fixed length of 16 bytes as shown in the upper part of the figure. The header block has a fixed length of 8 bytes. The header information is written into a start mark zone (StartMark: abbreviated as SM) of 4 bytes and an end mark zone (EndMark: abbreviated as EM) of 4 bytes. The write operation is carried out in the order of SM, the real data, and EM. The information written into the SM is first flag information and the information written into the EM is second flag information. By performing the write operation in this order, whether or not the real data is actually written into the real data block can be determined readily according to whether or not the header information is written successfully into the SM and EM.

The SM contains 4 bytes: a flag (1 byte), a sequence number (1 byte), a block number of a physical address (1 byte) and an entry location (1 byte). The flag and the sequence number are information to be used to ensure that operations to write data piece by piece in multiple times at certain addresses are all executed sequentially. According to this, a 256-byte data is divided and written separately by sixteen times because each real data block has the fixed length of 16 bytes. The flag and the sequence number are used to ensure that sixteen write operations are all executed sequentially.

The sequence number indicates what number in the divided sequences each write unit is. The sequential number for the first entry has the maximum value while that for the last entry is equal to 0. The flag is set to either "SEQ" or "TOP_SEQ". The former indicates that a sequence number is valid while the latter represents the first sequence number.

The search (read) of the written data begins from the most recent entry, i.e., the last entry. The sequence numbers are decremented as the write operations proceed and finally reaches to 0. As a result, when the flag is set to "SEQ" and the sequence number is equal to "0" indicating the last, at the time of search, the real data segments back to the flag "TOP_SEQ" can be considered to have been written successfully into the real data block and thus the write operation is valid. On the other hand, when the flag is set to "SEQ" and the sequence number is other than "0" at the time of search (read), the real data segments back to the flag "TOP_SEQ" are considered to be invalid, i.e., to be not existing there.

It should be noted that the real data is merely considered as invalid in response to a request from an application, and it can separately be read as a log. For this reason, the memory control device 11 obtains a new real data to be written while keeping the real data block and the header block with the invalid data contained therein, newly retains entries for the real data block and the header block into which the size of the new real data obtained is written, and erases in a lump the real data block and the header block that it keeps when a given erase condition is satisfied. In this way, it can be used as a log for use in analyzing problems without any additional functions.

The block number of the physical address is a number for use in determining what number the subject real data block is. The entry location indicates what number the entry of the block is. The block number is, for example, one of "0" to "255" in a case of 256 bytes. The entry location is one of "0" to "127" as long as the data has a fixed length of 16 bytes and each block has 2 kB in size. The block number and the entry location correspond to the physical addresses at which the data segment is actually written.

The EM is made up of 4 bytes: an immediately preceding entry location at the same logical address (2 bytes) and a logical address (2 bytes). The immediately preceding entry location is information that is necessary for determining the data segment that has been written most recently. The logical address has a 16-byte alignment (fixed length). When a data segment is written at a certain logical address, that logical address is read and a new data segment is written. As a result, as the latest data segment at that address, it is enough to read only the most recent version of the data segment that has been written there. The entry location of the most recent version of the data that has been written there corresponds to the "immediately preceding entry location".

With the SM and EM having the aforementioned configuration, whether or not a data segment has been written successfully into the real data block can be determined easily and quickly merely by means of referring to, upon reading, the information written therein.

The management sector block 152 is made up of 4 bytes: the number of rearrangements (2 bytes), a flag (1 byte), and a block number (1 byte). The "rearrangement" is an operation to comb out the updated data segments into a collection of really necessary data segments at a certain timing. The really necessary data segment is that the address at which data segment was or has been written even once should take up the value of that address. In order to make such operations possible, the data segment in the write cell is erased, a new write cell is retained, and an optimized old data segment is copied into the retained new write cell. The rearrangement is distinguished from initialization during which the write cell is initialized with an initial value. The number of rearrangements indicates how many times the rearrangement is made up to the present. The number of rearrangements have a certain limit.

The "block number" is a block number for use in identifying the real data block 153 being used. The flag indicates a current status of that block. The flag is set to one of "under rearrangement", "header", "data", and "rearrangement complete". The "header" and the "data" indicate the content of that block. The block number is selected from empty blocks. The empty block in this example is determined by using a known function in such a manner that when the block is determined as an empty block when it has already been erased.

The rearrangement results in erasure of information in the blocks (including entries) that was contained before the rearrangement. Therefore, the aforementioned empty block is an erased block. No problem will arise when the erased block provides [0xFF] indicating that all cells in the block are not written with any data. However, a bad block into which nothing can be written may possibly appear. In such cases, a flag in the management sector block 152 may be set to a "bad block" and the first entry of the block suspected to be a bad block may be used for test-write purpose to determine whether it is a bad one. However, it is not as reliable as it should be when the block is examined by using only one or some of the entries. Taking the fact that an empty block is selected only during the rearrangement into consideration, all you need is a mechanism to skip an entry if the entry cannot be written with data.

The memory control device 11 first determines whether or not the rearrangement is necessary when the non-volatile memory 15 is initialized. It operates routinely when the rearrangement has been completed. Even if a power failure arises during this routine operation, the data is assured without any special processing as long as it is written in the order of SM, the real data block, and the EM.

[EEPROM Emulation]

Figure 19:
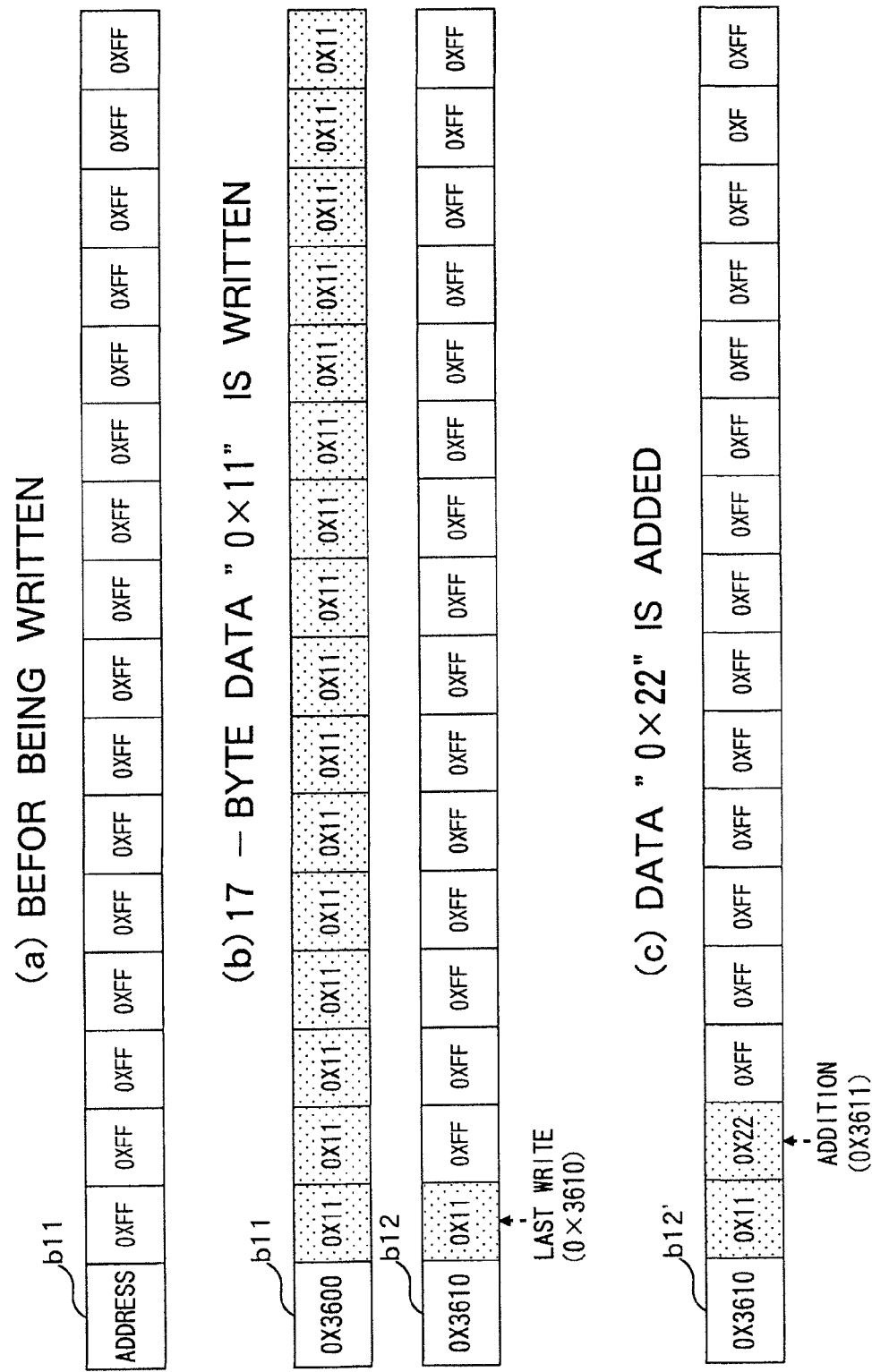
FIG. 19 shows a state of a memory (a) before writing data, (b) when 17-byte data is written, and (c) after another data is added.

In the second embodiment, the EEPROM emulation is used for writing data. Therefore, the concept of the EEPROM emulation in the second embodiment is described with reference to FIG. 19.

FIG. 19(a) shows a structure of a data sector group in a state before data is written. An example of a simplified layout is given here in which addresses for one entry are 16-byte aligned, and a data sector has a fixed length of 16 bytes, i.e., the data sector has sixteen write cells into which one-byte data segments are written one for each. The sixteen write cells as well as write cells in another entry are associated sequentially with each other by means of associating them in address order. The numerical values in the figure are represented in hexadecimals. The hex [0XFF] represents a write cell that was not previously written.

With the entry having the aforementioned structure, it is assumed that the memory control device 1 specifies the address [0X3600] (equivalent to a logical address) to write a data chunk of 17 bytes in length. Since the data sector has a fixed length of 16 bytes, only a 16-byte data fraction (each byte represents [0X11]) of the target 17-byte data chunk is written into the entry specified by the addresses [0X3600] to [0X360F]. The remaining 1-byte ([0X11]) data fraction is written into the first write cell (address [0X3610]) in the entry sequentially aligned with the preceding entry. This state is shown in FIG. 19(b). In this case, when the data fraction of 1 byte is read at the address [0X3610], the data segment [0X11] is obtained.

When another data segment [0X22] of 1 byte is added to the cell specified by the address [0X3611], identified is the entry for the address [0X3610] that is included in the same 16 byte boundary as the address [0X3611] corresponding to the most recently written cell at that time. Then, the 16-byte data of that entry, i.e., the 16-byte data with the data segment at the location specified by the address [0X3611] being updated is written as a new entry (read-modify-write).

Update is an operation to add the aforementioned new entry to an entry that was not previously written and that is located just after the entry most recently written before the addition, thereby to reduce the write cells that was not previously written in the subject entry. This state is illustrated in FIG. 19(c). The entry to which an data segment is added is written as a new entry for the address [0X3610]. As a result, the entry that was associated with the address [0X3610] before the addition (the lower entry in FIG. 19(b)) becomes unnecessary. This is deleted when a situation where a predetermined condition is satisfied, e.g. the elapse of a certain period of time after the completion of the last write operation, is sensed. It is kept until it is deleted. Any location may be used for this keeping as long as the location can be specified.

As apparent from the above, one feature of the EEPROM emulation according to the second embodiment lies in the fact that the data segments are written into individual write cells that were not previously written, and are erased in the unit of group (in the above example, entry). This significantly reduces the number of erase operations as compared to situations where reprogramming is intensively made at a certain given address, and in turn increases the number of times the data can be written.

<Operations>

Next, operations of the memory control device 11 are described specifically.

The memory control device 11 determines whether or not the incoming data to be written (input data) is the aforementioned initial data or data that can possibly be rewritten many times, according to a write rule.

In the second embodiment, two different rules are recorded on a rule table and loaded onto the working memory 14.

The first rule is for identifying the initial data when an address at which a data segment is to be written (write address) or an address at which the subject data segment is to be read (read address) is in a range of the addresses for the initial data block 151. The write address is specified in an application program which has an access to the memory control device 11.

The memory control device 11 identifies the data in question as the initial data when the write address or the read address is in the aforementioned range of the addresses. The range addresses in this range does not necessarily have a series of sequential addresses. For example, addresses [0X3000] to [0X3100] may be retained for the initial data for certain purposes, and other addresses [0X3600] to [0X3700] which are not continued from the aforementioned ones may be defined as a sector into which parameter values to be referred to during execution of multimedia processing (e.g., sound ON/OFF or resolution), or into which API (Application Programming Interface) are written. In this case, it can be used in a manner that if a request for reading 16-byte data is made from the upper address [0X3000], the initial data is returned, and if a request for reading 16-byte data (API) is made from the lower address [0X3600], that data is returned.

The second rule defines a relationship between the order of writing the data into the non-volatile memory 15 and its data recording area. For example, the first input data to be written into the non-volatile memory 15 is identified as the initial data. This eliminates the necessity of separate specification of the range in which the initial data is required.

The memory control device 11 carries out a first write operation to write the input data into the initial data block 151 when the input data is the initial data.

On the other hand, when the input data is a data that can possibly be rewritten many times, it carries out a second write operation in which the data is written by using the characteristic EEPROM emulation, that is, the necessary number of real data blocks 153 are retained in the non-volatile memory 15 to allow a predetermined number of operations to write the data, the input data is successively added to the sector(s) into which data can be written, of the retained real data blocks 153, and the real data blocks 153 into which the data has already been written are erased in blocks.

In the second write operation, the number of operations to write the data into the real data block 153 is accumulated, and when the accumulated total reaches a predetermined value, additional real data blocks are retained in the non-volatile memory that are equal in number to the real data blocks already retained previously. The rearrangement operation for the aforementioned rearrangement is also carried out.

Figure 20:
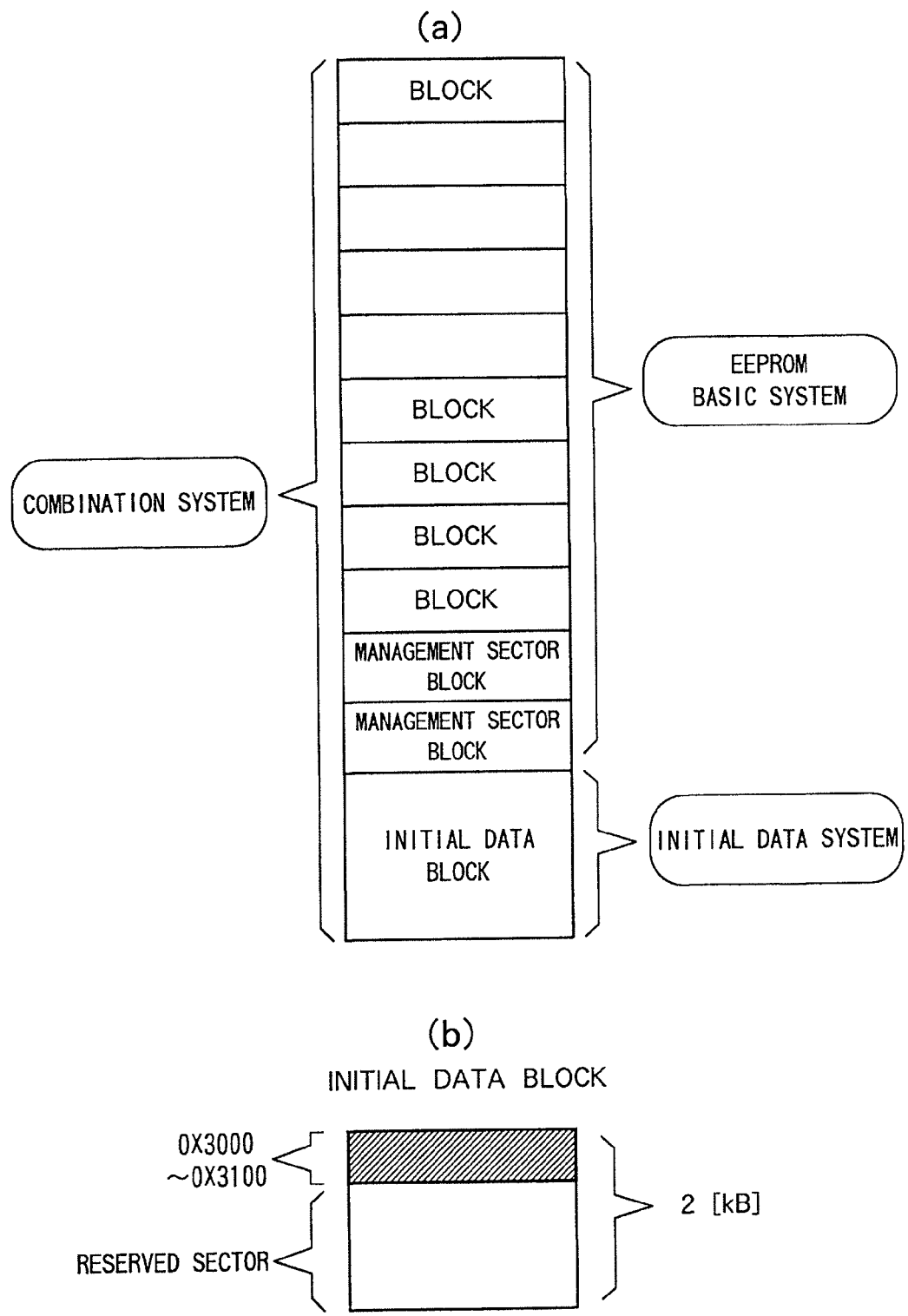
FIG. 20 shows (a) a feature of memory control according to the second embodiment, and (b) a specific address allocation in the initial data block.

This is schematically shown in FIG. 20(a). In the figure, an "EEPROM basic system" indicates that the memory control device 11 operates as a system that carries out write and read operations by using the characteristic EEPROM emulation. An "initial data system" indicates that the memory control device 11 operates as a system that carries out operations to write and read the initial data. Furthermore, a "combination system with system having initial data" indicates that the memory control device 11 operates as a combination system in which the aforementioned two operations are combined with each other.

FIG. 20(b) shows a specific address allocation of the initial data block. The initial data block may use upper addresses of, for example, 0X3000 to 0X3100 as a sector for the initial data that is to be supplied in response to a read request, and lower addresses as a reserved sector, as described above.

First, a process flow in the combination system is schematically described.

[Data Write Operation]

Figure 21:
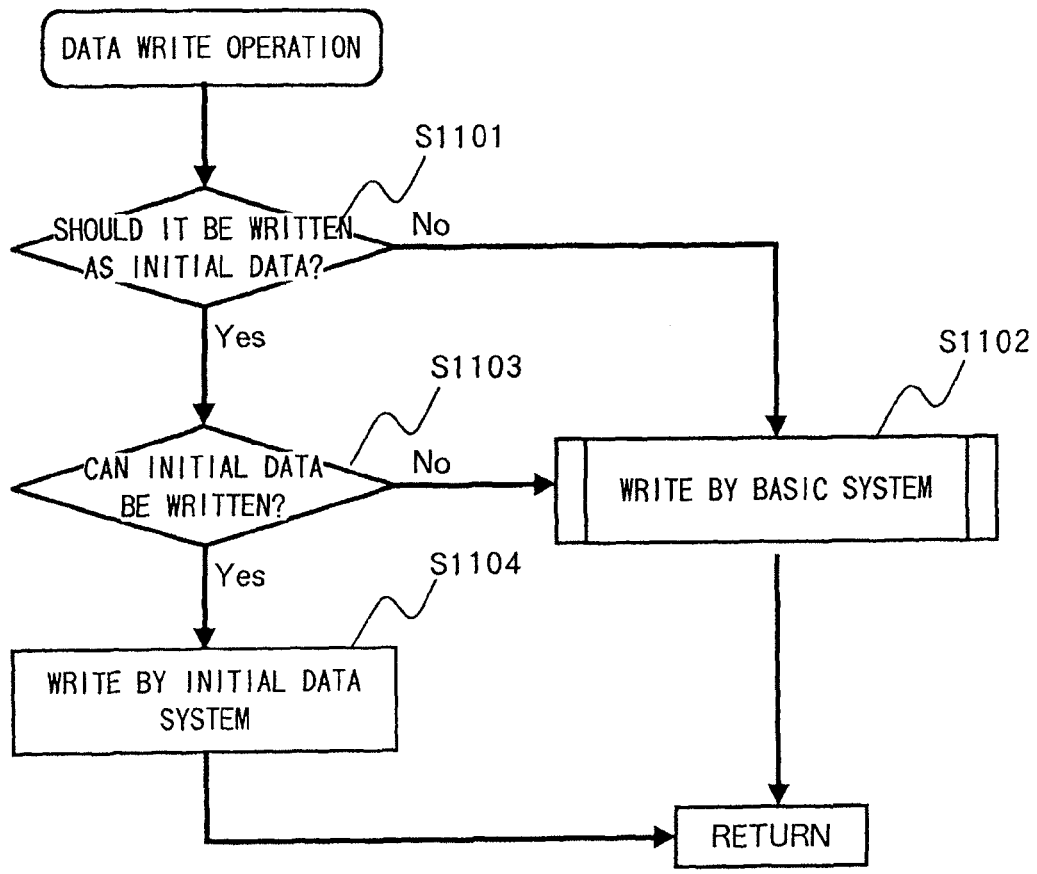
FIG. 21 is a process-flow diagram illustrating an entire data write operation.

FIG. 21 shows a procedure of the entire data write operation. Referring to FIG. 21, the memory control device 11 receives an input data via an input unit which is not shown. It determines whether or not the input data is the initial data by means of referring to the write rules. If it is a data that can possibly be written many times rather than the initial data, it carries out write operations to write the data in the EEPROM basic system (hereinafter, referred to as a "basic system" for the sake of convenience) (step S1101: No, S1102). The data write operation in the basic system is described later.

At the step S1101, when it is determined that the input data is the initial data, then it is determined whether or not the input data can be written. If not, then the process goes to the step S1102 (step S1101: No). If it can be written as the initial data, the write operation in the initial data system is carried out (step S1101: No, S1103: Yes, S1104). The data write operation in the initial data system is described later.

[Data Read Operation]

Figure 22:
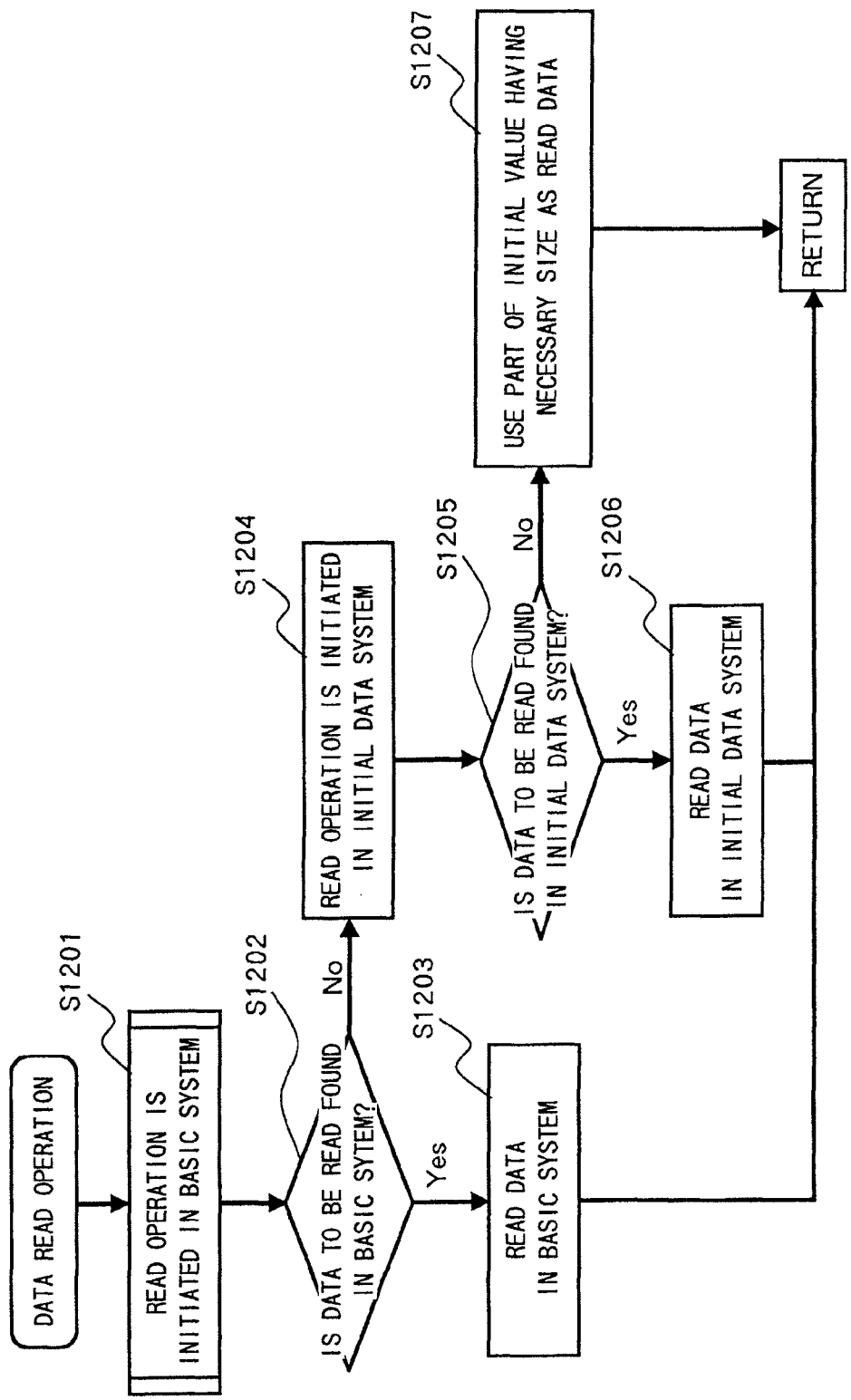
FIG. 22 is a process-flow diagram illustrating an entire data read operation.

FIG. 22 shows a procedure of the entire data read operation. Referring to FIG. 22, when the data is read in the combination system, the read operation is initiated in the basic system (step S1201). It is determined in the basic system whether or not a data to be read is found (step S1202), and if any, the data is read in the basic system (step S1202: Yes, S1203). The data read operation in the basic system is described later.

If no data to be read in the basic system is found, the read operation in the initial data system is initiated (step S1202: No, S1204). It is determined in the initial data system whether or not a data to be read is found (step S1205), and if any, the data read operation is carried out in the initial data system (step S1206). The data read operation in the initial data system is described later.

On the other hand, if no such a data is found at the step S1205, the read data is made up of the initial value(s) (in this example "FFH") having a necessary size (step S1207).

[Data Write Operation in Initial Data System 1]

Figure 23:
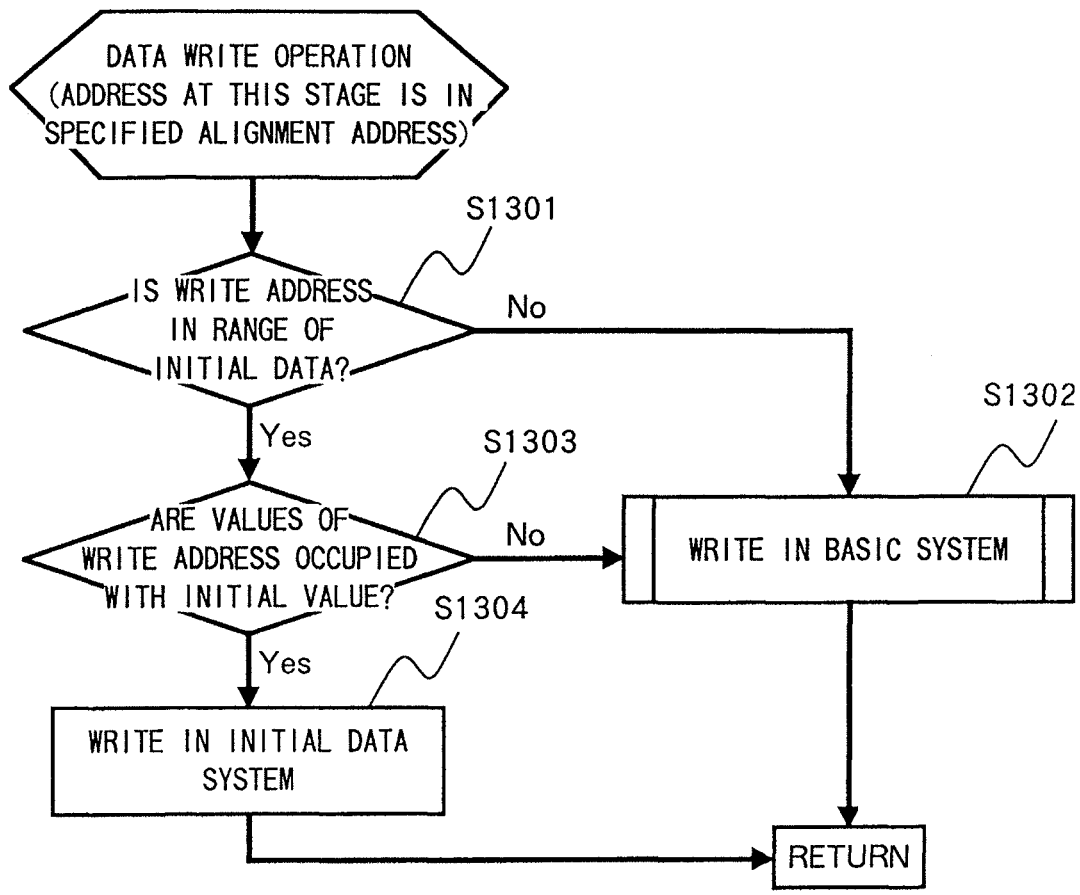
FIG. 23 is a process-flow diagram of a write operation to be carried out when a write address is specified.

FIG. 23 shows a procedure of a data write operation in the initial data system. This illustrates a procedure according to the aforementioned first rule, i.e., when the write address is in a range of the initial data. As a prerequisite therefore, the address before the data is written is in a specified alignment address.

In the combination system, it is determined whether or not the write address is in a range of the initial data (step S1301). If not, the process goes to the write operation in the basic system (step S1301: No, S1302). On the other hand, if it is in the range of the initial data, then it is determined whether or not the values of the subject write address are still occupied with the initial value (in this example "FFH") (step S1303). If it is occupied (step S1303: Yes), then the input data is written in the initial data system (step S1304).

[Data Read Operation in Initial Data System 1]

Figure 24:
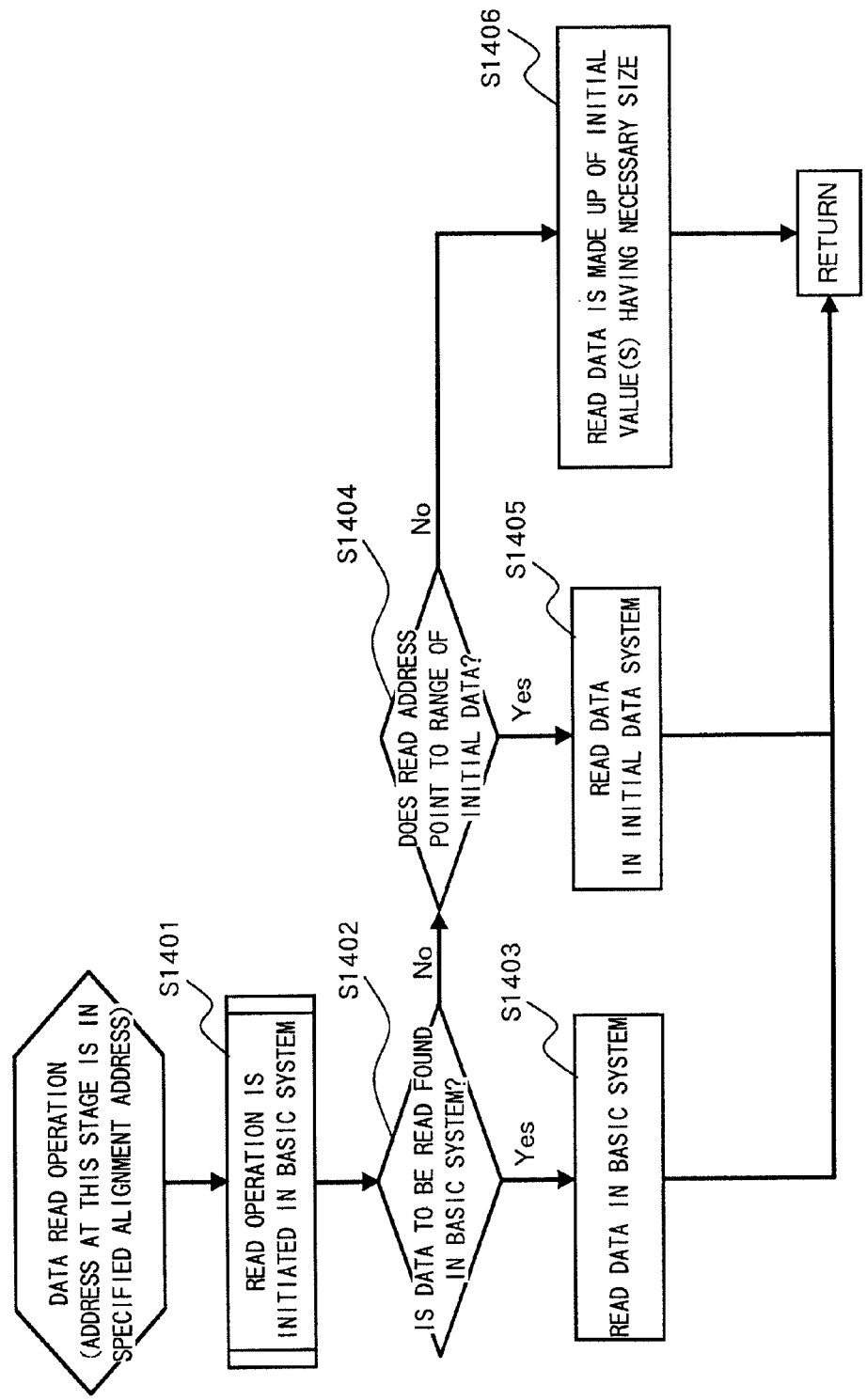
FIG. 24 is a process-flow diagram of a read operation to be carried out when a read address is specified.

FIG. 24 shows a procedure of a data read operation in the initial data system. This illustrates a procedure according to the aforementioned first rule, i.e., when the read address points a range of the initial data. As a prerequisite therefore, the address before the read operation is in a specified alignment address.

In the combination system, the read operation is initiated in the basic system (step S1401). A subject data to be read is found in the basic system, and if any, the subject data is read in the basic system (step S1402: Yes, S1403). If the subject data is not found, it is determined whether or not the read address is in a range of the initial data (step S1404). If it is in a range of the initial data, the data is read in the initial data system (step S1404: Yes, S1405). On the other hand, if it is not in the range of the initial data, it indicates that the subject data does not exist. Accordingly, the read data is made up of the initial value(s) (in this example "FFH") having a necessary size (step S1404: No, S1406).

[Data Write Operation in Initial Data System 2]

Figure 25:
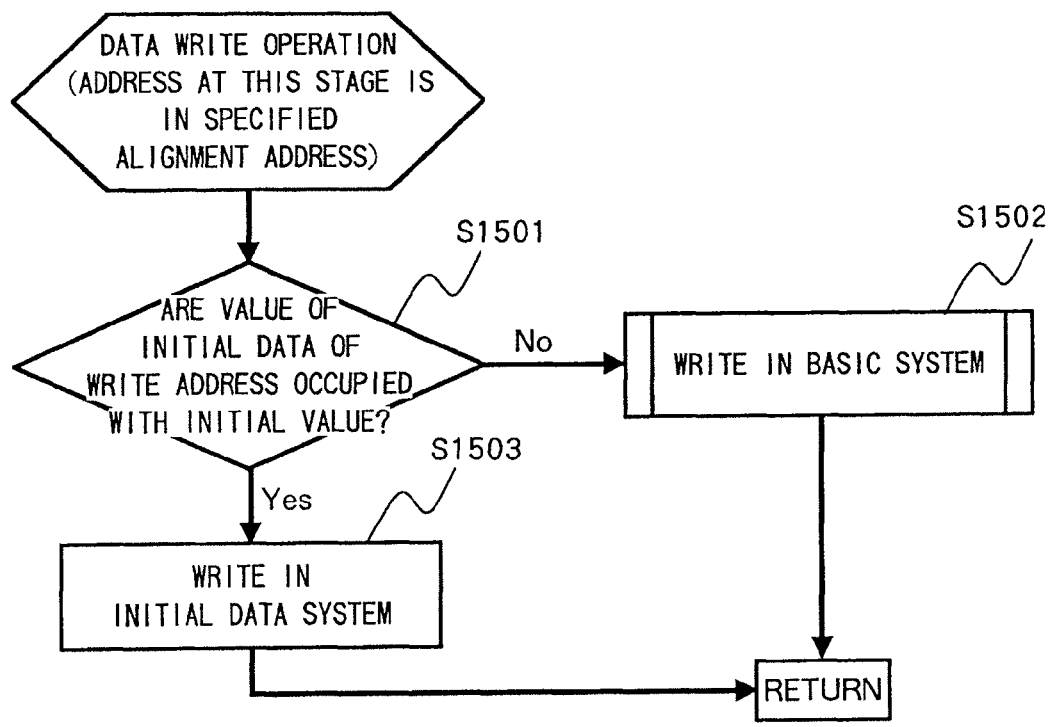
FIG. 25 is a process-flow diagram of a write operation that is carried out when an initial data is identified only by means of a state where an initial data block is written with data.

FIG. 25 shows another procedure of a data write operation in the initial data system. This illustrates a procedure according to the aforementioned second rule, i.e., a data is determined as the initial data when it is the data to be written first. It is assumed that the address before the data is written is in a specified alignment address.

In the combination system, it is determined whether or not the values of the initial data are still occupied with the initial value (in this example "FFH") (step S1501). If it is occupied, then the process goes to the data write operation in the basic system (step S1501: No, S1502). If all are occupied with the initial value, the write operation is carried out in the initial data system (step S1501: Yes, S1503).

[Data Read Operation in Initial Data System 2]

Figure 26:
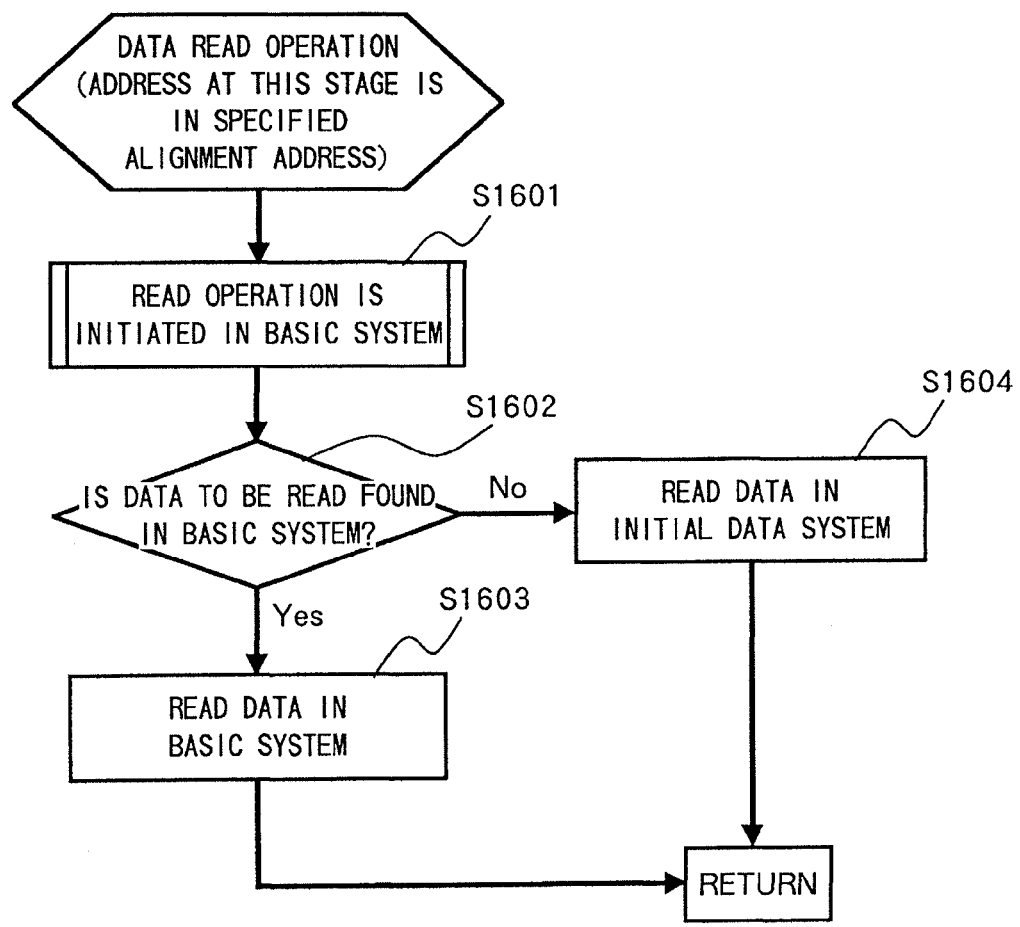
FIG. 26 is a process-flow diagram of a read operation that is carried out when an initial data is identified only by means of a state where an initial data block is written with data.

FIG. 26 shows another procedure of a data read operation in the initial data system. This illustrates a procedure according to the aforementioned second rule, i.e., a data is determined as the initial data when it is the data that has been written first. It is assumed that the address before the data is read is in a specified alignment address.

In the combination system, the read operation is initiated in the basic system (step S1601). A subject data to be read is found in the basic system (step S1602), and if any, the subject data is read in the basic system (step S1602: Yes, S1603). If the subject data is not found at the step S1602, the data is read in the initial data system (step S1602: No, S1604).

Next, the data read operation and the data write operation in the basic system are described.

In the combination system, in the operation to write data, the data and information in which data has already been written are read first. In addition, as shown in FIG. 22, in the operation to read data, the read operation in the basic system precedes the read operation in the initial data system. The data read operation in the basic system is described with reference to a process-flow diagram shown in FIG. 27.

[Data Read Operation in the Basic System]

In the basic system, block information is calculated according to an address (addr) input for the data to be read that is specified by the program issuing a request to read the data (step R1101), The block information as used herein is information such as a block number and a data size (size) that can be identified from the entries written in the management sector block and the header block shown in FIG. 18.

Thereafter, an address alignment (a_addr) and an offset (offset) are calculated (step R1102). The address alignment (a_addr) is, in this example, on a multiple of 16 bytes of the address (addr). For example, it is assumed that the data to be read is located beginning at the first address (addr) of [0X3612]. This address is included in the address alignment (a_addr) from [0X3610], and the difference "2" between them is the offset (offset). The data segments at the addresses calculated at the step R1102 are read (step R1103). Those for necessary data segments are stored in a buffer (buf) in the working memory 14, and the size of the remainder is calculated (step R1104). The term those for necessary data segments as used herein is a value of either "16−offset" or size (size) which is smaller. The size of the remainder is a difference obtained by subtracting (16−offset) from the size (size). This is saved on the buffer as a new size (size). If there's a size of the remainder then the subsequent alignment address is calculated, and the offset is set to "0" to return to the process at the step R1103 (step R1105: Yes, R1106). If there is no size of the remainder, the read data that is a result of the operation is returned to the requesting source and the process is terminated (step R1105: No, R1107).

[Data Write Operation in the Basic System]

The data write operation in the basic system is described with reference to FIGS. 28 and 29.

Figure 28:
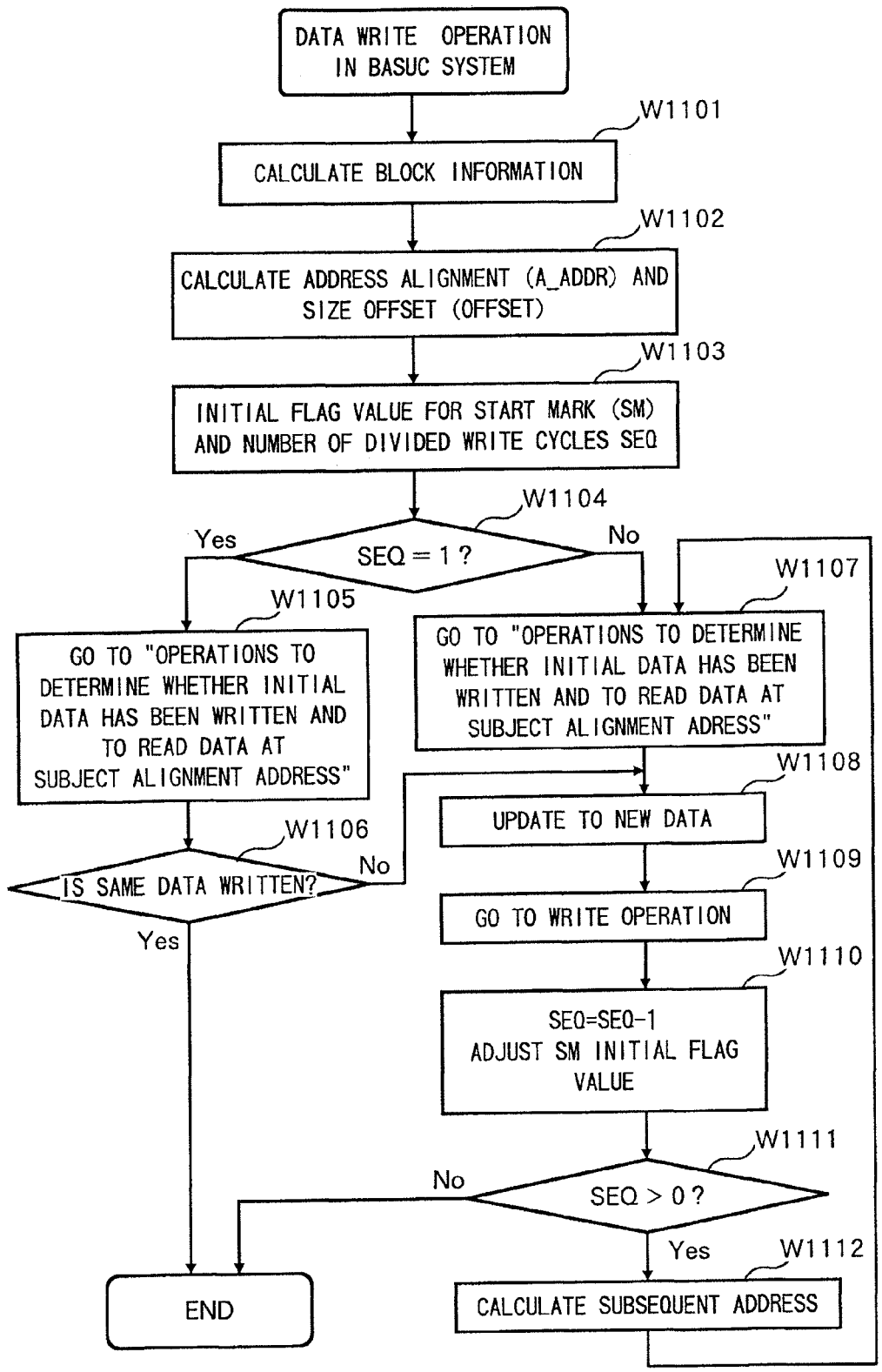
FIG. 28 is a process-flow diagram of a data write operation in the basic system.

Referring to FIG. 28, the block information is calculated in the basic system in response to a data write request from an application program (step W1101). The block information is as described above. Then, it calculates an address alignment (a_addr) which is available for writing, and a size offset (offset) (step W1102). It determines an initial flag value for the SM and the number of divided write cycles SEQ (step W1103). It determines whether "SEQ=1" or not, and if "SEQ=1" is satisfied (step W1104: Yes), then the process goes to operations to determine whether or not the initial data has been written and to read the data at the alignment address (step W1105). The operation to determine whether the initial data has been written is as shown in FIG. 23. When the same data is going to be written, then the process is terminated (step W1106: Yes).

The number of divided write cycles SEQ is equal to "2" when the size (size) is equal to 16 bytes. That is, when the last data segment was written at the address (addr) [0X3612] and the offset (offset) is "2", only 14 bytes can be written first. The remaining 2 bytes are written into the subsequent real data block in the second time. This means that the write operation is divided into two cycles and thus the SEQ is equal to "2".

Thus, the process goes to operations to determine whether or not initial data has been written and to read the data at the alignment address (Step W1104: No, W1107). The data is updated to a new data (step W1108) and the process goes to the write operation (step W1109). At the step W1106, even when the same data is not to be written, the process goes to the operation at the step W1108. After the write operation, an operation of "SEQ−1" is performed to adjust the initial flag value for the SM (step W1110). It determines "SEQ>0?" and if it is affirmative, then the subsequent address is calculated (step W1111: Yes, W1112), and the process goes to the step W1107. If the "SEQ>0" is negative, then the process is terminated (step W1111: No).

Figure 29:
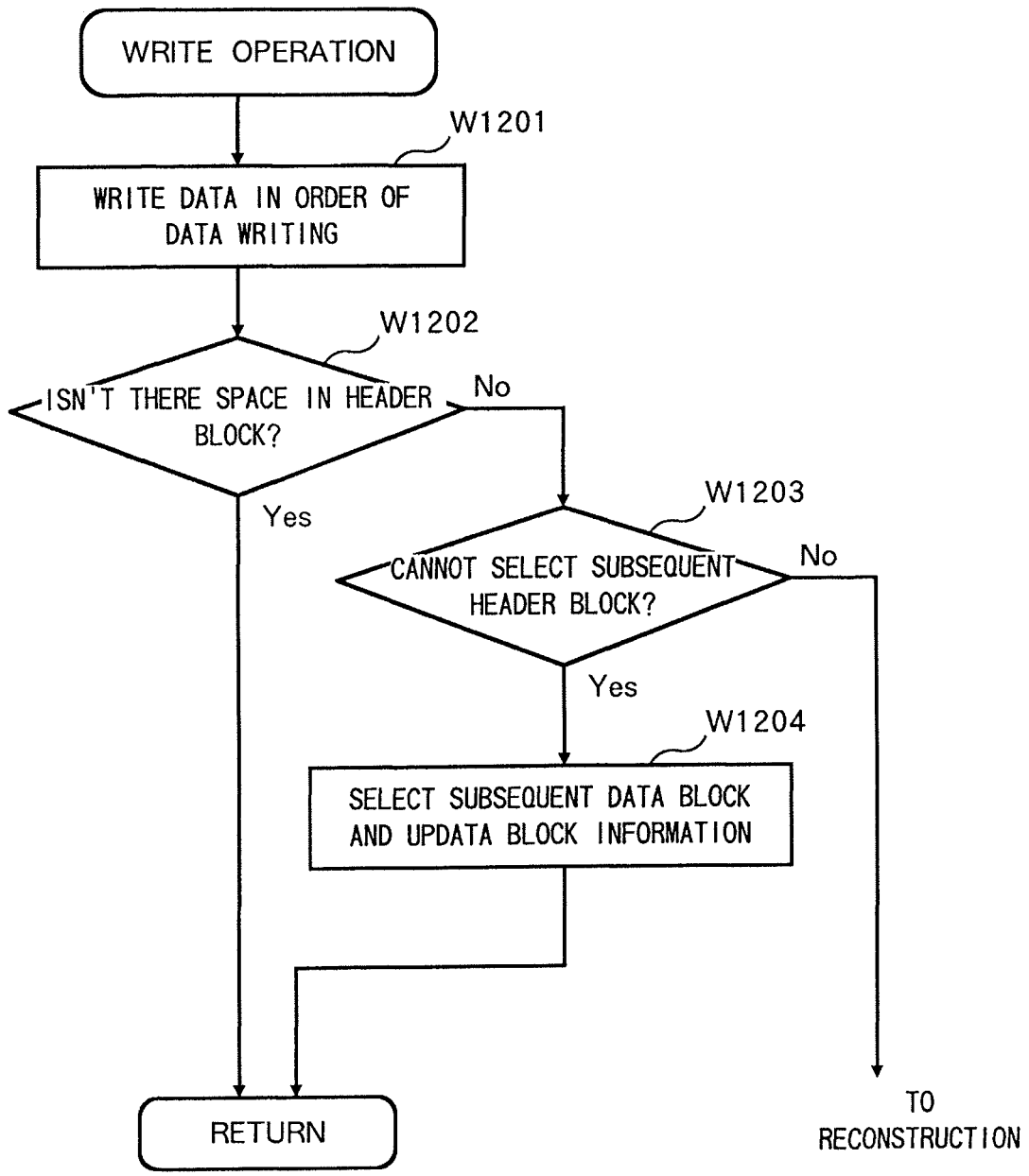
FIG. 29 is a view illustrating a write operation in detail.

The write operation at the step W1109 is performed according to the procedure shown in FIG. 29. More specifically, the data is written in the order of data writing (in the order of SM, data, and EM) (step W1201). Thereafter, it is determined whether or not there is a space in the sector of the header block. If any, then the process goes back to the data write operation (step W1202: No). If there is no blank sector in the sector of the header block, then it is determined whether or not the subsequent header block can be selected (step W1202: Yes, W1203). If it can be selected, then the subsequent header block is selected and the block information is updated (step W1203, W1204). Then, the process goes back to the routine from which it was called. If, at the step W1203, it can be determined that the subsequent header block sector cannot be selected, then the process goes to an operation of rearrangement (step W1203: Yes).

[Reconstruction Operation in the Basic System]

The aforementioned rearrangement operation is one of characteristic operations in the basic system. This rearrangement operation is described with reference to a process flow diagram shown in FIG. 30.

In the basic system, it is checked whether or not there is any past erasable block (step K1101). The past erasable block means a block of which content has been rewritten. If any, the block is erased (step K1101: Yes, K1102). If there is no erasable block, or there was an erasable block but has been erased, information indicating the beginning of the rearrangement is written into the management sector block 152 (step K1101: No, K1103).

A new header block is selected and is written into the management sector (step K1104). In addition, a new real data block is selected and is written into the management sector (step K1105). For example, in order to perform the rearrangement every 512 write operations, two header blocks and four real data blocks are selected. In other words, six blocks are consumed for the rearrangement. Since 256 headers can be retained for a single header block, two header blocks are necessary to retain 512 headers. The real data block contains a data sector having a fixed length of 16 bytes and is 2 kB in block size. Accordingly, 128 operations can be carried out for each block, and 512 operations require four blocks.

The memory control device 11 checks whether or not there is any old header block (step K1106). If any, it reads the data in the old header block in the order of last to first registered (step K1107). It is checked whether or not it is the address that should be skipped because of being selected previously. If not, then the data is written into a new real data block (step K1108: No, K1109). Then, any preceding data that matches with the selected address is no more necessary, and it is stored in a buffer so that it can be skipped (step K1110).

At the step K1108, if it is the address that should be skipped (step K1108: Yes), or is stored so that it can be skipped, it is checked whether of not the data segments of all old blocks have been examined (step K1111). If there is any unexamined block data segment(s), the process goes back to the operation at the step K1108 (step K1111: No, K1112).

If the data segments of all old blocks has been examined or there is no old header block at the step K1106 (step K1106), then the information indicating the rearrangement has been completed is written into the management sector and the process goes back to a ready state for the subsequent write operation(s) (step K1120).

When the rearrangement has been completed, the real data block immediately before that becomes unnecessary, i.e., an additional unnecessary real data block (referred to as a former real data block). The former real data block is not deleted at this stage of operation and is kept until the subsequent rearrangement is carried out. This is because the former real data block may not be deleted before the rearrangement complete is written, as well as because complication of the whole operation is avoided that would otherwise occur when a flag indicating that it is not deleted exists and therefore considerations are increased for the later-described rearrangement during the recovery.

When the former real data block is deleted, the "immediately preceding entry location at the same address" of the EM of the entry in the management sector block 152 becomes useful. In other words, old data is linked and reveals where it locates, which can avoid possible elongation of the time required for the rearrangement.

[Effects]

As apparent from the above, in the memory control device 11 according to the second embodiment, the data is written into the non-volatile memory 15 in the basic system by repeatedly using the rearrangement and the EEPROM emulation to write the data. This can eliminate intensive traffic at a certain given address which otherwise occurs frequently in a conventional normal mode of use, which equalizes the operation of writing the data. As a result, data can be written without any losses, significantly increasing the number of times the data can be written. For example, flash memories which are guaranteed for about only 1,000 cycles of reprogramming with a conventional write architecture, can be guaranteed for about 100,000 cycles of reprogramming. This means that flash memories can be used as a substitute for EEPROMS of this level.

In addition, this approach is superior in safety considerations because even if a problem such as a power failure arises the most recent version of the data that has been written before the problem arises can be recovered since unwanted blocks are left without being deleted until the subsequent rearrangement begins.

From the viewpoint of increasing the number of times the memory can be reprogrammed, the basic system alone is effective as described above. However, if the EEPROM emulation is carried out in the basic system without the initial data, it is necessary to retain such number of write cells or blocks that can cover the rearrangement for the initial data which actually is written only once. This unnecessarily increases the number of rearrangement operations and reduces the total number of times data can be written.

In the second embodiment, the initial data is written into the initial data block 151 and the rearrangement is carried out only for the sectors (blocks) other than this initial data block 151. This eliminates useless rearrangement and thus increases the total number of reprogramming cycles. It is also advantageous that the reduction in number of rearrangement operations reduces the number of times the data is transferred (copied), which increases the total processing efficiency.

[Modified Version]

Although the second embodiment has thus been described in conjunction with a case where a flash memory is used as an example of the non-volatile memory 15, the present invention can be applied to non-volatile memories that are limited in number of times data can be written and therefore any type of non-volatile memories other than the flash memories can be used.

In addition, although the second embodiment has been described in conjunction with an example where the data is written in a two-stage group of the entries and the blocks, the data may be written in a three-stage group or in the unit of entry.

Third Embodiment

Figure 31:
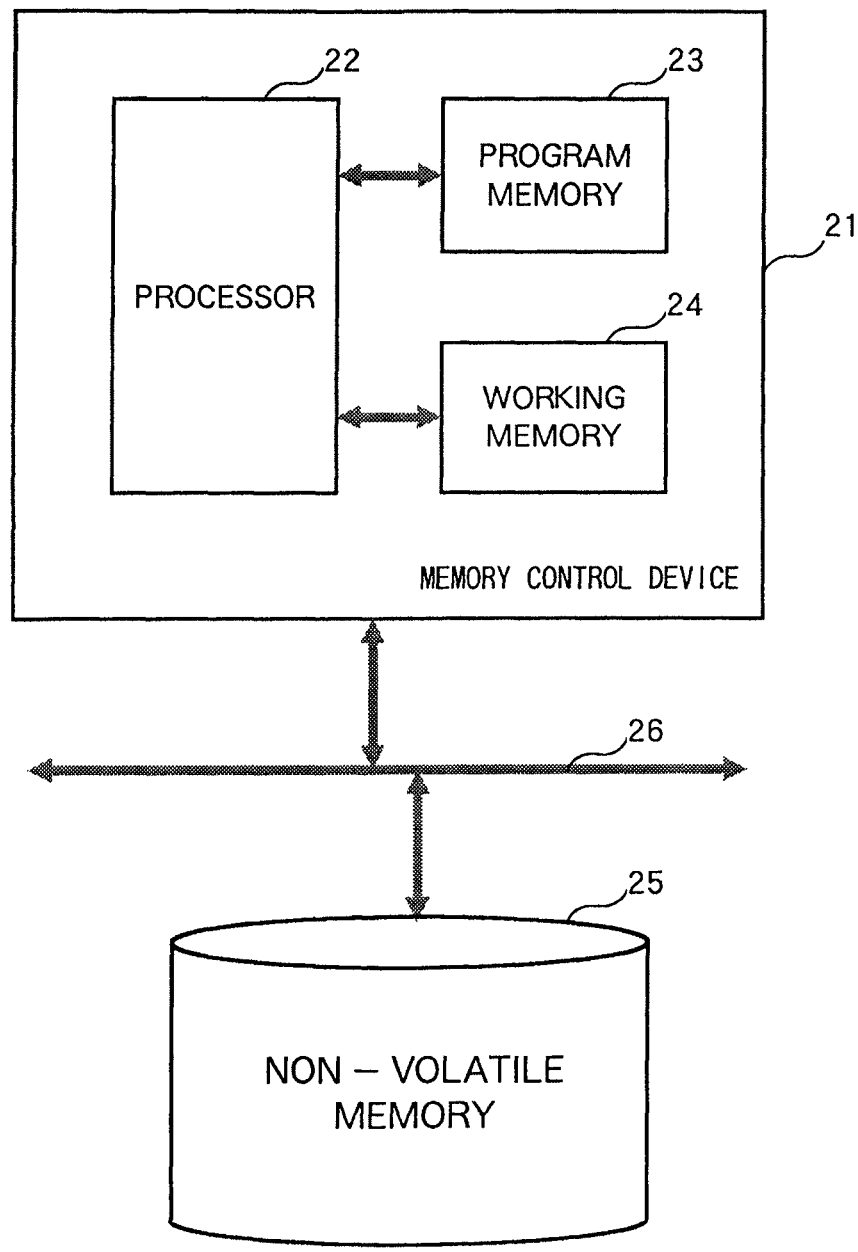
FIG. 31 is a view showing an entire structure of a memory control device which serves as a third embodiment of the present invention

FIG. 31 is a view showing an entire structure of a memory control device which serves as a third embodiment of the present invention. This memory control device 21 comprises a processor 22, a program memory 23 in which a computer program of the present invention is stored, and a working memory 24 which is a volatile memory. The processor 22 loads the computer program into the working memory 24 and executes it to achieve functions of characteristic memory access control to a non-volatile memory 25 connected thereto through a data bus 26, i.e., real data acquisition means, writing means, and reading means. In the working memory 5, a buffer is defined that temporarily stores data. The non-volatile memory 25 is a memory medium such as an EEPROM or a flash memory in which non-volatile memory sectors can be formed. It is based on an address architecture, and can be managed by using IDs or labels (both are kinds of identification information) such as registries.

In the following description, it is assumed that the data to be written is obtained from the upper level such as applications and libraries along with the address architecture for the logical addresses, and this data is written into a non-volatile memory 26 having physical addresses. However, the physical addresses may be replaced with IDs or labels.

In addition, also in this embodiment, a smallest group of write cells as a unit being written is referred to as an entry. A group of two or more entries is referred to as a block. The entries are sequentially associated by serial addresses. The sequential association of the entries may be achieved by, for example, the following procedures. Sequence numbers are assigned wherein the largest one of them has the number equal to the number of entries retained. The sequence numbers are sequentially updated in ascending order from the first entry to the numerical value indicating that it is the last entry, every time when the entry is successfully written with data. The updated sequence numbers are written into the header block (entry) as the flag information for that entry. The similar procedures apply to the blocks to associate them with each other.

The memory control device 21 ensures either the data is successfully written into the non-volatile memory 25 or the data cannot be written thereinto. This means that the operation to write data into the non-volatile memory 25 does not appear to be half done. Conventionally, when data can be written atomically in blocks of, for example, 1 to 4 bytes, then the aforementioned operations can be guaranteed for data of up to 4 bytes. However, the aforementioned operations cannot be guaranteed for data of 16 bytes, 32 bytes or larger.

<Configuration of Non-Volatile Memory>

Figure 32:
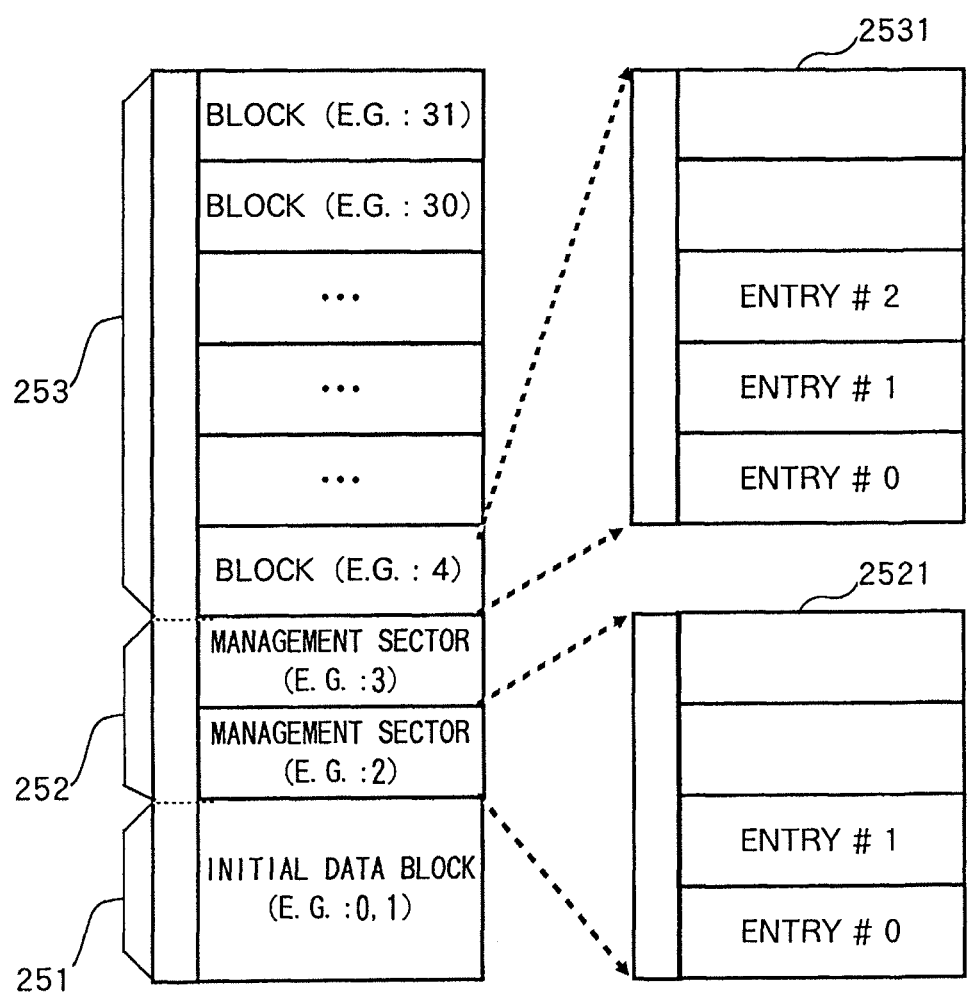
FIG. 32 is a view showing an example of a memory configuration according to the third embodiment.

An exemplary configuration of the non-volatile memory 25 is shown in FIG. 32.

The non-volatile memory 25 is made up of multiple blocks. More specifically, it comprises an initial data block 251 for initial data, a management sector block 252, and a real data block 253 into which data is written. These blocks 251 to 253 are formed by the memory control device 21 during, for example, initialization or rearrangement of the memory.

As the initial data block 251, a block or blocks are retained depending on the size of the initial data that is to be initially written into the non-volatile memory 25, for example, two blocks (e.g., two blocks denoted by 0 and 1 out of the blocks denoted by numerals of 0 to 31 when there are thirty-two blocks). The initial data is a data to be written, in principle, only once, and is referred to directly by the program for loading the data already written.

As the management sector block 252, two blocks are allocated that are to be used alternately (e.g., two blocks denoted by 2 and 3). The management sector block 252 is a block into which management information is written. The management information indicates in what way the real data block 253 is structured currently.

The real data block 253 can be arbitrarily selected from either a header block or a data block.

The header block is a block into which header information is written. The header information indicates at which address of which data block the data segment exists and what a write state it is kept in. The data block is a block into which a data (referred to as a real data) is written that is obtained by the memory control device 21 externally (e.g., from applications) and handled actually in the device.

Each of the management sector block 252 and the real data block 253 has multiple entries. The entry is a sector into which a data having a predetermined data size is written as a single write unit, in a case of the real data block 253. The entries and other blocks are sequentially associated as described above. In the example shown in FIG. 32, entries 2521 for the management sector block 252 and entries 2531 for the real data block 253 are shown.

Figure 33:
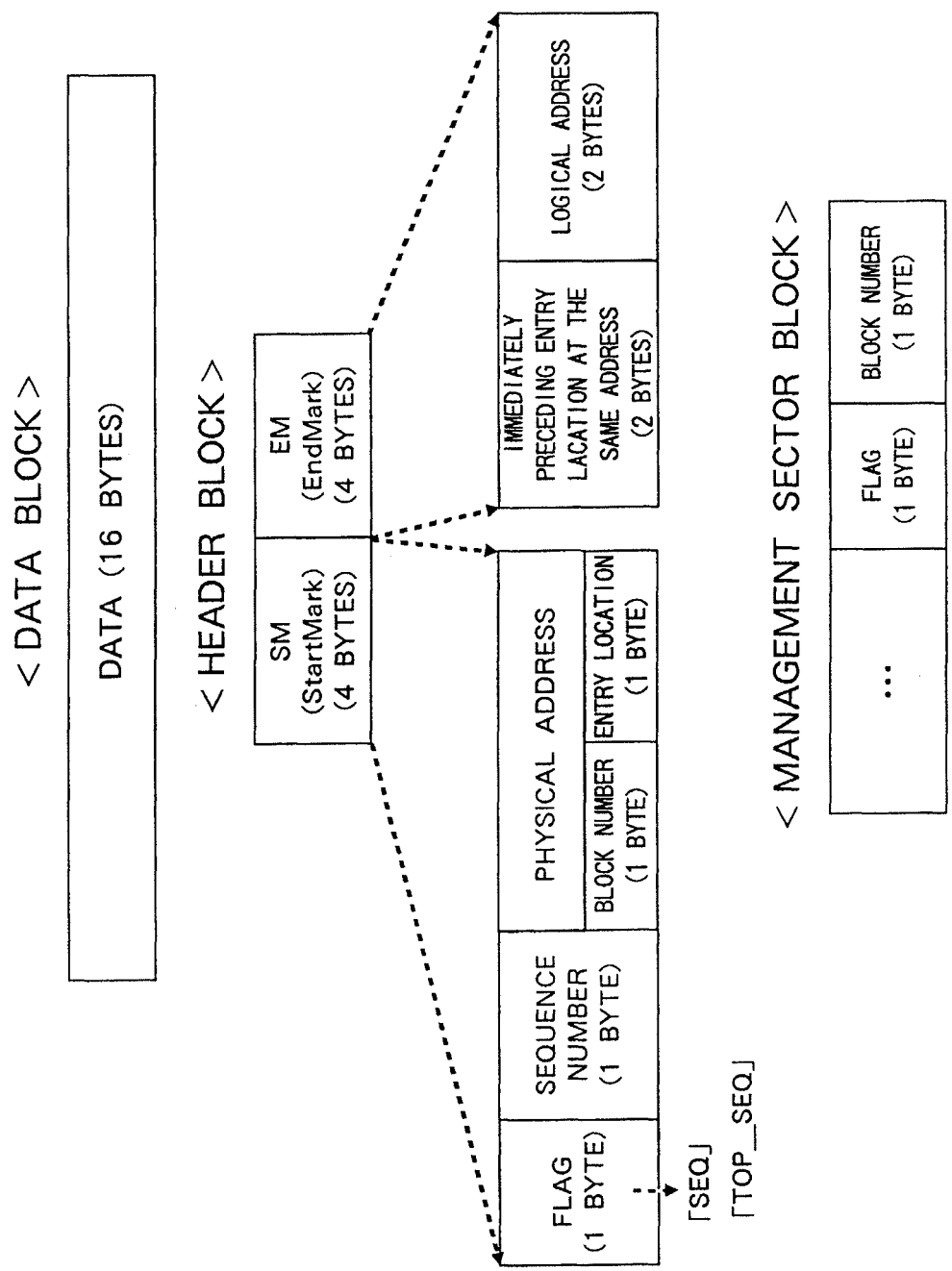
FIG. 33 shows how a header block and a management sector block are allocated in a real data block.

FIG. 33 shows how the data block, the header block and the management sector block are allocated in the real data block 253. The data block in this example has a fixed length of 16 bytes as shown in the upper part of the figure. The header block has a fixed length of 8 bytes as shown in the middle part of the figure. The header information is written into a start mark zone (StartMark: abbreviated as SM) of 4 bytes and an end mark zone (EndMark: abbreviated as EM) of 4 bytes. The write operation is carried out in the order of SM, the real data, and EM. The information written into the SM is first flag information and the information written into the EM is second flag information. By performing the write operation in this order, whether or not the real data is actually written into the data block can be determined readily according to whether or not the header information is written successfully into the SM and EM.

The SM contains 4 bytes: a flag (1 byte), a sequence number (1 byte), a block number of a physical address (1 byte) and an entry location (1 byte). The flag and the sequence number are information to be used to ensure that operations to write data piece by piece in multiple times at certain addresses are all executed sequentially. According to this, a 256-byte data is divided and written separately by sixteen times because each data block has the fixed length of 16 bytes. The flag and the sequence number are used to ensure that sixteen write operations are all executed sequentially.

The sequence number indicates what number in the divided sequences each write unit is. The sequential number for the first entry has the maximum value while that for the last entry is equal to 0. The flag is set to either "SEQ" (sometimes expressed as a flag "S") or "TOP_SEQ" (sometimes expressed as a flag "TS"). The former indicates that a sequence number is valid while the latter represents the first sequence number.

The search (read) of the written data begins from the most recent entry, i.e., the last entry. The sequence numbers are decremented as the write operations proceed and finally reaches to 0. As a result, when the flag is set to "SEQ" and the sequence number is equal to "0" indicating the last, at the time of search, the real data segments back to the flag "TOP_SEQ" can be considered to have been written successfully into the data block and thus the write operation is valid. On the other hand, when the flag is set to "SEQ" and the sequence number is other than "0" at the time of search (read), the real data segments back to the flag "TOP_SEQ" are considered to be invalid, i.e., to be not existing there.

It should be noted that the real data is merely considered as invalid in response to a request from an application, and it can separately be read as a log. For this reason, the memory control device 21 obtains a new real data to be written while keeping the data block and the header block with the invalid data contained therein, newly retains entries for the data block and the header block into which the size of the new real data obtained is written, and erases in a lump the data block and the header block that it keeps when a given erase condition is satisfied, such as when a rearrangement condition for each block is satisfied or when an instruction is received from an application. In this way, it can be used as a log for use in analyzing problems without any additional functions.

The block number of the physical address is a number for use in determining what number the subject data block is. The entry location indicates what number the entry of the block is. The block number is, for example, one of "0" to "255" in a case of 256 blocks. The entry location is one of "0" to "127" as long as the data has a fixed length of 16 bytes and each block has 2 kB in size. The block number and the entry location correspond to the physical addresses at which the data segment is actually written.

The EM is made up of 4 bytes: an immediately preceding entry location at the same logical address (2 bytes) and a logical address (2 bytes). The immediately preceding entry location is information that is necessary for determining the data segment that has been written most recently. The logical address has a 16-byte alignment (fixed length). When a data segment is written at a certain logical address, the data segment at that logical address is read and a new data segment is written. As a result, as the latest data segment at that address, it is enough to read only the most recent version of the data segment that has been written there. The entry location of the most recent version of the data that has been written there corresponds to the "immediately preceding entry location" to be used when data is written at that logical address next time.

With the SM and EM having the aforementioned configuration, whether or not a data segment has been written successfully into the real data block can be determined easily and quickly merely by means of referring to, upon reading, the information written therein.

In the management sector block 252, the "block number" is a block number for use in determining which real data block is being used. The block numbers are sequentially associated with each other. The flag indicates a current status of that block. The flag is a "header" indicating that a block is used as a header block and a "data" indicating that a block is used as a data block. The block number is selected from empty blocks. The empty block is determined by using a known function in such a manner that when the block is determined as an empty block when it has already been erased.

<Operations>

Next, operations of the memory control device 21 are described specifically.

1. Write Operation (Overview)

First, an overview of the write operation is described. The memory control device 21 carries out the write operation in the following order: retrieving a data block or blocks having a blank sector, writing SM information into the header block which controls write cells in that data block, writing real data into that data block, and writing EM information into the header block.

Figure 34:
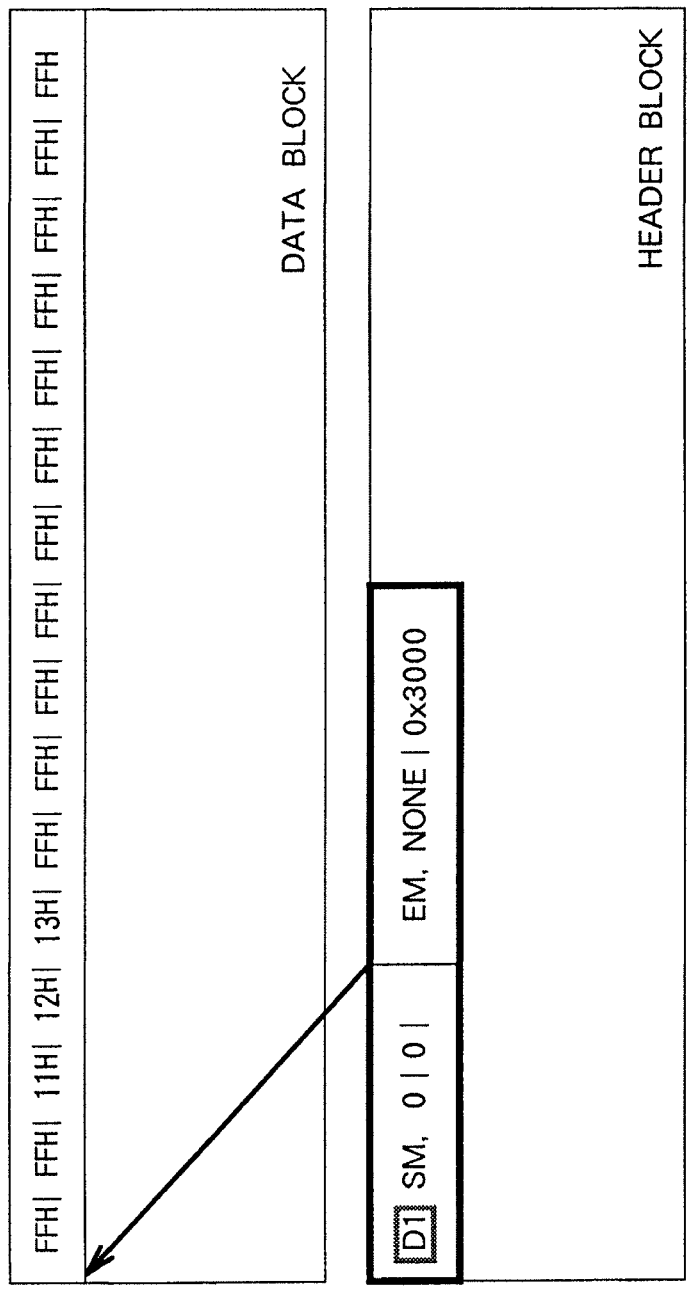
FIG. 34 shows a certain data block in which real data segments of 3 bytes in total have been written.

For example, FIG. 34 shows a certain data block having the address 3002H in which real data segments (11H, 12H, and 13H) of 3 bytes in total have been written. It is noted that numbers in memory is represented in Big endian format for the sake of convenience (the same applies to below). The real data segments are collectively denoted by "D1". The EM in the header block indicates that the data D1 has been written successfully. In the example shown in FIG. 34, the SM for the D1 has "0" that indicates no flag is set (no fragmentation is required) and also has the sequential number "0" (those for the physical address are not shown). The EM has "none" for the immediately preceding entry location at the same logical address, and "0X3000" (meaning 3000H) for the logical address written. It should be noted that FIG. 34 shows only a relationship between the data block and the header block, and the contents of the management sector block 252 are not shown (the same applies to below).

Figure 35:
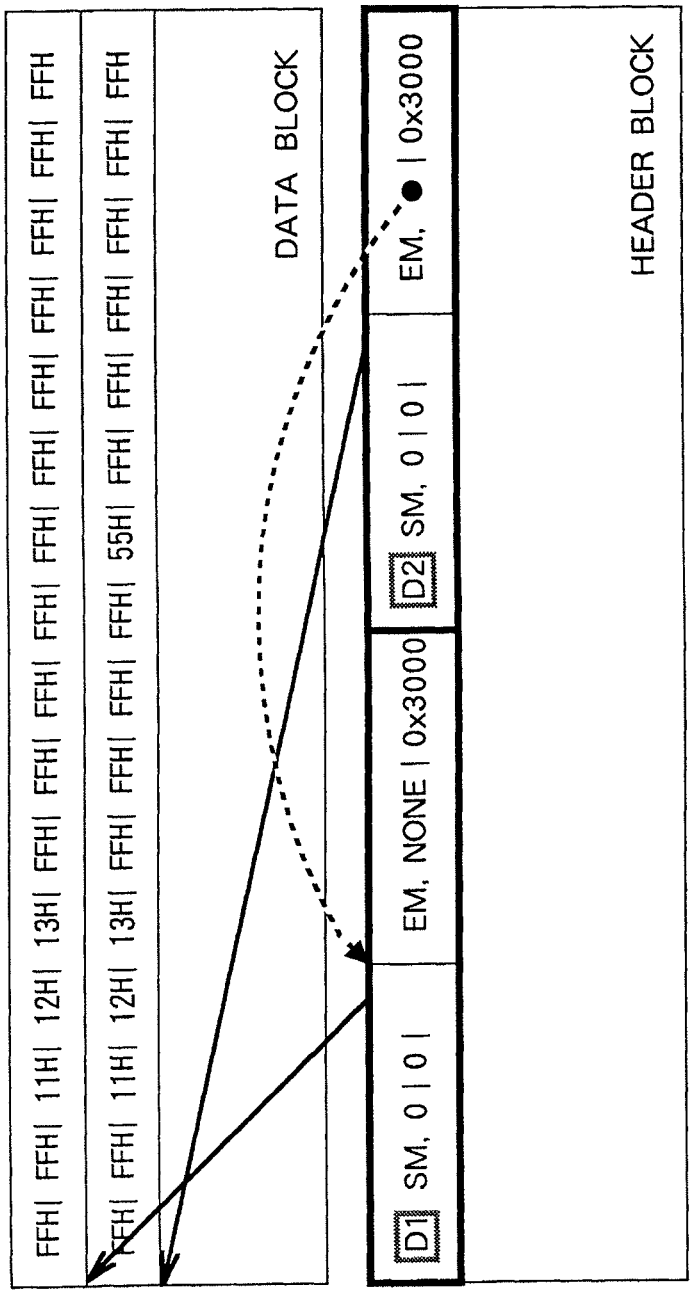
FIG. 35 shows the same data block as the one shown in FIG. 34, in which a 1-byte real data segment has been written at another address.

FIG. 35 shows the same data block as the one shown in FIG. 34, in which a 1-byte real data segment (55H) has been written at the address 3009H. Since the data is written into a non-volatile memory, the addition is made in blocks of 16 bytes. More specifically, the aforementioned real data segments of 3 bytes in total and the 1-byte real data segment in this time are written into another 16-byte sector of the data block. This set of the real data segments is denoted by "D2". The EM in the header block indicates that the real data D2 has also been written successfully. The EM has the logical address of D1 for the immediately preceding entry location at the same logical address, and "0X3000" for the logical address written.

Figure 36:
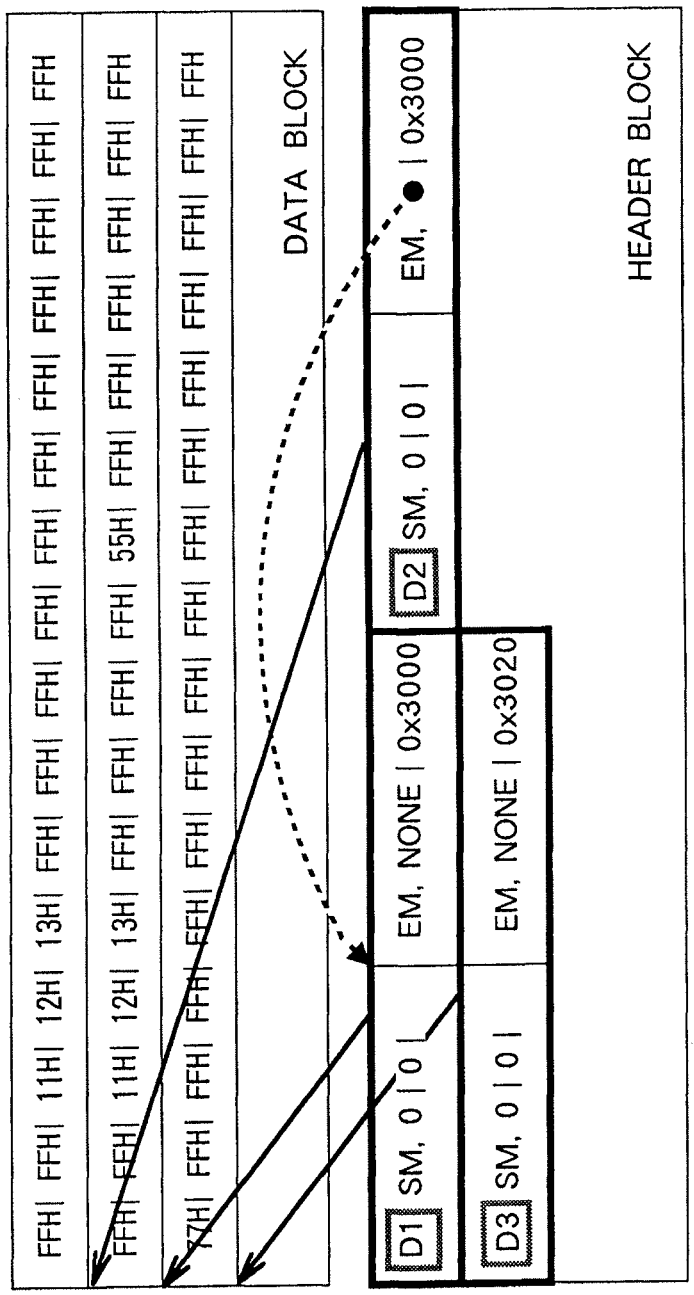
FIG. 36 shows the same data block, in which a 1-byte real data segment has been written at another address after the state shown in FIG. 35.

FIG. 36 shows the same data block, in which a 1-byte real data segment (77H) has been written at the address 3020 after writing the aforementioned sets of the real data D1 and D2. This 1-byte data segment is written into the first cell of the 16-byte aligned address of 3020H. The real data segment is denoted by "D3". The EM in the header block indicates that the real data D3 has also been written successfully. The EM has "none" for the immediately preceding entry location at the same logical address, and "0X3020" for the logical address written.

2. Read Operation

In the write operation, the data and information in which data has already been written are read first. A read operation according to the third embodiment has a feature to determine whether or not the data and information that have already written are valid or invalid.

This read operation is described with reference to a process-flow diagram shown in FIG. 37.

The memory control device 21 calculates block information (step S2102) according to an address input (step S2101) for the data to be read that is specified by a program issuing a request to read the data. The block information as used herein is information (e.g., about which block is used for what purpose) that is identified by the entries of the management sector (2) and the header block (4).

Thereafter, an address alignment (a_addr) and an offset (offset) are calculated (step S2103). The address alignment (a_addr) is on a multiple of 16 bytes of the address (addr). For example, it is assumed that the data to be read is located beginning at the first address (addr) of [0X3612]. This address is included in the address alignment (a_addr) from [0X3610], and the difference "2" between them is the offset (offset). The data segments at the addresses calculated at the step S2103 are read (step S2104). Those for necessary data segments are stored in a buffer (buf) in the working memory 3 (step S2105), and the size of the remainder is calculated (step S2106). The term those for necessary data segments as used herein is a value of either "16−offset" or size (size) which is smaller. The size of the remainder is a difference obtained by subtracting those for necessary data segments from the size (size). This is saved on the buffer (buf) as a new size (size). If there's a size of the remainder then the subsequent alignment address is calculated, and the offset (offset) is set to "0" to return to the process at the step S2104 (step S2107: Yes, S2108). If there is no size of the remainder, the read data that is a result of the operation is returned to the requesting source and the process is terminated (step S2107: No, S2109).

Figure 38:
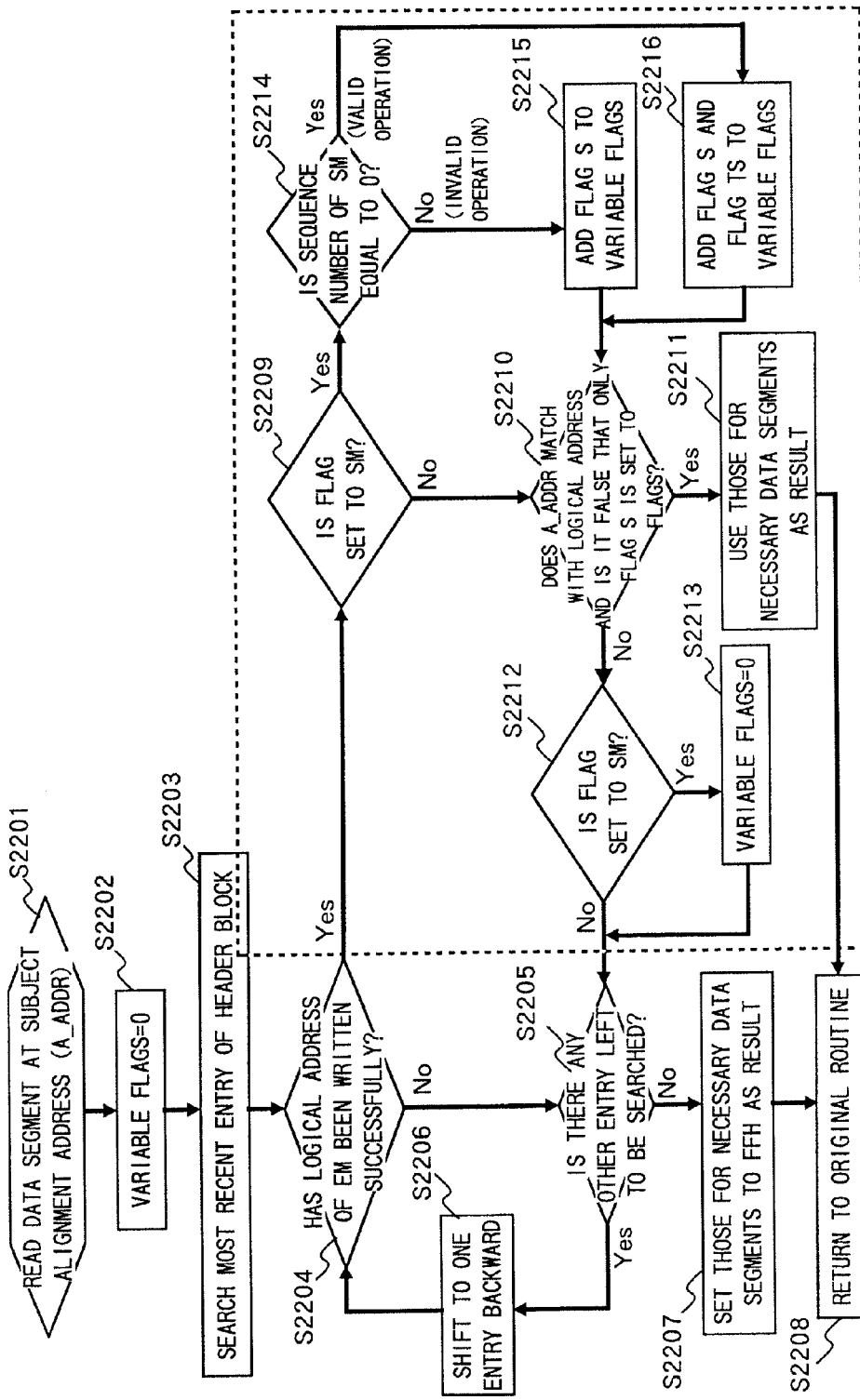
FIG. 38 is a process-flow diagram illustrating the step S2104 in FIG. 37 in detail.

The operation at the aforementioned step S2104 is described more in detail with reference to FIG. 38.

The memory control device 21 reads the data segments at the subject alignment addresses and set a variable flag about the flag to "0" (steps S2201, S2202). Thereafter, the most recent entry of the header block is searched (step S2203). More specifically, this operation is to search in the reverse order starting from the last entry of the header block to find an entry where the SM or the EM is written.

The memory control device 21 determines whether or not the logical address of the EM in this entry has been written successfully (step S2204). If it has not written successfully and there is any other entry left to be searched, the target is shifted to one entry backward (step S2204: No, S2205: Yes, S2206). If it has not written successfully and there is no entry left to be searched, those for the necessary data segments are set to "FFH" indicating that no valid data is present (step S2204: No, S2205: No, S2207), and the process goes back to the original routine (step S2208).

On the other hand, during the determination at the step S2204, if the logical address of the EM is successfully written, then carried out is an operation to determine whether the written data is valid data or invalid data (step S2204: Yes).

More specifically, the memory control device 21 determines whether the flag S is set to the SM, and if not, it determines whether the address alignment (a_addr) matches with the logical address and whether only the flag S is set or not in the variable flags in the flag area (step S2210). If not, those for necessary data segments are used as a result, and the process goes to the operation at the step S2208 (step S2210: Yes, S2211). If it is set, then it determines whether the flag TS is set to the SM (step S2212). If it does, then the variable flags is set to "0" and the process goes to the operation at the step S2205 (step S2212: Yes, S2213). If not, then the process immediately goes to the operation at the step S2205.

In the determination at the step S2209, if the flag S is set, then the sequence number of the SM. The value "0" is considered as a valid operation (step S2214: Yes) and the value other than "0" is considered as an invalid operation (step S2214: No). If it is determined as the invalid operation, then the flag S is added to the variable flags and the process goes to the operation at the step S2210 (step S2215). On the other hand, if it is the valid operation, the flag S and the flag TS are added to the variable flags and the process goes to the operation at the step S2210. The term "add" as used herein means to implement the logical OR of them.

3. Effects

The aforementioned operations make it possible to determine whether the operation to write the real data has been completed successfully or not according to whether or not the header information of the SM and EM are written correctly (see step S2204). More specifically, the logical address of the EM is written after the SM is written in the header block and the real data is written in the data block. Accordingly, the write operation is considered to be incomplete when the SM has partially been written, only the SM has been written, the real data has partially been written, the SM and the real data have been written, and the EM has partially been written, that is, the logical address of the EM is not written successively.

In addition, because each entry is 16-byte aligned, the logical address should be expressed as "XXX0H" all the time. Therefore, when the logical address of the EM written is other than "XXX0H" such as "XXXFH", the write operation was abnormally aborted for some reasons.

Therefore, by referring to the information of the SM and EM, especially the logical information of the EM, it can be confirmed whether or not a data chunk made up of multiple bytes has been written successively. The size of the data to be written is not fixed to a certain value such as 1 byte or 4 bytes. Instead, the data may be of any size.

For example, it is assumed that a power failure occurs when the following data is being written in the data block at the address of 5000H.

"www.test1.aaa.co.jp/test123456.html"

In the conventional art, it is possible that only a part of it is written. However, in the memory control device 21 according to the third embodiment, such situations will not occur. This is described specifically.

Figure 39:
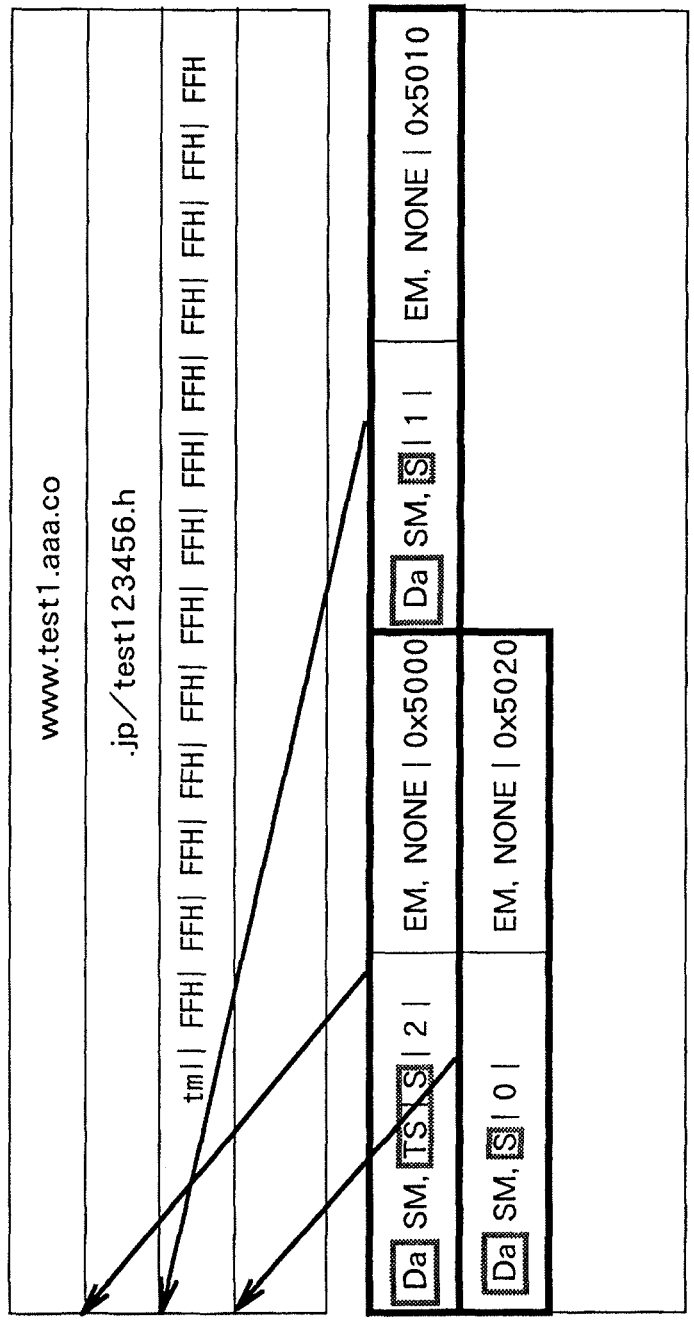
FIG. 39 shows a state where a real data Da has been written successfully.

FIG. 39 shows a state where the aforementioned data has been written successfully. This data is denoted by "Da". Since the Da is a 33-byte data, it is written in three separate lumps (in the order of 16 bytes, 16 bytes, and 1 byte) with a 16-byte alignment. Normally, there are three pairs of SM and EM as shown in FIG. 39. In addition, the flags (TS, S) of the SM and the sequence number (2) for the first entry are always different from those of SM of other entries. In particular, the sequence number should sequentially be decremented like "2", "1", and "0", and the flag should be "S" when the sequence number is "0".

Figure 40:
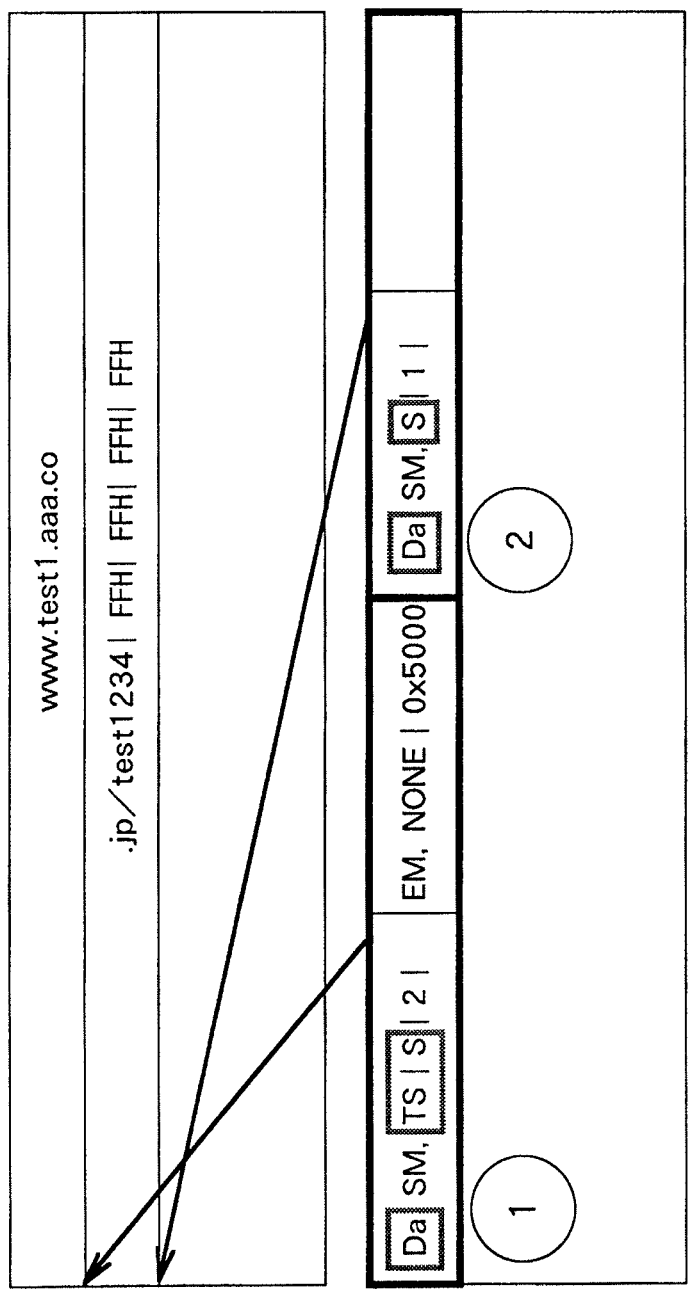
FIG. 40 shows a state where a power failure occurred just after 28 bytes out of 33 bytes have been written into a data block.

As an example, FIG. 40 shows a state where a power failure occurred just after 28 bytes out of 33 bytes have been written into the data block.

According to the operation at the step S2203 in FIG. 38, the most recent entry in this state is the second entry ((2) in FIG. 40). However, the logical address of the EM of the entry (2) is not correct, so that it is considered as an entry with no data (see steps S2204 to S2206). When shifted to a previous entry ((1) in FIG. 40), the logical address of the EM is correct but the conditions where the flag is "S" and the sequence number is "0" are not satisfied. Therefore, the data in the data block corresponding to this entry is considered as an invalid data. Thus, the process goes to an invalidation operation (see step S2215 in FIG. 38). The invalid data continues to the entry in which the flag TS appears in the SM. In the example shown in FIG. 40, the invalid data is up to the entry (1) itself. This means that the real data segments that have been written are all considered not to exist upon reading.

Figure 41:
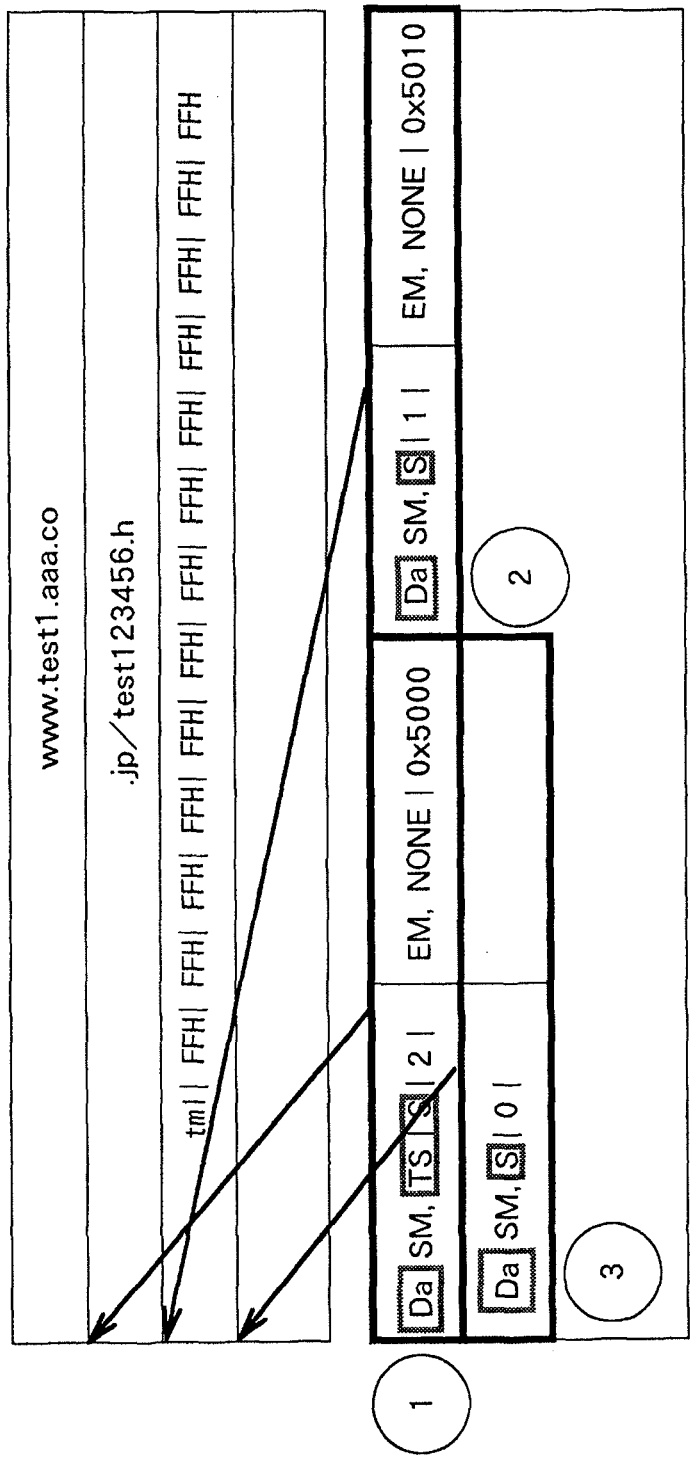
FIG. 41 shows a state where power failure occurred after all the 33 bytes has been written into a data block and just before an EM is written into a header block.

As another example, FIG. 41 shows a state where power failure occurred after all the 33 bytes has been written into the data block and just before the EM is written into the header block. The most recent entry is the third entry (entry (3) in FIG. 41). The entry (3) is not correct in the logical address of the EM, so it is considered to be an entry where no data is contained, as in the case of the above. When shifted to a previous entry (entry (2) in FIG. 41), in the entry (2), the logical address of the EM is correct but the sequence number of the SM is not "0", so that the process goes to the invalidation operation. The invalid data is the first entry (entry (1) in FIG. 41) where the flag TS appears in the SM. This means that the real data segments that have been written are all considered not to exist upon reading.

As apparent from the above, regardless of the size of the real data to be written, the data is considered as valid only when all data segments have been written into the data block and the logical address of the EM of the header block has also been written successfully. This can ensure the consistency of the data before and after the write operation.

Now, description is made about the data that has already been written into the non-volatile memory 5 but is considered invalid (as not existing) and the write operation after the header information is written. The memory control device 21 does not change the sectors in which such data and header information have been written until a predetermined condition is satisfied, for example, the rearrangement or initialization of the block(s) is made. When an operation to write a new data is carried out, then it writes the data into a remaining blank sector.

For example, description is made in conjunction with a case where the operation to write a data Da at address 5000H has failed and thus the memory configuration is kept unchanged in a state shown in FIG. 40, and then the aforementioned D1, i.e., the data segments (11H, 12H, and 13H) of 3 bytes in total are to be written at address 5002H.

Figure 42:
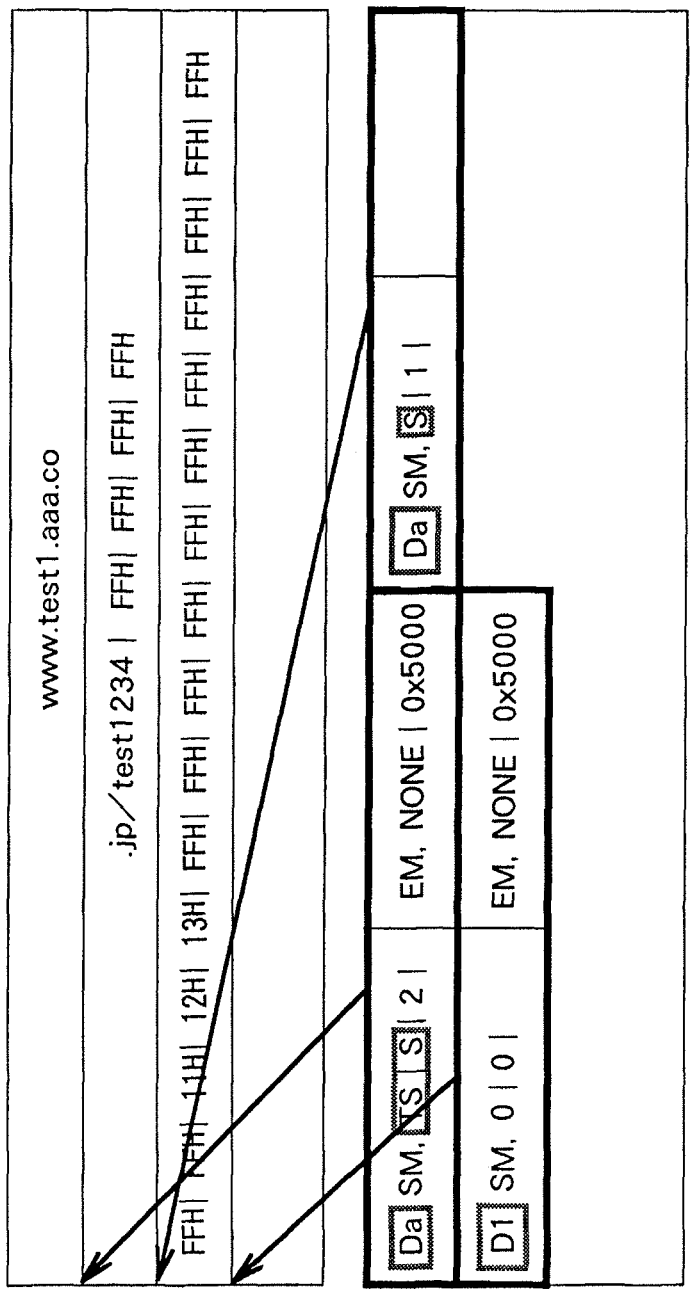
FIG. 42 shows a state where a read data D1 has been written into a data block successfully with an invalid data written therein.

FIG. 42 shows a state where D1 has been written into the data block and the header block successfully. The 16-byte data at the address 5000H is identical to the one at the address 3000N shown in FIG. 34. For the real data D1, the SM has "0" indicating that no flag is set and the sequential number "0", and the EM has the immediately preceding entry location at the same the logical address of "none", and the written logical address is "0X5000".

As described above, the memory control device 21 according to the third embodiment retains, in the write operation, one or more entries in the non-volatile memory 25 depending on the size of the real data obtained, and sequentially associates the retained entries from the beginning to the end of the real data, writes in the SM the information indicating what number of entry it is for that real data, writes the real data into the data block, writes the flag information indicating that the write operation has been completed into the EM of the header block when it detects normal termination of the operation to write the real data, refers to, in the read operation, the header information (information written in SM/EM) about the real data, and considers the all real data segments already written as invalid data when the EM is not written or EM is written but the SM is not the one for the last entry, so that even when the real data has various sizes, the real data is considered as invalid data in the read operation unless all write operations including header information have been completed successfully, which completely eliminates additional operations to ensure the consistency of the real data before and after a problem arises. This means that the operation to write real data of different sizes can be handled atomically.

In the non-volatile memory 25, the state in which the data block and the header block are written is kept until a certain erase condition is satisfied and they are erased in a lump. Therefore, for example, without leaving a separate log in writing data such as in journaling in existing file systems, and without any mechanism such as rolling back or rolling forward of typical database management systems, it is possible to know information whether or not the real data has been written successfully, and at which timing the write operation has failed if the real data has not been written.

Although the third embodiment has been described in conjunction with an example where the real data and the header information are written in a two-stage group of the entries and the blocks, they may be written in a three-stage group or in the unit of entry.

INDUSTRIAL APPLICABILITY

The present invention can be used widely in information processors in which a non-volatile memory is used as a data recording medium. Even in terms of only flash memories, example applications include memory control for persona computers, digital cameras, mobile phones, and data recording medium mounted on various devices and instruments.

Figure 2:
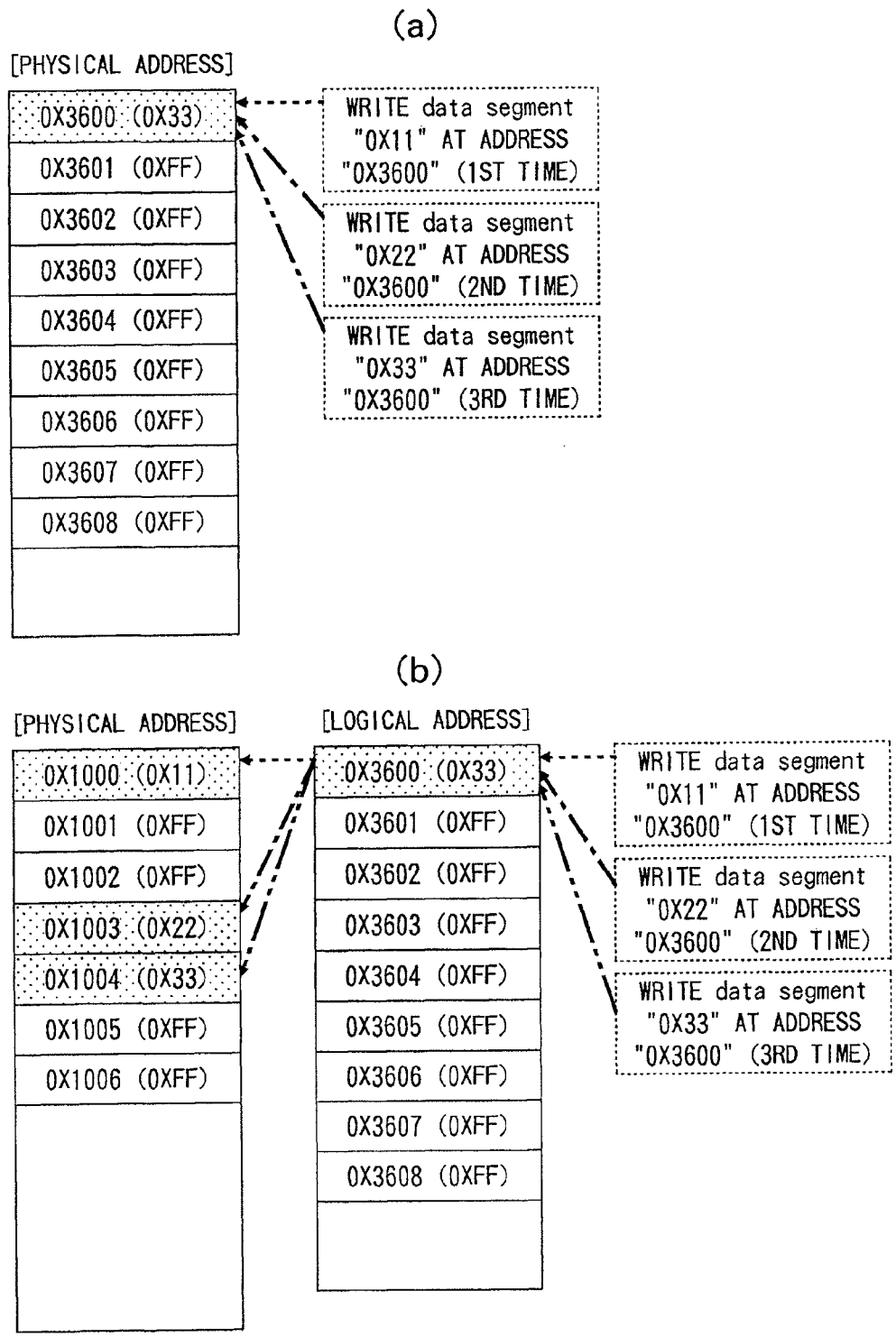
FIG. 2 is a conceptual diagram in which (a) is for illustrating how to use addresses in a conventional flash memory, while (b) is for illustrating how to use addresses in the first embodiment.
Figure 6:
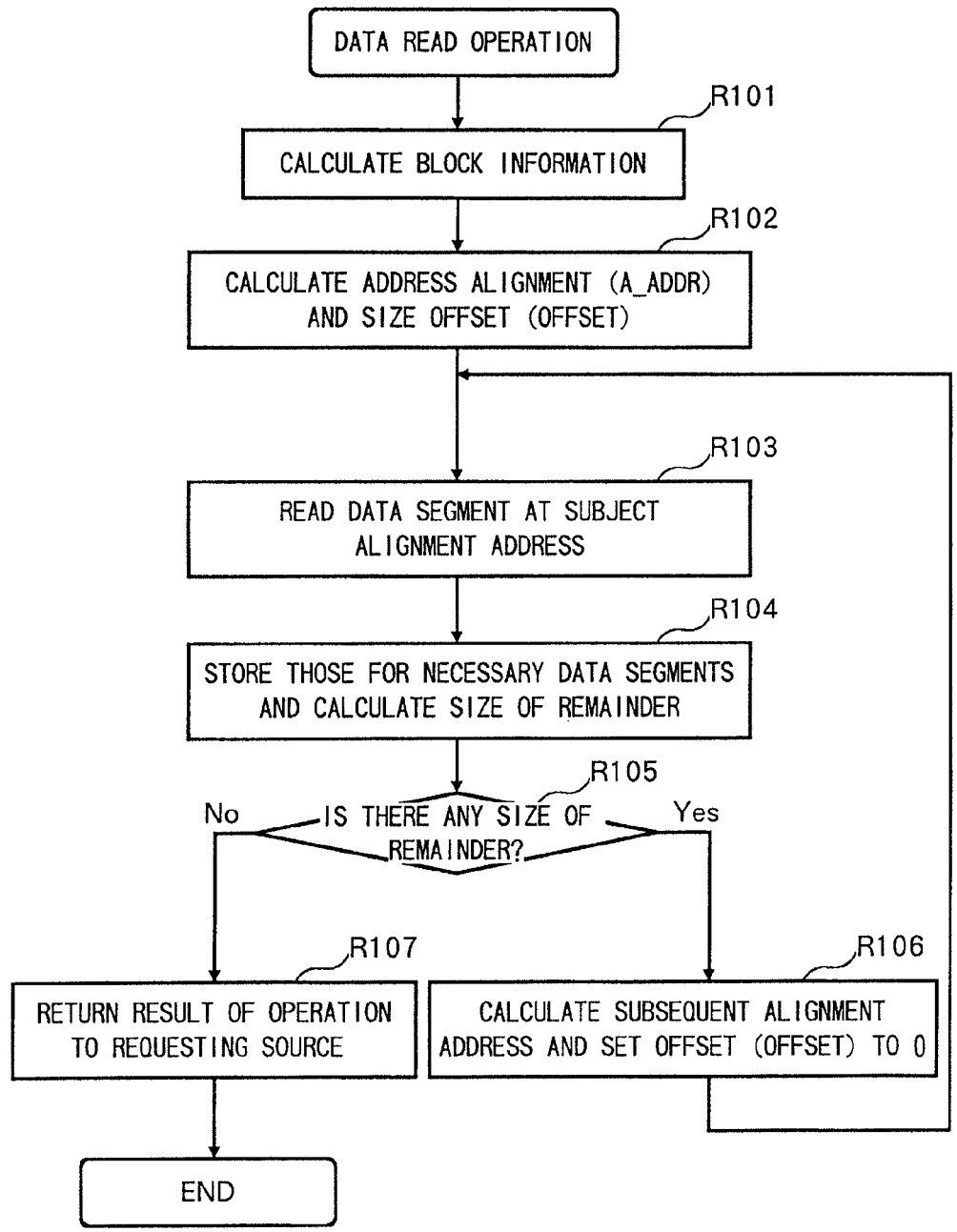
FIG. 6 is a process-flow diagram illustrating a data read operation.

FIG. 1
2 PROCESSOR UNIT
3 PROCESSOR
4 PROGRAM MEMORY
5 WORKING MEMORY
6 FLASH MEMORY
FIG. 2
PHYSICAL ADDRESS
WRITE data segment "0X11" AT ADDRESS "0X3600" (1ST TIME)
WRITE data segment "0X22" AT ADDRESS "0X3600" (2ND TIME)
WRITE data segment "0X33" AT ADDRESS "0X3600" (3RD TIME)
PHYSICAL ADDRESS
LOGICAL ADDRESS
WRITE data segment "0X11" AT ADDRESS "0X3600" (1ST TIME)
WRITE data segment "0X22" AT ADDRESS "0X3600" (2ND TIME)
WRITE data segment "0X33" AT ADDRESS "0X3600" (3RD TIME)
FIG. 3
BEFORE BEING WRITTEN
ADDRESS
17-BYTE data chunk "0X11" IS WRITTEN
LAST CELL BEING WRITTEN
ADD DATA "0X22"
ADDITION
FIG. 4
6 FLASH MEMORY
20 ALLOCATED SECTOR
21 CLUSTER #0 (FOR FIRST MODE OF OPERATION)
22 CLUSTER #1 (FOR SECOND MODE OF OPERATION)
BLOCK (E.G.: 31)
BLOCK (E.G.: 30)
BLOCK (E.G.: 4)
MANAGEMENT SECTOR BLOCK (E.G.: 3)
MANAGEMENT SECTOR BLOCK (E.G.: 2)
INITIAL DATA BLOCK (E.G.: 0, 1)
ENTRY #2
ENTRY #1
ENTRY #0
ENTRY #1
ENTRY #0
FIG. 5
DATA BLOCK
HEADER BLOCK
4 BYTES
4 BYTES
FLAG
1 BYTE
SEQUENCE NUMBER
1 BYTE
BLOCK NUMBER
1 BYTE
ENTRY LOCATION
1 BYTE
IMMEDIATELY PRECEDING ENTRY LOCATION AT THE SAME ADDRESS
2 BYTES
ADDRESS
2 BYTES MANAGEMENT SECTOR BLOCK
NUMBER OF RECONSTRUCTIONS
2 BYTES
FLAG
1 BYTE
BLOCK NUMBER
1 BYTE
FIG. 6
DATA READ OPERATION
R101 CALCULATE BLOCK INFORMATION
R102 CALCULATE ADDRESS ALIGNMENT (A_ADDR) AND SIZE OFFSET (OFFSET)
R103 READ data segment AT SUBJECT ALIGNMENT ADDRESS
R104 STORE THOSE FOR NECESSARY data segmentS AND CALCULATE SIZE OF REMAINDER
R105 IS THERE ANY SIZE OF REMAINDER?
R106 CALCULATE SUBSEQUENT ALIGNMENT ADDRESS AND SET OFFSET (OFFSET) TO 0
R107 RETURN RESULT OF OPERATION TO REQUESTING SOURCE
END
FIG. 7
DATA WRITE OPERATION
W101 CALCULATE BLOCK INFORMATION
W102 CALCULATE ADDRESS ALIGNMENT (A_ADDR) AND SIZE OFFSET (OFFSET)
W103 CALCULATE INITIAL FLAG VALUE OF START MARK (SM) AND NUMBER OF WRITE OPERATIONS SEQ
W105 GO TO "OPERATIONS TO DETERMINE WHETHER OR NOT INITIAL DATA HAS BEEN WRITTEN AND TO READ DATA AT SUBJECT ALIGNMENT ADDRESS"
W106 SAME DATA TO BE WRITTEN?
W107 GO TO "OPERATIONS TO DETERMINE WHETHER OR NOT INITIAL DATA HAS BEEN WRITTEN AND TO READ DATA AT SUBJECT ALIGNMENT ADDRESS"
W108 UPDATE TO NEW DATA
W109 GO TO WRITE OPERATION
W110 SEQ=SEQ-1
ADJUST SM INITIAL FLAG VALUE
W112 CALCULATE SUBSEQUENT ADDRESS
END
FIG. 8
OPERATIONS TO DETERMINE WHETHER OR NOT INITIAL DATA HAS BEEN WRITTEN AND TO READ DATA AT SUBJECT ALIGNMENT ADDRESS
D101 WHETHER OR NOT ALIGNMENT ADDRESS IS IN A RANGE OF INITIAL DATA?
D102 WHETHER OR NOT DATA HAVING SIZE IS STILL OCCUPIED WITH INITIAL VALUE FROM SPECIFIED ALIGNMENT ADDRESS
D103 READ DATA AT SUBJECT ALIGNMENT ADDRESS
D104 WRITE INITIAL DATA AND PROCESS IS COMPLETED RETURN
END
FIG. 9
WRITE OPERATION
W201 WRITE DATA IN ORDER OF DARA WRITING
W202 ISN'T THERE SPACE IN HEADER BLOCK?
W203 CANNOT SELECT SUBSEQUENT HEADER BLOCK?
W204 SELECT SUBSEQUENT DATA BLOCK AND UPDATE BLOCK INFORMATION TO RECONSTRUCTION
RETURN
FIG. 10
RECONSTRUCTION OPERATION
S101 IS THERE ANY PAST ERASABLE BLOCK?
S102 ERASE THAT BLOCK
S103 WRITE INFORMATION INDICATING THAT RECONSTRUCTION BEGINS INTO MANAGEMENT SECTOR
S104 SELECT NEW HEADER BLOCK AND WRITE IT INTO MANAGEMENT SECTOR
S105 SELECT NEW DATA BLOCK AND WRITE IT INTO MANAGEMENTE SECTOR
S106 IS THERE ANY OLD HEADER BLOCK?
S107 READ DATA SUCCESSIVELY IN OLD BLOCK IN ORDER OF LAST TO FIRST REGISTERED
S108 IS IT ADDRESS THAT SHOULD BE SKIPPED BECAUSE OF BEING SELECTED PREVIOUSLY?
S109 WRITE DATA INTO NEW DATA BLOCK
S110 STORE ANY PRECEDING DATA THAT MATCHES WITH SELECTED ADDRESS SO THAT IT CAN BE SKIPPED
S111 ARE data segmentS OF ALL OLD BLOCKS EXAMINED?
S112 SELECT SUBSEQUENT DATA
S120 WRITE INFORMATION INDICATING RECONSTRUCTION HAS BEEN COMPLETED INTO MANAGEMENT SECTOR
RETURN
FIG. 11
BLOCK (E.G.: 7)
BLOCK (E.G.: 6)
BLOCK (E.G.: 5)
BLOCK (E.G.: 4)
MANAGEMENT SECTOR (E.G.: 3)
MANAGEMENT SECTOR (E.G.: 2)
INITIAL DATA (E.G.: TWO BLOCKS)
DATA
DATA
DATA
BLOCK
BLOCK
MANAGEMENT SECTOR
FIG. 12
BLOCK (E.G.: 7)
BLOCK (E.G.: 6)
BLOCK (E.G.: 5)
BLOCK (E.G.: 4)
MANAGEMENT SECTOR (E.G.: 3)
MANAGEMENT SECTOR (E.G.: 2)
INITIAL DATA (E.G.: TWO BLOCKS)
DATA
DATA
DATA
DATA
BLOCK
BLOCK
MANAGEMENT SECTOR
FIG. 13
BLOCK (E.G.: 12)
BLOCK (E.G.: 11)
BLOCK (E.G.: 10)
BLOCK (E.G.: 9)
BLOCK (E.G.: 8)
BLOCK (E.G.: 7)

BLOCK (E.G.: 6)
BLOCK (E.G.: 5)
BLOCK (E.G.: 4)
MANAGEMENT SECTOR (E.G.: 3)
MANAGEMENT SECTOR (E.G.: 2)
INITIAL DATA (E.G.: TWO BLOCKS)
DATA
DATA
DATA
MANAGEMENT SECTOR
FIG. 14
BLOCK (E.G.: 12)
BLOCK (E.G.: 11)
BLOCK (E.G.: 10)
BLOCK (E.G.: 9)
BLOCK (E.G.: 8)
BLOCK (E.G.: 7)
BLOCK (E.G.: 6)
BLOCK (E.G.: 5)
BLOCK (E.G.: 4)
MANAGEMENT SECTOR (E.G.: 3)
MANAGEMENT SECTOR (E.G.: 2)
INITIAL DATA (E.G.: TWO BLOCKS)
DATA
DATA
DATA
DATA
MANAGEMENT SECTOR
FIG. 15
BLOCK (E.G.: 12)
BLOCK (E.G.: 11)
BLOCK (E.G.: 10)
BLOCK (E.G.: 9)
BLOCK (E.G.: 8)
BLOCK (E.G.: 7)
BLOCK (E.G.: 6)
BLOCK (E.G.: 5)
BLOCK (E.G.: 4)
MANAGEMENT SECTOR (E.G.: 3)
MANAGEMENT SECTOR (E.G.: 2)
INITIAL DATA (E.G.: TWO BLOCKS)
DATA
DATA
DATA
MANAGEMENT SECTOR
FIG. 16
11 MEMORY CONTROL DEVICE
12 PROCESSOR
13 PROGRAM MEMORY
14 WORKING MEMORY
15 NON-VOLATILE MEMORY
FIG. 17
BLOCK (E.G.: 31)
BLOCK (E.G.: 30)
BLOCK (E.G.: 4)
MANAGEMENT SECTOR (E.G.: 3)
MANAGEMENT SECTOR (E.G.: 2)
INITIAL DATA BLOCK (E.G.: 0,1)
ENTRY #2
ENTRY #1
ENTRY #0
ENTRY #1
ENTRY #0
FIG. 18
DATA BLOCK
DATA (16 BYTES)
HEADER BLOCK
4 BYTES
4 BYTES
FLAG
1 BYTE
SEQUENCE NUMBER
1 BYTE
PHYSICAL ADDRESS
BLOCK NUMBER
1 BYTE
ENTRY LOCATION
1 BYTE
IMMEDIATELY PRECEDING ENTRY LOCATION AT THE SAME ADDRESS
2 BYTES
LOGICAL ADDRESS
2 BYTES
MANAGEMENT SECTOR BLOCK
NUMBER OF RECONSTRUCTIONS
2 BYTES
FLAG
1 BYTE
BLOCK NUMBER
1 BYTE
FIG. 19
BEFORE BEING WRITTEN
ADDRESS
17-BYTE DATA "0X11" IS WRITTEN
LAST WRITE
DATA "0X22" IS ADDED
ADDITION
FIG. 20
BLOCK
BLOCK
BLOCK
BLOCK
BLOCK
MANAGEMENT SECTOR BLOCK
MANAGEMENT SECTOR BLOCK
INITIAL DATA BLOCK
EEPROM BASIC SYSTEM
INITIAL DATA SYSTEM
COMBINATION SYSTEM
INITIAL DATA BLOCK
RESERVED SECTOR
FIG. 21
DATA WRITE OPERATION
S1101 SHOULD IT BE WRITTEN AS INITIAL DATA?
S1102 WRITE BY BASIC SYSTEM
S1103 CAN INITIAL DATA BE WRITTEN?
S1104 WRITE BY INITIAL DATA SYSTEM
RETURN
FIG. 22
DATA READ OPERATION
S1201 READ OPERATION IS INITIATED IN BASIC SYSTEM
S1202 IS DATA TO BE READ FOUND IN BASIC SYSTEM?
S1203 READ DATA IN BASIC SYSTEM
S1204 READ OPERATION IS INITIATED IN INITIAL DATA SYSTEM
S1205 IS DATA TO BE READ FOUND IN INITIAL DATA SYSTEM?
S1206 READ DATA IN INITIAL DATA SYSTEM
S1207 USE PART OF INITIAL VALUE HAVING NECESSARY SIZE AS READ
DATA
RETURN

Figure 27:
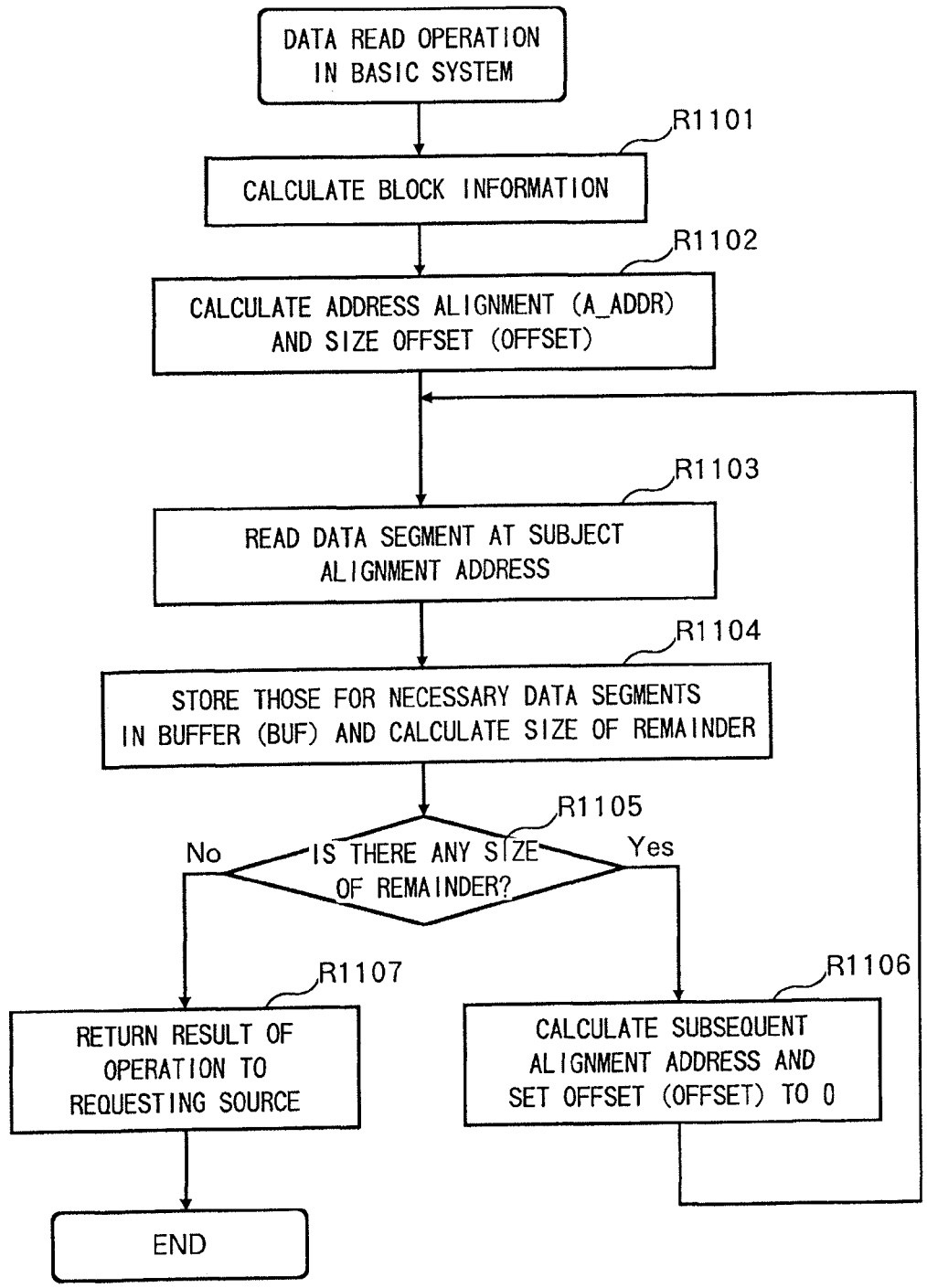
FIG. 27 is a process-flow diagram of a data read operation in the basic system.
Figure 30:
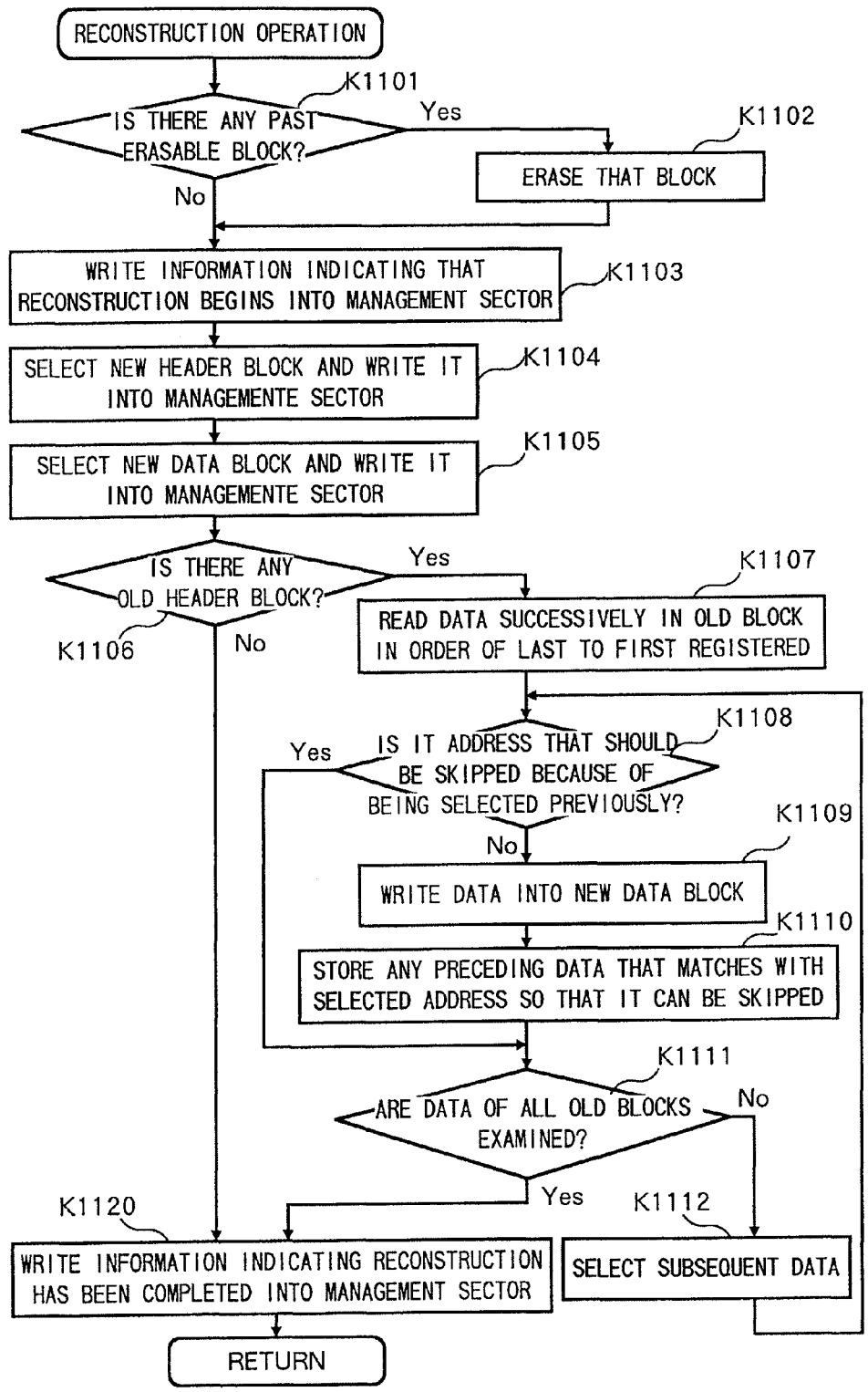
FIG. 30 is a process-flow diagram of a rearrangement operation in the basic system.

FIG. 23
DATA WRITE OPERATION
(ADDRESS AT THIS STAGE IS IN SPECIFIED ALIGNMENT ADDRESS)
S1301 IS WRITE ADDRESS IN RANGE OF INITIAL DATA?
S1302 WRITE IN BASIC SYSTEM
S1303 ARE VALUES OF WRITE ADDRESS OCCUPIED WITH INITIAL VALUE?
S1304 WRITE IN INITIAL DATA SYSTEM
RETURN
FIG. 24
DATA READ OPERATION
(ADDRESS AT THIS STAGE IS IN SPECIFIED ALIGNMENT ADDRESS)
S1401 READ OPERATION IS INITIATED IN BASIC SYSTEM
S1402 IS DATA TO BE READ FOUND IN BASIC SYSTEM?
S1403 READ DATA IN BASIC SYSTEM
S1404 DOES READ ADDRESS POINT TO RANGE OF INITIAL DATA?
S1405 READ DATA IN INITIAL DATA SYSTEM
S1406 READ DATA IS MADE UP OF INITIAL VALUE (S) HAVING NECESSARY
SIZE
RETURN
FIG. 25
DATA WRITE OPERATION
(ADDRESS AT THIS STAGE IS IN SPECIFIED ALIGNMENT ADDRESS)
S1501 ARE VALUES OF INITIAL DATA OF WRITE ADDRESS OCCUPIED WITH
INITIAL VALUE?
S1502 WRITE IN BASIC SYSTEM
S1503 WRITE IN INITIAL DATA SYSTEM
RETURN
FIG. 26
DATA READ OPERATION
(ADDRESS AT THIS STAGE IS IN SPECIFIED ALIGNMENT ADDRESS)
S1601 READ OPERATION IS INITIATED IN BASIC SYSTEM
S1602 IS DATA TO BE READ FOUND IN BASIC SYSTEM?
S1603 READ DATA IN BASIC SYSTEM
S1604 READ DATA IN INITIAL DATA SYSTEM
RETURN
FIG. 27
DATA READ OPERATION IN BASIC SYSTEM
R1101 CALCULATE BLOCK INFORMATION
R1102 CALCULATE ADDRESS ALIGNMENT (A_ADDR) AND SIZE OFFSET (OFFSET)
R1103 READ data segment AT SUBJECT ALIGNMENT ADDRESS
R1104 STORE THOSE FOR NECESSARY data segmentS IN BUFFER (BUF) AND CALCULATE SIZE OF REMAINDER
R1105 IS THERE ANY SIZE OF REMAINDER?
R1106 CALCULATE SUBSEQUENT ALIGNMENT ADDRESS AND SET OFFSET (OFFSET) TO 0
R1107 RETURN RESULT OF OPERATION TO REQUESTING SOURCE
END
FIG. 28
DATA WRITE OPERATION IN BASIC SYSTEM
W1101 CALCULATE BLOCK INFORMATION
W1102 CALCULATE ADDRESS ALIGNMENT (A_ADDR) AND SIZE OFFSET (OFFSET)
W1103 INITIAL FLAG VALUE FOR START MARK (SM) AND NUMBER OF DIVIDED WRITE CYCLES SEQ
W1105 GO TO "OPERATIONS TO DETERMINE WHETHER INITIAL DATA HAS BEEN WRITTEN AND TO READ DATA AT SUBJECT ALIGNMENT ADDRESS"
W1106 IS SAME DATA WRITTEN?
W1107 GO TO "OPERATIONS TO DETERMINE WHETHER INITIAL DATA HAS BEEN WRITTEN AND TO READ DATA AT SUBJECT ALIGNMENT ADDRESS"
W1108 UPDATE TO NEW DATA
W1109 GO TO WRITE OPERATION
W110 SEQ=SEQ-1
ADJUST SM INITIAL FLAG VALUE
W112 CALCULATE SUBSEQUENT ADDRESS
END
FIG. 29
WRITE OPERATION
W1201 WRITE DATA IN ORDER OF DARA WRITING
W1202 ISN'T THERE SPACE IN HEADER BLOCK?
W1203 CANNOT SELECT SUBSEQUENT HEADER BLOCK?
W1204 SELECT SUBSEQUENT DATA BLOCK AND UPDATE BLOCK INFORMATION TO RECONSTRUCTION
RETURN
FIG. 30
RECONSTRUCTION OPERATION
K1101 IS THERE ANY PAST ERASABLE BLOCK?
K1102 ERASE THAT BLOCK
K1103 WRITE INFORMATION INDICATING THAT RECONSTRUCTION BEGINS INTO MANAGEMENT SECTOR
K1104 SELECT NEW HEADER BLOCK AND WRITE IT INTO MANAGEMENT SECTOR
K1105 SELECT NEW DATA BLOCK AND WRITE IT INTO MANAGEMENTE SECTOR
K1106 IS THERE ANY OLD HEADER BLOCK?
K1107 READ DATA SUCCESSIVELY IN OLD BLOCK IN ORDER OF LAST TO FIRST REGISTERED
K1108 IS IT ADDRESS THAT SHOULD BE SKIPPED BECAUSE OF BEING SELECTED PREVIOUSLY?
K1109 WRITE DATA INTO NEW DATA BLOCK
K1110 STORE ANY PRECEDING DATA THAT MATCHES WITH SELECTED ADDRESS SO THAT IT CAN BE SKIPPED
K1111 ARE DATA OF ALL OLD BLOCKS EXAMINED?
K1112 SELECT SUBSEQUENT DATA
K1120 WRITE INFORMATION INDICATING RECONSTRUCTION HAS BEEN COMPLETED INTO MANAGEMENT SECTOR
RETURN
FIG. 31
21 MEMORY CONTROL DEVICE
22 PROCESSOR
23 PROGRAM MEMORY
24 WORKING MEMORY
25 NON-VOLATILE MEMORY
FIG. 32
BLOCK (E.G.: 31)
BLOCK (E.G.: 30)
BLOCK (E.G.: 4)
MANAGEMENT SECTOR (E.G.: 3)
MANAGEMENT SECTOR (E.G.: 2)

Figure 37:
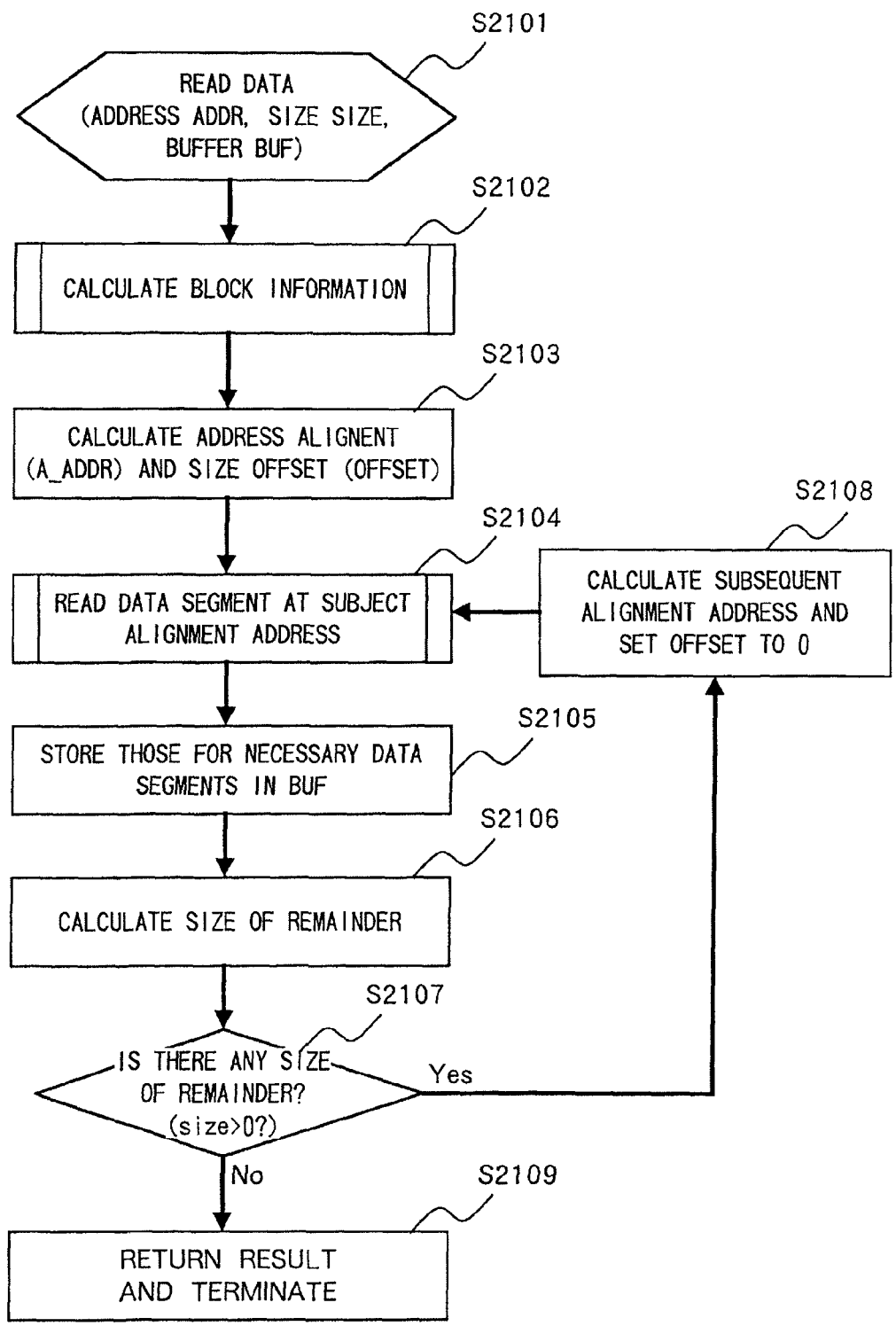
FIG. 37 is a process-flow diagram of a read operation.

INITIAL DATA BLOCK (E.G.: 0,1)
ENTRY #2
ENTRY #1
ENTRY #0
ENTRY #1
ENTRY #0
FIG. 33
DATA BLOCK
DATA (16 BYTES)
HEADER BLOCK
4 BYTES
4 BYTES
FLAG
1 BYTE
SEQUENCE NUMBER
1 BYTE
PHYSICAL ADDRESS
BLOCK NUMBER
1 BYTE
ENTRY LOCATION
1 BYTE
IMMEDIATELY PRECEDING ENTRY LOCATION AT THE SAME ADDRESS
2 BYTES
LOGICAL ADDRESS
2 BYTES
MANAGEMENT SECTOR BLOCK
FLAG
1 BYTE
BLOCK NUMBER
1 BYTE
FIG. 34
DATA BLOCK
NONE
HEADER BLOCK
FIG. 35
DATA BLOCK
NONE
HEADER BLOCK
FIG. 36
DATA BLOCK
NONE
NONE
HEADER BLOCK
FIG. 37
READ DATA
S2101 (ADDRESS ADDR, SIZE SIZE, BUFFER BUF)
S2102 CALCULATE BLOCK INFORMATION
S2103 CALCULATE ADDRESS ALIGNMENT (A_ADDR) AND SIZE OFFSET (OFFSET)
S2104 READ data segment AT SUBJECT ALIGNMENT ADDRESS
S2105 STORE THOSE FOR NECESSARY data segmentS IN BUF
S2106 CALCULATE SIZE OF REMAINDER
S2107 IS THERE ANY SIZE OF REMAINDER?
S2108 CALCULATE SUBSEQUENT ALIGNMENT ADDRESS AND SET OFFSET TO 0
S2109 RETURN RESULT AND TERMINATE
FIG. 38
S2201 READ data segment AT SUBJECT ALIGNMENT ADDRESS
S2202 VARIABLE FLAGS=0
S2203 SEARCH MOST RECENT ENTRY OF HEADER BLOCK
S2204 HAS LOGICAL ADDRESS OF EM BEEN WRITTEN SUCCESSFULLY?
S2205 IS THERE ANY OTHER ENTRY LEFT TO BE SEARCHED?
S2206 SHIFT TO ONE ENTRY BACKWARD
S2207 SET THOSE FOR NECESSARY data segmentS TO FFH AS RESULT
S2208 RETURN TO ORIGINAL ROUTINE
S2209 IS FLAG SET TO SM?
S2210 DOES A_ADDR MATCH WITH LOGICAL ADDRESS AND ISN'T ONLY FLAG S SET TO FLAGS?
S2211 USE THOSE FOR NECESSARY data segmentS AS RESULT
S2212 IS FLAG SET TO SM?
S2213 VARIABLE FLAGS=0
S2214 IS SEQUENCE (VALID OPERATION) NUMBER OF SM EQUAL TO 0?
S2215 ADD FLAG S TO VARIABLE FLAGS
S2216 ADD FLAG S AND FLAG TS TO VARIABLE FLAGS
FIG. 39
NONE
NONE
NONE
FIG. 40
NONE
FIG. 41
NONE
NONE
FIG. 42
NONE
NONE

The invention claimed is:

1. A memory control method to be carried out by a device that can access a non-volatile memory in which data segments in write cells are erased before other data segments are written in the write cells, comprising:
sequentially associating and grouping write cells of said non-volatile memory by every predetermined number;
retaining such number of groups that is necessary to allow a predetermined number of data write operations, said number of groups being a total sum of groups;
in the retained number of groups, transferring from a selected group, when there is a particular group having a particular write cell that was not previously written or a write cell into which a particular data segment can be written in a write operation, the particular data segment to the particular write cell of the particular group; and
erasing the selected group from which the particular data segment was transferred in a unit of group at the time when a predetermined condition is satisfied.

2. The memory control method as claimed in claim 1, wherein said device retains, when it detects a completion of the predetermined number of data write operations in said retained number of groups, such number of groups that is further required to allow a predetermined number of data write operations from said non-volatile memory.

3. The memory control method as claimed in claim 1, wherein said device, when it stops control operation before a completion of the predetermined number of data write operations in said retained number of groups, retains in a recovery, a group again that has been retained before the stop of the control operation.

4. A memory control device for use in controlling operations to write data into a non-volatile memory device in which data segments in write cells are erased before other data segments are written in the write cells,
said non-volatile memory device containing, multiple data blocks, each data block having multiple write cells associated sequentially, multiple header blocks, each header block having a write cell for header information indicating data segment is written in which write cell of which data block, and a management block having a write cell for management information indicating which write cells of which data block and which header block are accessible, said memory control device comprising:

the non-volatile memory device;

write processing means for use in specifying a data block having a reprogrammable write cell from said multiple data blocks in said non-volatile memory, successively adding transferred new data segments into the reprogrammable write cell of the specified data block, further specifying a subsequent data block in said non-volatile memory if the reprogrammable write cell are is not enough, to complete addition of said transferred data segments, rewriting one or more data blocks that have been completely added with the multiple data blocks in said non-volatile memory in a unit of data block, generating each header information including address information that allows identification of a write cell added with a data segment in the data blocks, and adding each generated header information into the write cell of each header block;

first detecting means for detecting that a number of write operations in a data block or a header block reaches a predetermined number of times; and rearrangement processing means for use in further retaining such number of said multiple data blocks that is to be necessary for retaining a predetermined number of operations to rewrite data next time in said non-volatile memory when the first detecting means detects that said predetermined number of times is reached, generating management information about a retained data block, and writing the generated management information into a management block.

5. The memory control device as claimed in claim 4, wherein said write processing means is adapted to temporarily store data blocks before being added into a predetermined sector in the non-volatile memory when said one or more data blocks that have been completely added is a data block containing a reprogrammable write cell, and to erase the temporarily stored data block when it is detected that a predetermined condition is satisfied.

6. The memory control device as claimed in claim 4, wherein said non-volatile memory has an initial data write cell into which an initial data is to be written, the initial data being commonly used for data write operations in multiple times, said write processing means being adapted to refer to the initial data written in said initial data write cell when it performs transfer of a data segment to a particular write cell.

7. The memory control device as claimed in claim 6, wherein a rearrangement processing means is adapted to select a new header block along with a new data block, and generates management information about a selected data block and a selected header block before erasing a data block.

8. The memory control device as claimed in claim 7, further comprising second detecting means for use in detecting a recovery after a stop of operation of memory control, said rearrangement processing means being adapted to:

retain, when said second detecting means detects said recovery, a data block and a header block of which written contents are identical to those before the stop, according to management information written in said management block, rather than retaining a new data block and a new header block.

9. A non-transitory computer-readable storage medium having stored thereon a computer program for use in making a computer serve as a device for use in controlling operations to write data into a non-volatile memory in which data segments in write cells are erased before other data segments are written in the write cells, said computer program making said computer act as:

group forming means for forming, in said non-volatile memory, multiple data blocks, each data block having multiple write cells associated sequentially, multiple header blocks, each header block having a write cell for header information indicating data segment is written in which write cell of which data block, and a management block having a write cell for management information indicating which write cells of which data block and which header block are accessible;

write processing means for use in specifying a data block having a reprogrammable write cell from said multiple data blocks in said non-volatile memory, successively adding transferred new data segments into the reprogrammable write cell of the specified data block, further specifying a subsequent data block in said non-volatile memory if the reprogrammable write cell is not enough, to complete addition of said transferred new data segments, rewriting one or more data blocks that have been completely added with the data segments in said non-volatile memory in a unit of data block, generating header information including address information that allows identification of a write cell added with a data segment in the specified data block, and adding the generated header information into a write cell of a header block;

detecting means for detecting that a number of write operations in said specified data block or said header block reaches a predetermined number of times; and rearrangement processing means for use in further retaining such number of said multiple data blocks that is to be necessary for retaining a predetermined number of operations to rewrite data next time in said non-volatile memory when the detecting means detects that said predetermined number of times is reached, generating management information about the retained number of data blocks, and writing the generated management information into a management block.

10. A memory control device for use in controlling operations to write data into a non-volatile memory that can be written only a limited number of times, comprising:

accepting means for accepting an input data by a processor;

discriminating means for use in determining, according to a predetermined write rule, whether said input data is a first data or a second data, the first data being not required to be rewritten, the second data being required to be rewritten; and write processing means for use in performing a first write operation when the input data is said first data and a second write operation when said input data is said second data, the first write operation being for writing the input data into a first data sector in said non-volatile memory, the second write operation being for retaining, in said non-volatile memory, such number of second data sectors that is required for allowing predetermined number of operations to write data, to successively add said input data into a write cell into which a data segment can be written, and to erase a second data sector in which data has already been written in a unit of cells, of a retained second data recording area.

11. The memory control device as claimed in claim 10, wherein said write processing means temporarily stores said second data sector into which the data has already been written in a predetermined sector in said non-volatile memory, and erases it when a predetermined condition is satisfied.

12. The memory control device as claimed in claim 10, wherein said write processing means is adapted to accumulate a number of write operations into said second data sector, further retain said retained number of said second data sectors in said non-volatile memory when an accumulated total value reaches a predetermined value, and perform an operation for data rearrangement to the retained number of said second data sectors.

13. The memory control device as claimed in claim 10, wherein said write rule is a record of a range of addresses at which addresses of the first data sector can be written, and wherein
said discriminating means determines whether addresses into which said input data should be written are within the range of the addresses of said first data sector, and determines that the input data is data to be written into said first data sector when they are within the range of the addresses, while determines that the input data is data to be written into said second data sector when they are not within the range of said addresses.

14. The memory control device as claimed in claim 10, wherein said write rule is a record of a relationship between an order of writing into said non-volatile memory and a data recording area therefor, and wherein
said discriminating means determines the input data as data that should be written into said first data sector when said input data is first data to be written into said non-volatile memory, and determines data other than that is data that should be written into said second data sector.

15. A memory control method to be carried out by a device for use in controlling operations to write data into a non-volatile memory that can be written with data only a limited number of times, comprising the steps of:
accepting an input data, and determining, according to a predetermined write rule, whether the accepted input data is a first data or a second data, the first data being not required to be rewritten, the second data being required to be rewritten; and
performing a first write operation when the input data is said first data and a second write operation when said input data is said second data, the first write operation being for writing the input data into a first data sector in said non-volatile memory, the second write operation being for retaining, in said non-volatile memory, such number of second data sectors that is required for allowing predetermined number of operations to write data, to successively add said input data into a write cell into which a data segment can be written, and to erase a second data sector in which data has already been written in a unit of cells, of a retained second data recording area.

16. A non-transitory computer-readable storage medium having stored thereon a computer program for use in making a computer serve as a memory control device for use in controlling operations to write data into a non-volatile memory that can be written only a limited number of times, said computer program making said computer act as:
accepting means for accepting an input data;
discriminating means for use in determining, according to a predetermined write rule, whether said input data is a first data or a second data, the first data being not required to be rewritten, the second data being required to be rewritten; and
write processing means for use in performing a first write operation when the input data is said first data and a second write operation when said input data is said second data, the first write operation being for writing the input data into a first data sector in said non-volatile memory, the second write operation being for retaining, in said non-volatile memory, such number of second data sectors that is required for allowing predetermined number of operations to write data, to successively add said input data into a write cell into which a data segment can be written, and to erase a second data sector in which data has already been written in a unit of cells, of a retained second data recording area.

17. A memory access control method to be carried out by a device for use in controlling accesses to a memory having a data sector and a header sector, the data sector being written in blocks of a predetermined data size as a single write unit, the header sector being referred to when data is read out of the data sector, comprising stages of:
obtaining a real data to be written; retaining the data sector for one or more write units in said memory depending on the size of the real data obtained;
sequentially associating the retained data sector for the one or more write units from the beginning to the end of said real data;
writing first flag information in said header sector, the first flag information indicating a number of write units the real data is in;
writing the real data in this number of write units into said data sector; and
associating second flag information with said first flag information and writing the second flag information into said header sector when it is detected that the real data has been written successfully, the second flag information indicating completion of writing the real data; and
referring to said header sector about said real data and, when no second flag information is written in the header sector or when said second flag information is written therein but said first flag information is not the one for a last write unit, then dealing all real data already written in said data sector as invalid data.

18. The memory access control method as claimed in claim 17, wherein said first flag information includes sequence numbers of which maximum value is equal to a number of retained write units, and wherein
said device successively is adapted to update said sequence numbers to a smaller value, starting from a first write unit to the maximum value indicating the last write unit, every time when said real data has been written into said data sector successfully, and to write the updated sequence numbers into said header sector as the first flag information for a write unit.

19. The memory access control method as claimed in claim 18, wherein said second flag information includes, for each write unit, identification information for use in identifying an immediately preceding write unit, and a logical address indicating a location where said real data is written, and wherein
said device generates said second flag information when said first flag information has been written into said header sector successfully and said real data has been written into said data sector successfully, to write the second flag information along with the first flag information into a sector from which it is referred to.

20. The memory access control method as claimed in claim 19, wherein said device obtains a new real data to be written while keeping contents of the data sector and said header sector in which invalid data has been written, and further retains said data sector into which a value indicating the size of the new real data obtained is to be written.

21. The memory access control method as claimed in claim 20, wherein said device erases, in a lump, the contents of said kept data sector and said header sector when a predetermined erase condition is satisfied.

22. A memory control device for use in controlling accesses to a memory device having a data sector and a header sector, the data sector being written in blocks of a predetermined data size as a single write unit, the header sector being referred to when data is read out of the data sector, comprising:

the memory device;

real data acquisition means for obtaining a real data to be written;

writing means for use in retaining the data sector for one or more write units in said memory device depending on the size of the real data obtained; sequentially associating the retained data sector for the one or more write units from the beginning to the end of said real data;

writing first flag information in said header sector, the first flag information indicating a number of write units the real data is in;

writing the real data in this number of write units into said data sector; and associating second flag information with said first flag information and writing the second flag information into said header sector when it is detected that the real data has been written successfully, the second flag information indicating completion of writing the real data; and reading means for use in referring to said header sector about said real data and, when no second flag information is written in the header sector or when said second flag information is written therein but said first flag information is not the one for a last write unit, then dealing all real data already written in said data sector as invalid data.

23. A non-transitory computer-readable storage medium having stored thereon a computer program for use in making a computer which can access a memory having a data sector and a header sector, the data sector being written in blocks of a predetermined data size as a single write unit, the header sector being referred to when data is read out of the data sector, act as:

real data acquisition means for obtaining a real data to be written;

writing means for use in retaining the data sector for one or more write units in said memory depending on the size of the real data obtained;

sequentially associating the retained data sector for the one or more write units from the beginning to the end of said real data;

writing first flag information in said header sector, the first flag information indicating a number of write units the real data is in;

writing the real data in this number of write units into said data sector; and associating second flag information with said first flag information and writing the second flag information into said header sector when it is detected that the real data has been written successfully, the second flag information indicating completion of writing the real data; and reading means for use in referring to said header sector about said real data and, when no second flag information is written in the header sector or when said second flag information is written therein but said first flag information is not the one for a last write unit, then dealing all real data already written in said data sector as invalid data.

* * * * *